(12) United States Patent
Tatebayashi et al.

(10) Patent No.: US 7,707,430 B2
(45) Date of Patent: Apr. 27, 2010

(54) DIGITAL CONTENT PROTECTION SYSTEM

(75) Inventors: Makoto Tatebayashi, Takarazuka (JP); Yutaka Nakamura, Kyoto (JP); Shunji Harada, Osaka (JP); Masayuki Kozuka, Arcadia, CA (US)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 11/857,389

(22) Filed: Sep. 18, 2007

(65) Prior Publication Data

US 2008/0263367 A1      Oct. 23, 2008

Related U.S. Application Data

(62) Division of application No. 11/015,252, filed on Dec. 17, 2004, now Pat. No. 7,298,845, which is a division of application No. 09/419,240, filed on Oct. 15, 1999, now Pat. No. 6,859,535.

(30) Foreign Application Priority Data

Oct. 16, 1998   (JP)   ................................. 10-295920
Nov. 30, 1998   (JP)   ................................. 10-339027

(51) Int. Cl.
*H04L 9/32*   (2006.01)
*H04L 9/00*   (2006.01)

(52) U.S. Cl. .................... 713/189; 713/169; 713/193

(58) Field of Classification Search ......... 380/200–202; 713/168–170, 176, 189, 192–194; 726/26–27, 726/56–59; 705/56–59
See application file for complete search history.

(56) References Cited

U.S. PATENT DOCUMENTS 5,109,152 A    4/1992   Takagi et al.

(Continued)

FOREIGN PATENT DOCUMENTS

EP    0 715 242    6/1996

(Continued)

OTHER PUBLICATIONS

K. Yamanaka et al.; Trends in Digital Copy Protection Technologies; NTT Review, JP Telecommunications Association, vol. 11, No. 1, pp. 108-115, Jan. 1999.

(Continued)

*Primary Examiner*—Hosuk Song

(57) ABSTRACT

The media inherent key storing unit 220 prestores an inherent key Ki, the conversion unit 230 generates an encrypted inherent key Ji from the inherent key read from the media inherent key storing unit 220, the random number generating unit 331 generates a random number R1, the encryption unit 252 generates an encrypted random number S1, the decryption unit 333 generates a random number R'1 from the encrypted random number R1, and the mutual authentication control unit 334 compares the random number R'1 with the random number R1 and, if the random number R'1 matches the random number R1, judges that the memory card 200 is an authorized device. If the memory card 200 and the memory card writer have successfully authenticated each other, the memory card writer encrypts a content using a decrypted inherent key. If the memory card 200 and the memory card reader have successfully authenticated each other, the memory card reader decrypts an encrypted content using the decrypted inherent key.

4 Claims, 35 Drawing Sheets

U.S. PATENT DOCUMENTS

| | | | |
|---|---|---|---|
| 5,392,351 A * | 2/1995 | Hasebe et al. ............... 705/51 |
| 5,703,950 A | 12/1997 | Jovanovich et al. |
| 5,754,648 A | 5/1998 | Ryan et al. |
| 5,754,649 A | 5/1998 | Ryan et al. |
| 5,949,881 A | 9/1999 | Davis |
| 6,286,008 B1 | 9/2001 | Matsumoto et al. |
| 6,421,779 B1 | 7/2002 | Kuroda et al. |
| 6,859,535 B1 | 2/2005 | Tatebayashi et al. |
| 7,298,845 B2 | 11/2007 | Tatebayashi et al. |
| 2008/0263367 A1 | 10/2008 | Tatebayashi et al. |

FOREIGN PATENT DOCUMENTS

| JP | 02-044389 | 2/1990 |
|---|---|---|
| WO | 95/12200 | 5/1995 |

OTHER PUBLICATIONS

Bruce Schneier; Applied Cryptography: Protocols, Algorithms, and Source Code in C; Second Edition, 1996, pp. 52-57.

K. Yamanaka et al., Copyright Protection in Multimedia on Demand Services; NTT R&D, vol. 44, No. 9, 1995, pp. 813-818 with partial translation.

Eiji Okamoto; Guide to Encryption Theory; Kyoritsu Shuppan Co., Ltd., 1993, p. 110 with partial translation.

\* cited by examiner

Fig. 19
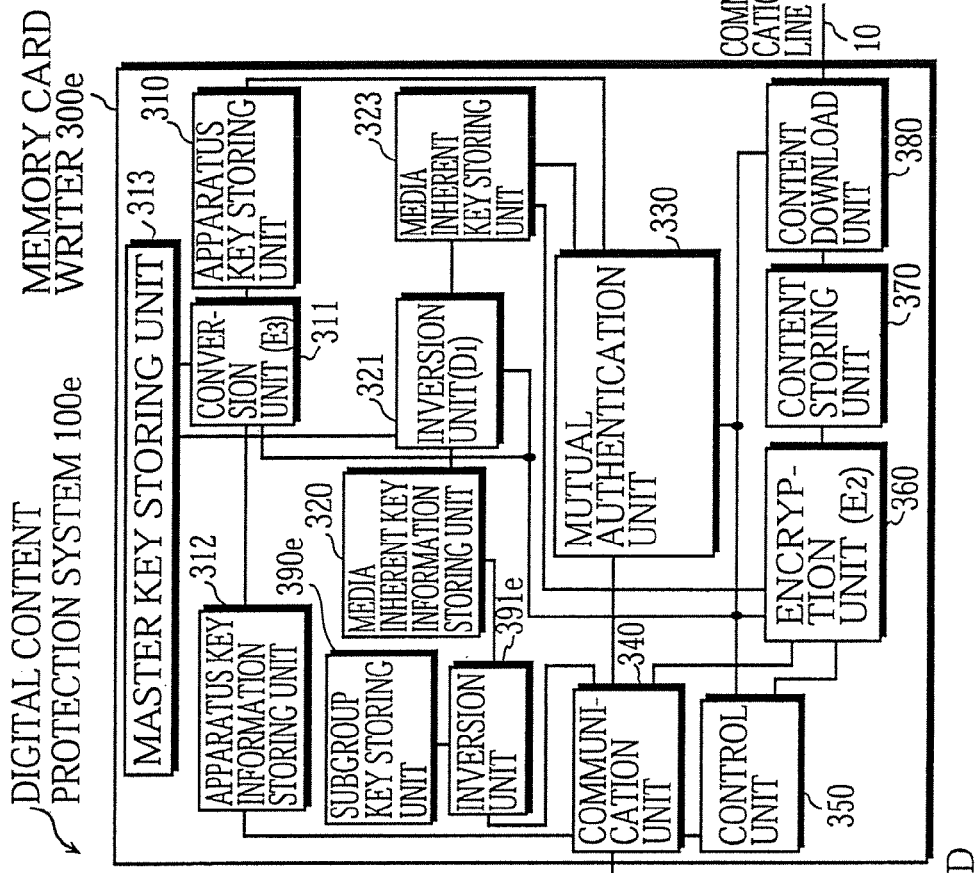
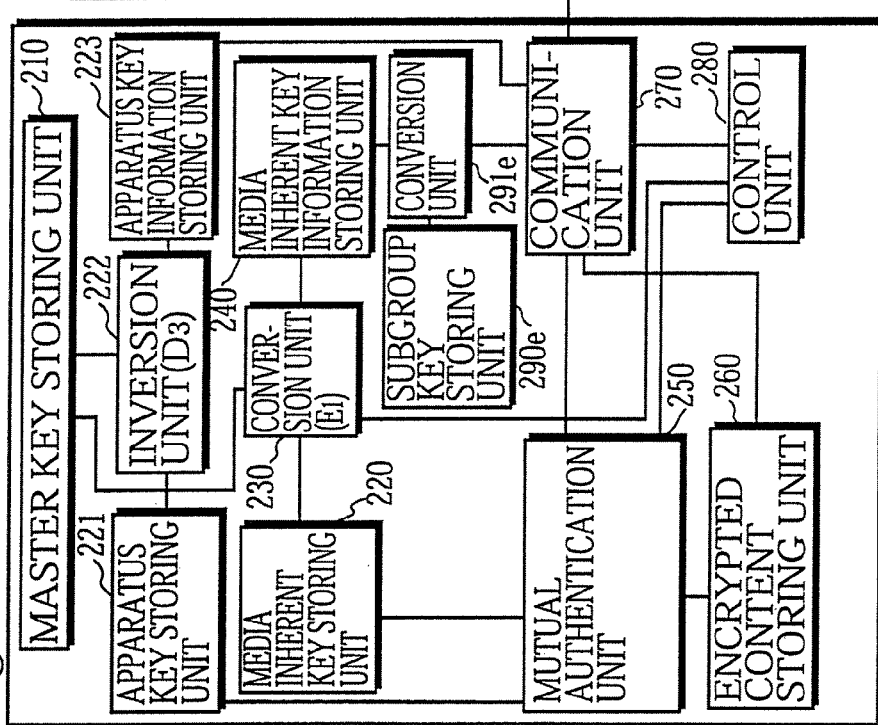

Fig. 29
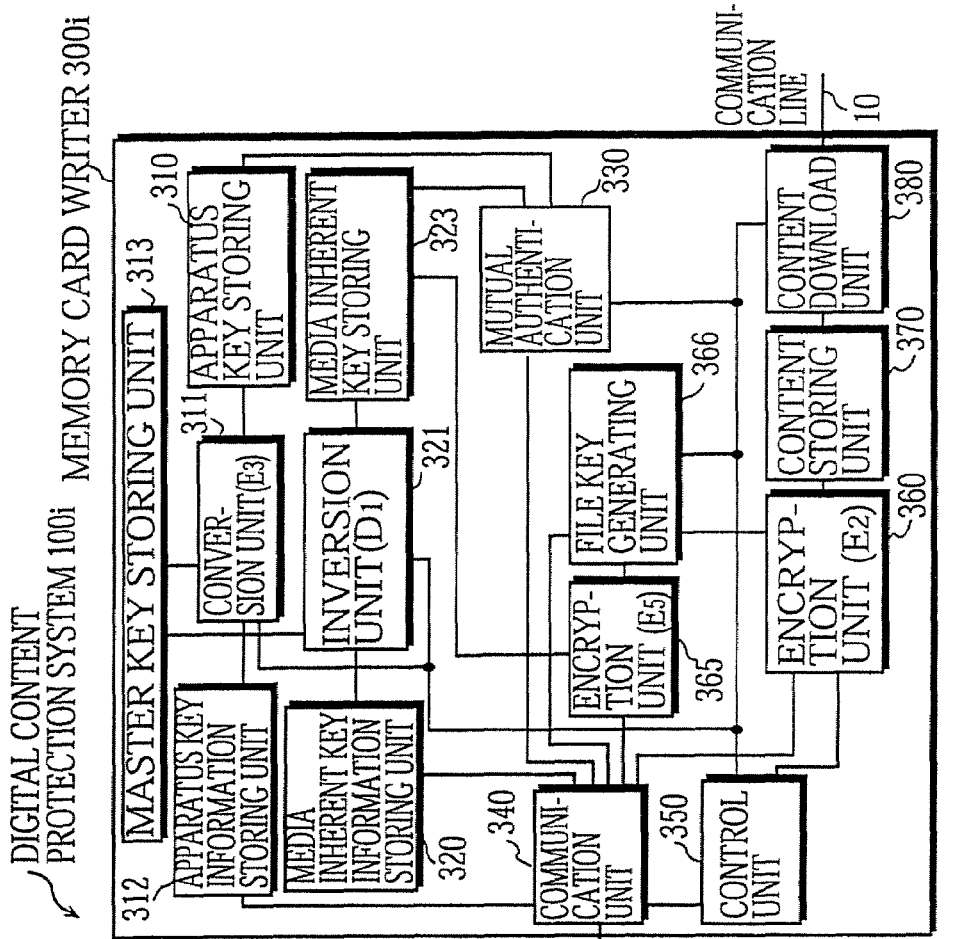
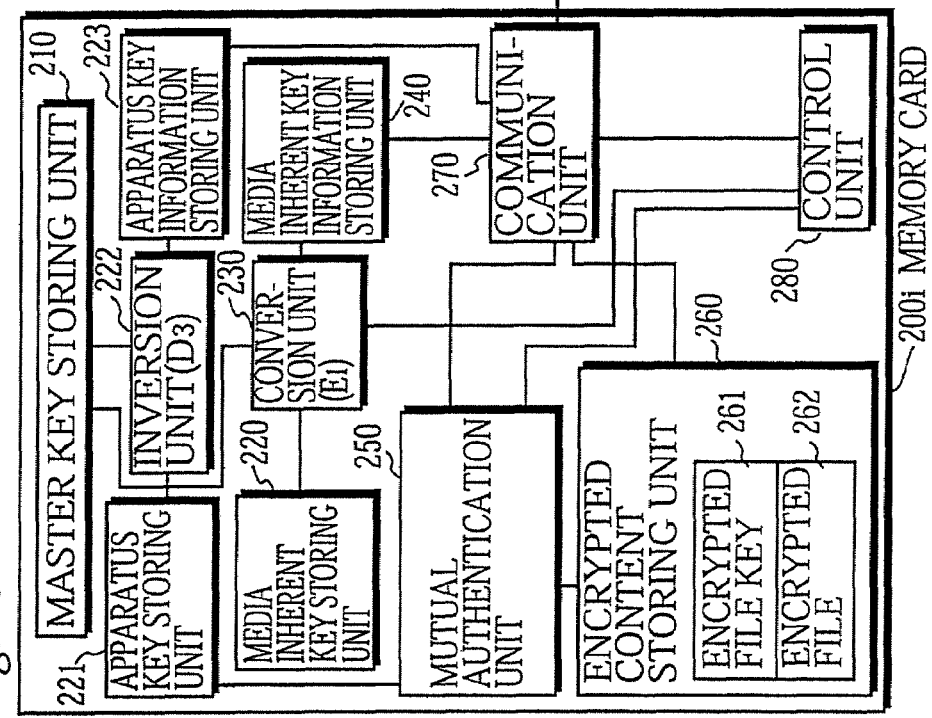

DIGITAL CONTENT PROTECTION SYSTEM

RELATED APPLICATIONS

The present application is a divisional application from application Ser. No. 11/015,252 now U.S. Pat. No. 7,298,845 filed on Dec. 17, 2004 which is a divisional of application Ser. No. 09/419,240 now U.S. Pat. No. 6,859,535 filed on Oct. 15, 1999 and issued on Feb. 22, 2005.

This application is based on applications Nos. H10-295920 and H10-339027 filed in Japan, the content of which is hereby incorporated by reference.

BACKGROUND OF THE INVENTION

1. Field of the Invention

The present invention relates to a system for distributing digital contents, such as digitized documents, audio, images, and programs, via a network to allow users to record the contents on recording media and to reproduce the recorded contents. In particular, the present invention relates to a system for protecting digital contents from unauthorized recording and reproduction.

2. Description of the Related Art

In recent years, techniques for distributing digital contents, such as digitized documents, audio, images, and programs, via networks, such as the Internet, have been devised. The techniques allow users to easily record and reproduce the distributed contents.

While having an advantage that users can easily replicate digital contents, the techniques also have a problem that copyrights owned by authors of the digital contents can be easily infringed.

SUMMARY OF THE INVENTION

The object of the present invention is to provide a digital content protection system, a digital content protection method, a digital content protection program recorded on a recording medium, and a digital content protection program that is sent via a communication line, each of which prevents unauthorized recording of a digital content obtained from the outside onto a recording medium and unauthorized reproduction of a digital content recorded on a recording medium.

The stated object is achieved by a digital content protection system that enables a digital content to be used and includes a recording medium apparatus having a storage area for holding digital content information and an access apparatus that reads information from and writes information into the storage area, the digital content protection system operating according to the following phases: an authentication phase where the recording medium apparatus secretly transmits an inherent key to the access apparatus, and the recording medium apparatus and the access apparatus perform mutual authentication using the inherent key, the inherent key being information that is unique to the recording medium apparatus; and a content transfer phase, performed only when the recording medium apparatus and the access apparatus have successfully authenticated each other, where the access apparatus either (a) encrypts a digital content using the secretly transmitted inherent key and sends the encrypted digital content to the recording medium apparatus or (b) receives an encrypted digital content from the recording medium apparatus and decrypts the encrypted digital content using the secretly transmitted inherent key.

With this construction, the digital content protection system of the present invention prevents the transfer of contents from an authorized apparatus to an unauthorized apparatus. This prevents contents that have been properly obtained from being used without a proper authorization. The transfer of contents from an unauthorized device to an authorized device is also prevented. As a result, the digital content protection system of the present invention prevents illegally obtained contents from being reused.

Here, the recording medium apparatus may include a first calculation unit, and the access apparatus may include a first authentication information generating unit and a first authentication unit, where while the access apparatus judges whether the recording medium apparatus is legitimate in the authentication phase, the first authentication information generating unit generates first authentication information and outputs the first authentication information to the recording medium apparatus, the first calculation unit receives the first authentication information, generates first calculated authentication information by performing a first calculation on the received first authentication information using the inherent key, and outputs the first calculated authentication information to the access apparatus, and the first authentication unit judges whether the recording medium apparatus is legitimate from the first authentication information and the first calculated authentication information using the secretly transmitted inherent key.

Here, the access apparatus may include a second calculation unit, and the recording medium apparatus may include a second authentication information generating unit and a second authentication unit, where while the recording medium apparatus judges whether the access apparatus is legitimate in the authentication phase, the second authentication information generating unit generates second authentication information and outputs the second authentication information to the access medium apparatus, the second calculation unit receives the second authentication information, generates second calculated authentication information by performing a second calculation on the received second authentication information using the secretly transmitted inherent key, and outputs the second calculated authentication information to the recording medium apparatus, and the second authentication unit judges whether the access apparatus is legitimate from the second authentication information and the second calculated authentication information using the inherent key.

With this construction, the recording medium apparatus and the access apparatus perform mutual authentication.

Here, the recording medium apparatus may further include a first encryption unit and an inherent key storing unit for prestoring the inherent key, and the access apparatus may further include a first decryption unit, where while the recording medium apparatus secretly transmits the inherent key to the access apparatus in the authentication phase, the first encryption unit generates an encrypted inherent key by applying a first encryption algorithm to the inherent key and outputs the encrypted inherent key to the access apparatus, and the first decryption unit receives the encrypted inherent key and generates a decrypted inherent key by applying a first decryption algorithm to the encrypted inherent key, the first decryption algorithm being used to decrypt cipher text generated with the first encryption algorithm.

With this construction, because the inherent key is encrypted and is transferred from the recording medium apparatus to the access apparatus, the possibility that the inherent key is uncovered is reduced.

Here, the first key and the second key may be the same master key, and the first decryption unit may decrypt the encrypted inherent key using the second key that is the same as the first key.

With this construction, the recording medium apparatus and the access apparatus store the same master key. As a result, the recording medium apparatus and the access apparatus are produced without difficulty.

Here, the first key may be a public key that is calculated from the second key according to a public key determination algorithm of a public key cryptosystem, the first encryption algorithm may be an encryption algorithm of the public key cryptosystem, and the first decryption algorithm may be a decryption algorithm of the public key cryptosystem, where the first encryption unit encrypts the inherent key according to the encryption algorithm of the public key cryptosystem using the first key that is the public key, and the first decryption unit decrypts the encrypted inherent key according to the decryption algorithm of the public key cryptosystem using the second key.

With this construction, the first key that is a public key differs from the second key that is a secret key. Therefore, even if the secret key stored in a card reader or a card writer is uncovered, it is impossible to obtain the public key from the secret key. This makes it difficult to make the counterfeit of the recording medium apparatus.

Here, the second key may be a public key that is calculated from the first key according to a public key determination algorithm of a recovery signature processing method, the first encryption algorithm may be a signature processing algorithm of the recovery signature processing method, the first encryption unit may generate the encrypted inherent key that is a signature text by applying the first encryption algorithm to the inherent key using the first key, the first decryption algorithm may be a verification processing algorithm of the recovery signature processing method, and the first decryption unit may generate the decrypted inherent key by applying the first decryption algorithm to the encrypted inherent key that is the signature text using the second key.

With this construction, enormous amounts of calculation need to be performed to obtain the secret key Ks from the public key Kp. As a result, it is very difficult to calculate the secret key Ks from the public key Kp. Therefore, the security level of a digital content service system can be enhanced in total by assigning a secret key to a memory card and assigning a public key to a memory card writer or a memory card reader. This is because the memory card writer and the memory card reader generally have the high possibilities that their internal constructions are analyzed, in comparison with the memory card.

Here, the recording medium apparatus may further include: a first master key storing unit for prestoring a first master key group that includes a plurality of master keys; and a first selection unit for selecting a master key out of the first master key group as a first key, and the access apparatus may further include: a second master key storing unit for prestoring a second master key group that includes a plurality of master keys, the first master key group and the second master key group include the same plurality of master keys; and a second selection unit for selecting a master key out of the second master key group as a second key, the second key being the same as the first key, where the first encryption unit encrypts the inherent key using the master key selected as the first key, and the first decryption unit decrypts the encrypted inherent key using the master key selected as the second key.

With this construction, each of the recording medium apparatus and the access apparatus stores a plurality of master keys. Therefore, the digital content protection system of the present invention can be applied to a plurality of digital content service systems.

Here, the first encryption unit may prestore a first subgroup key, generate a transformed key by performing a first conversion on the inherent key using the first subgroup key, and generate the encrypted inherent key by applying the first encryption algorithm to the transformed key, and the first decryption unit may prestore a second subgroup key that is the same as the first subgroup key, generate a decrypted transformed key by applying the first decryption algorithm to the encrypted inherent key, and generate the decrypted inherent key by performing an inversion operation of the first conversion operation on the decrypted transformed key using the second subgroup key.

With this construction, when a digital content service system is run by a plurality of groups, a plurality of subgroup keys whose number is equal to the number of the groups are generated and each of the plurality of subgroup keys is assigned to one of the plurality of groups. This allows each group to provide its own service. Also, in many cases, the number of master keys that can be stored in a memory card is restricted due to the limited storage capacity of the memory card. However, the digital content protection system of the present invention increases the number of available keys by combining a master key and subgroup keys.

Here, the first encryption unit may prestore a first subgroup key, generate a cipher text by applying the first encryption algorithm to the inherent key, and generate the encrypted inherent key by performing a first conversion operation on the cipher text using the first subgroup key, and the first decryption unit may prestore a second subgroup key that is the same as the first subgroup key, generate a decryption text by performing an inverse operation of the first conversion operation on the encrypted inherent key using the second subgroup key, and generate the decrypted inherent key by applying the first decryption algorithm to the decryption text.

With this construction, when a digital content service system is run by a plurality of groups, the digital content protection system of the present invention allows each group to provide its own service in the same manner described above. Also, the digital content protection system of the present invention increases the number of available keys by combining a master key and subgroup keys.

Here, the recording medium apparatus may further include a first key storing unit for prestoring a first key that is a master key, and the access apparatus may further include a second key storing unit for prestoring a second key that is the same master key as the first key, where the first encryption unit prestores a first subgroup key, generates an encrypted first key by performing a first conversion operation on the first key using the first subgroup key, and generates the encrypted inherent key by applying the first encryption algorithm to the inherent key using the encrypted first key, and the first decryption unit prestores a second subgroup key that is the same as the first subgroup key, generates an encrypted second key by performing a second conversion operation, which is the same as the first conversion operation, on the second key using the second subgroup key, and generates the decrypted inherent key by applying the first decryption algorithm to the encrypted inherent key using the encrypted second key.

With this construction, when a digital content service system is run by a plurality of groups, the digital content protection system of the present invention allows each group to provide its own service in the same manner described above. Also, the digital content protection system of the present invention increases the number of available keys by combining a master key and subgroup keys.

Here, the first calculation unit may prestore a first subgroup key, generate a transformed inherent key by performing a first conversion operation on the inherent key using the subgroup key, and generate the first calculated authentication information by performing the first calculation on the first authentication information using the transformed inherent key, and the third calculation unit may prestore a second subgroup key that is the same as the first subgroup key, generate a decrypted transformed inherent key by performing an inversion operation of the first conversion operation on the secretly transmitted inherent key using the subgroup key, and generate the third calculated authentication information by performing a calculation that is the same as the first calculation on the first authentication information using the decrypted transformed inherent key.

With this construction, when a digital content service system is run by a plurality of groups, the digital content protection system of the present invention allows each group to provide its own service in the same manner described above. Also, the digital content protection system of the present invention increases the number of available keys by combining a master key and subgroup keys.

Here, when the recording medium apparatus and the access apparatus have successfully authenticated each other, in the content transfer phase, the access apparatus may either (c) generate at least one data block by dividing a digital content, generate a data block key for each data block, generate at least one encrypted data block by encrypting each data block using the secretly transmitted inherent key and a data block key that corresponds to the data block, and transfer each encrypted data block to the recording medium, or (d) receive at least one encrypted data block of an encrypted digital content from the recording medium apparatus, generate a data block key for each data block, and generate at least one data block by decrypting each encrypted data block using the secretly transmitted inherent key and a data block key that corresponds to the encrypted data block, where each data block has one of a logical length and a physical length, and each encrypted data block has one of a logical length and a physical length.

With this construction, the digital content protection system generates a data block key unique to each data block of a content and encrypts the data block using the data block key. Because this makes it difficult for third parties to intercept data blocks, the digital content protection system of the present invention achieves a high security for the data blocks.

Here, when the recording medium apparatus and the access apparatus have successfully authenticated each other, in the content transfer phase, the access apparatus may either (e) generate a file key for a file of a digital content, generate an encrypted file by encrypting the file using the secretly transmitted inherent key and the file key, and transfer the encrypted file and information concerning the file key to the recording medium, or (f) receive, from the recording medium apparatus, an encrypted file of an encrypted digital content and information concerning a file key that corresponds to the encrypted file, generate a decrypted file by decrypting the encrypted file using the secretly transmitted inherent key and the information concerning the file key, and reproduce the decrypted file.

With this construction, a file key inherent in each file of a content is generated and the files are encrypted using the file keys. Because this makes it difficult for third parties to intercept the files, the digital content protection system of the present invention achieves a high security for the files.

Here, when the recording medium apparatus and the access apparatus have successfully authenticated each other, in the content transfer phase, the access apparatus may either (i) receive a user key from an operator, generates a transformed key from the user key and the secretly transmitted inherent key, generate an encrypted digital content by encrypting a digital content using the transformed key, and transfer the encrypted digital content to the recording medium, or (j) receive an encrypted digital content from the recording medium apparatus, generate a transformed key from a user key inputted from an operator and the secretly transmitted inherent key, and generate a decrypted digital content by decrypting the encrypted digital content using the transformed key.

With this construction, a user encrypts a content and decrypt the encrypted content using a user key set by himself/herself. Therefore, the digital content protection system of the present invention protects a content owned by a user from being decoded by others.

Here, the digital content protection system may further include an encrypted inherent key generation apparatus, where the digital content protection system further operates according to an encrypted inherent key setting phase where the encrypted inherent key generation apparatus generates an encrypted inherent key by encrypting the inherent key sent from the recording medium apparatus and sends the encrypted inherent key to the recording medium apparatus, and the recording medium apparatus holds the encrypted inherent key sent from the encrypted inherent key generation apparatus, where in the authentication phase, the recording medium apparatus sends the encrypted inherent key to the access apparatus, and the access apparatus generates a decrypted inherent key by decrypting the encrypted inherent key secretly sent from the recording medium apparatus and judges whether the recording medium apparatus is legitimate using the decrypted inherent key.

With this construction, the recording medium apparatus does not need to include a conversion unit. As a result, the hardware scale of the recording medium apparatus is reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 19 is a block diagram showing the construction of the digital content protection system 100e of the fifth embodiment;

FIG. 29 is a block diagram showing the construction of the digital content protection system 100i of the ninth embodiment;

DESCRIPTION OF THE PREFERRED EMBODIMENTS

First Embodiment

The following is a description of a digital content protection system 100 of the first embodiment of the present invention.

1. Construction of Digital Content Protection System 100

Figure 1:
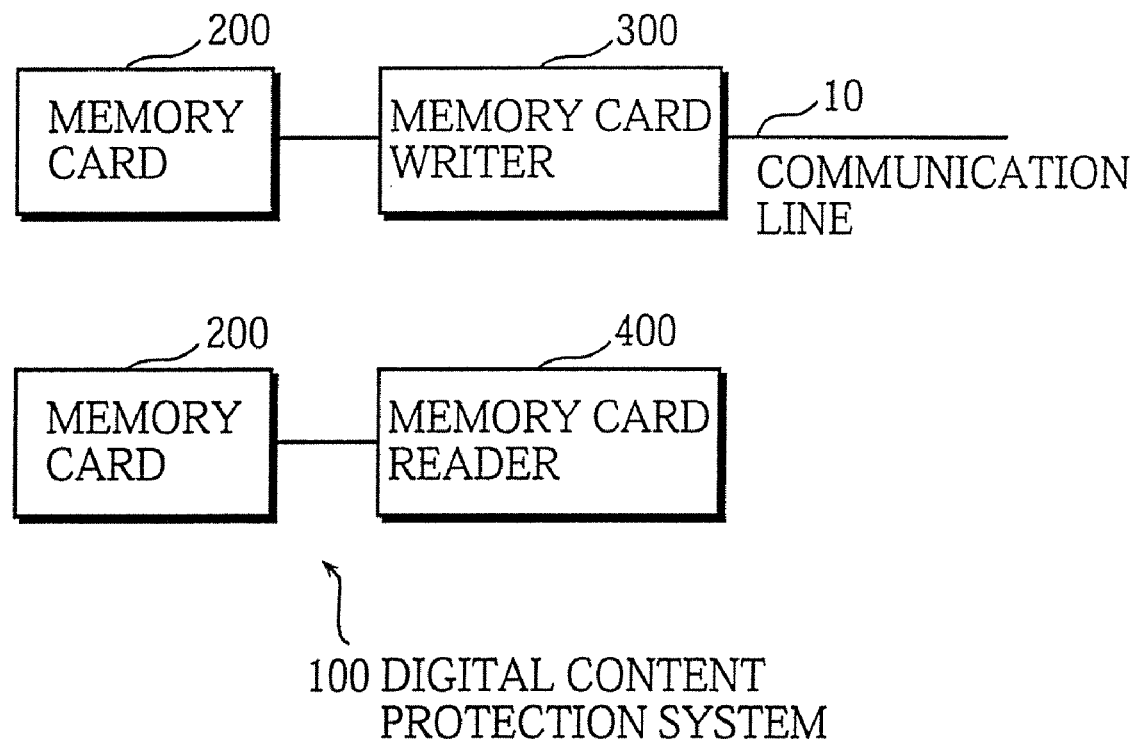
FIG. 1 is a block diagram of the digital content protection system 100 of the first embodiment of the present invention.

The digital content protection system 100 includes a memory card 200, a memory card writer 300, and a memory card reader 400, as shown in FIG. 1.

Figure 2:
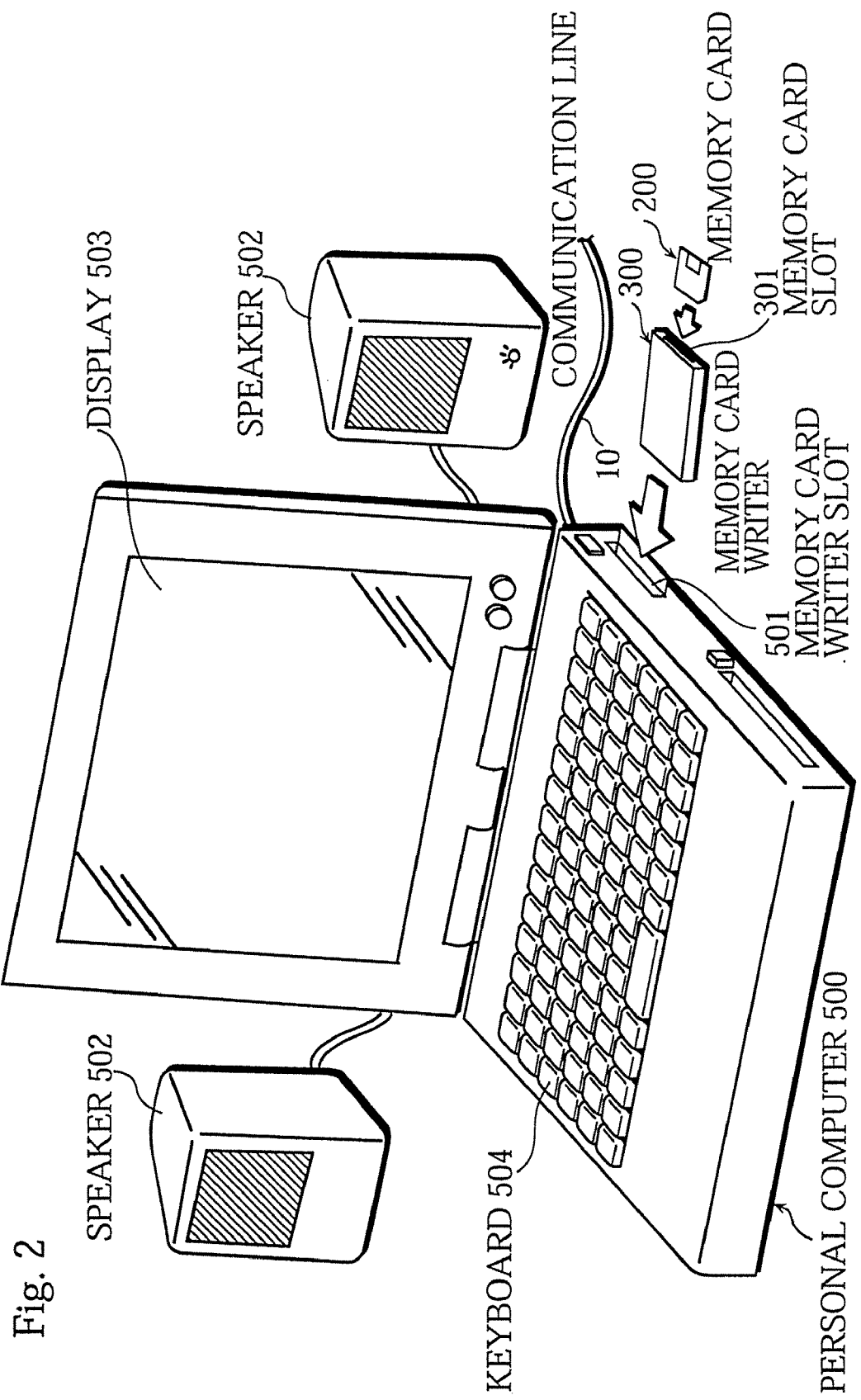
FIG. 2 shows a state where the memory card 200 is placed in the memory card writer 300 and the memory card writer 300 is placed in the personal computer 500.

The memory card 200 is placed in the memory card writer 300 through a memory card slot 301, as shown in FIG. 2. The memory card writer 300 is placed in a personal computer 500 through a memory card writer slot 501. The personal computer 500 is connected to a network, such as the Internet, via a communication line 10. As a result, the memory card writer 300 is connected to the outside through the mediation of the personal computer 500.

The personal computer 500 includes a display 503, a keyboard 504, speakers 502, a processor, a RAM, a ROM, and a hard disc apparatus. The processor, RAM, ROM, and hard disc apparatus are not shown in FIG. 2.

Figure 3:
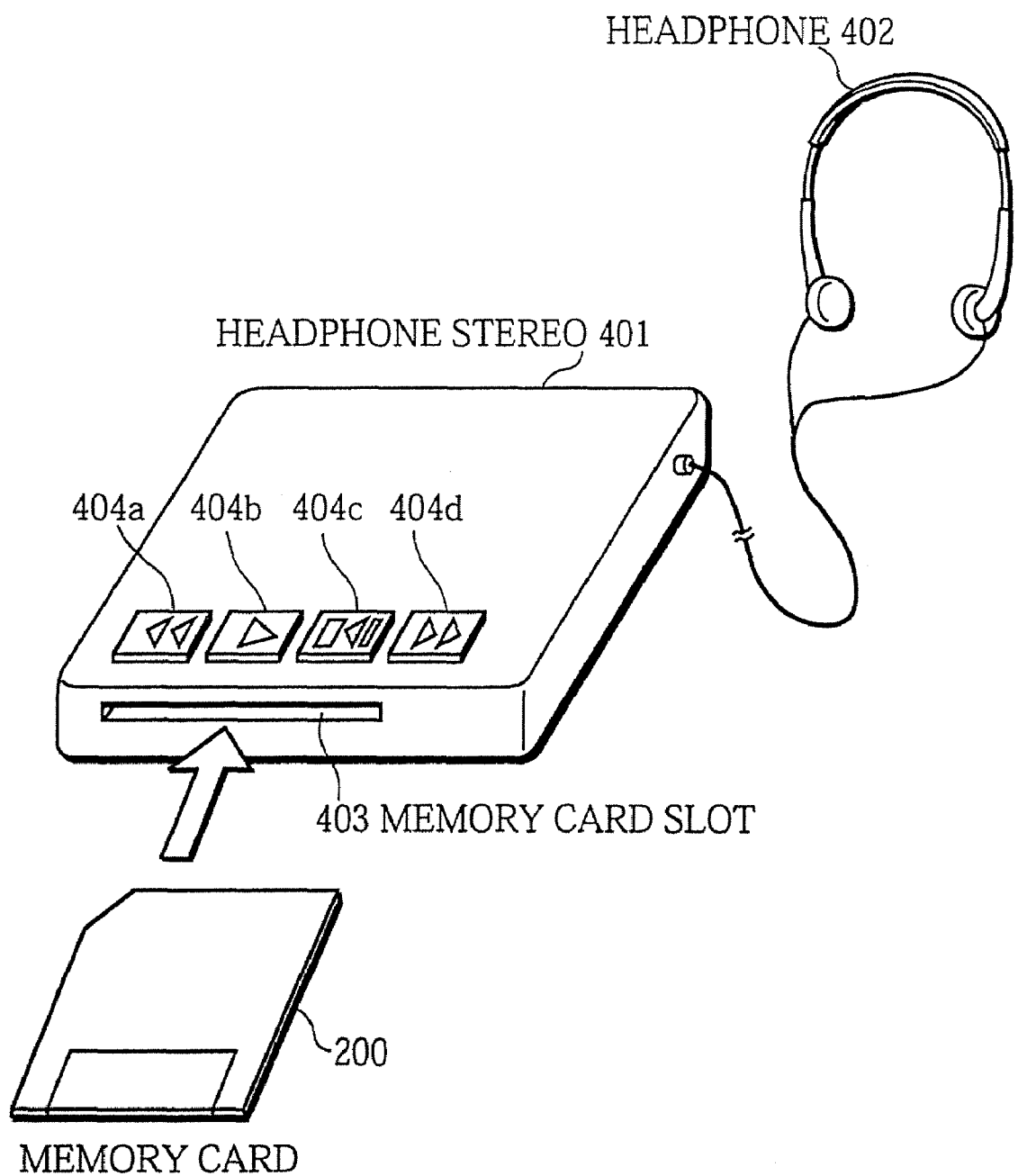
FIG. 3 shows a state where the memory card 200 is placed in the headphone stereo 401 that is the memory card reader 400.

The memory card 200 is placed in the memory card reader 400. As shown in FIG. 3, the memory card 200 is placed in a headphone stereo 401 (the memory card reader 400 in this embodiment) through a memory card slot 403. Buttons 404a, 404b, 404c, and 404d are provided on the top of the headphone stereo 401. Also, the memory card slot is provided on a side of the headphone stereo 401 and a headphone 402 is connected to another side of the headphone stereo 401.

A user places the memory card 200 in the personal computer 500 through the mediation of the memory card writer 300, receives digital contents, such as music data, from the outside via the Internet and records the received contents on the memory card 200. After recording, the user places the memory card 200 in the headphone stereo 401 and reproduces the contents recorded on the memory card 200 using the headphone stereo 401.

1.1 Construction of Memory Card 200

Figure 4:
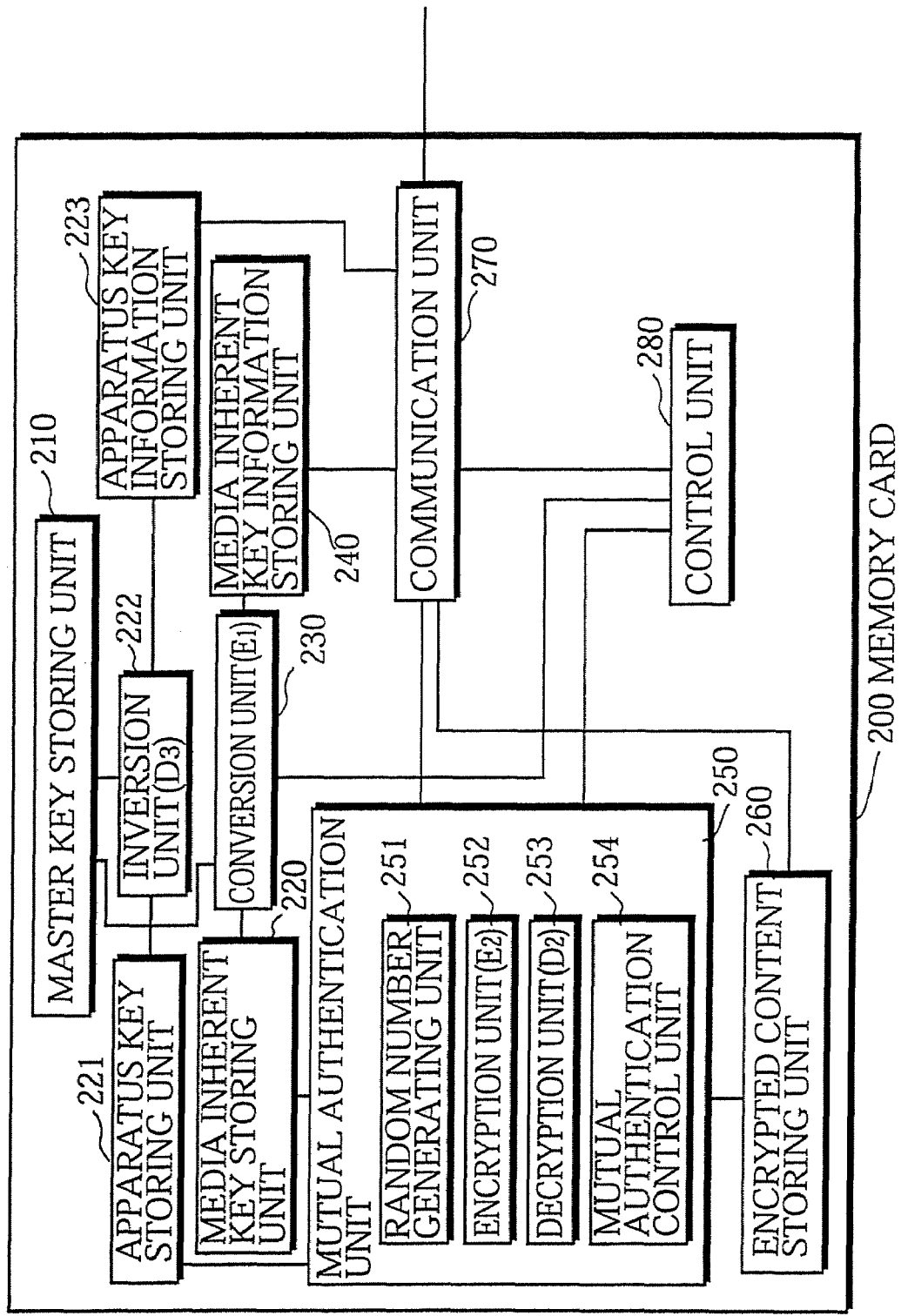
FIG. 4 is a block diagram showing the construction of the memory card 200.

FIG. 4 shows the construction of the memory card 200. As shown in this drawing, the memory card 200 includes a master key storing unit 210, a media inherent key storing unit 220, a conversion unit 230, a media inherent key information storing unit 240, an apparatus key storing unit 221, an inversion unit 222, an apparatus key information storing unit 223, a mutual authentication unit 250, encrypted content storing unit 260, a communication unit 270, and a control unit 280.

When the memory card 200 is placed in the memory card writer 300, the communication unit 270 is connected to a communication unit 340 (described later) of the memory card writer 300.

On the other hand, when the memory card 200 is placed in the memory card reader 400, the communication unit 270 is connected to a communication unit 440 (described later) of the memory card reader 400.

1.1.1 Master Key Storing Unit 210

The master key storing unit 210 includes a semiconductor memory and prestores a master key Mk that is a 56-bit bit string. Different master keys are assigned to respective digital content service systems. Also, the same master key is prestored in the master key storing units of all memory cards for use in a specific digital content service system even if the memory cards are produced by different manufacturers.

Here, the digital content service systems are, for instance, a music delivery system that is cooperatively run by A, B, and C companies and a movie rental system that is cooperatively run by X, Y, and Z companies.

1.1.2 Media Inherent Key Storing Unit 220

The media inherent key storing unit 220 includes a semiconductor memory and prestores an inherent key Ki that is a 56-bit bit string. Different inherent keys are assigned to respective memory cards. The inherent key of each memory card is obtained by performing a given calculation, such as addition, on a production number that is inherent in each memory card and a random number that is randomly generated when each memory card is produced.

1.1.3 Conversion Unit 230

The conversion unit 230 includes a processor, a ROM (Read Only Memory) for storing programs, and a RAM (Random Access Memory) for providing a work area. The conversion unit 230 reads the inherent key Ki from the media inherent key storing unit 220 and reads the master key Mk from the master key storing unit 210.

The conversion unit 230 also prestores an encryption algorithm E1 that conforms to DES (Data Encryption Standard).

Here, the size of each encryption key used for the encryption algorithm E1 is 56 bits. Also, the length of each plain text that is to be encrypted using the encryption algorithm E1 is 64 bits. Furthermore, the length of each cipher text that is generated using the encryption algorithm E1 is 64 bits. It should be noted here that in this specification, the encryption algorithm and the decryption algorithm conform to DES, unless otherwise stated. Also, in this specification, the size of each encryption key is 56 bits, the size of each decryption key is 56 bits, the length of each plain text is 64 bits, and the length of each cipher text is 64 bits.

The conversion unit 230 generates an encrypted inherent key Ji by applying the encryption algorithm E1 to the inherent key Ki read from the media inherent key storing unit 220. Here, the conversion unit 230 uses the master key Mk read from the master key storing unit 210 as the key of the encryption algorithm E1. It should be noted here that in this specification, the encrypted inherent key Ji is expressed by Formula 1 given below.

$$Ji=E1(Mk,Ki) \qquad \text{<Formula 1>}$$

Also, in this specification, the generation of a Cipher text C by applying an encryption algorithm E to a plain text M using a key K is expressed by Formula 2 given below.

$$C=E(K,M) \qquad \text{<Formula 2>}$$

Furthermore, in this specification, the generation of the plain text M by applying a decryption algorithm D to the cipher text C using the key K is expressed by Formula 3 given below.

$$M=D(K,C) \qquad \text{<Formula 3>}$$

As described above, the cipher text C is generated by applying the encryption algorithm E to the plain text M using the key K and the plain text M is generated by applying the decryption algorithm D to the cipher text C using the key K. Therefore, the relation between the encryption algorithm E and the decryption algorithm D can be expressed by Formula 4 given below.

$$E=crpt(D) \qquad \text{<Formula 4>}$$

The conversion unit 230 outputs the encrypted inherent key Ji to the media inherent key information storing unit 240.

1.1.4 Media Inherent Key Information Storing Unit 240

The media inherent key information storing unit 240 includes a semiconductor memory, receives the encrypted inherent key Ji from the conversion unit 230, and holds the encrypted inherent key Ji.

1.1.5 Mutual Authentication Unit 250

The mutual authentication unit 250 includes a random number generating unit 251, an encryption unit 252, a decryption unit 253, and a mutual authentication control unit 254. Each element of the mutual authentication unit 250 includes a processor, a ROM for storing programs, and a RAM for providing a work area.

(1) Random Number Generating Unit 251

The random number generating unit 251 generates a random number R2 that is a 64-bit bit string, and outputs the random number R2 to the communication unit 270 and the mutual authentication control unit 254.

(2) Encryption Unit 252

The encryption unit 252 prestores an encryption algorithm E2 that conforms to DES.

The encryption unit 252 first receives a random number R1 from the communication unit 270 and reads the inherent key Ki from the media inherent key storing unit 220.

The encryption unit 252 then generates an encrypted random number S1 by applying the encryption algorithm E2 on the random number R1 using the inherent key Ki as the key of the encryption algorithm E2. The encrypted random number S1 can be expressed by Formula 5 given below.

$$S1=E2(Ki,R1) \qquad \text{<Formula 5>}$$

The encryption unit 252 finally outputs the encrypted random number S1 to the communication unit 270.

(3) Decryption Unit 253

The decryption unit 253 prestores an decryption algorithm D2 that conforms to DES.

The decryption unit 253 first receives an encrypted random number S2 from the communication unit 270 and reads an apparatus key A'j from the apparatus key storing unit 221.

The decryption unit 253 then generates a random number R'2 by applying the decryption algorithm D2 to the encrypted random number S2 using the apparatus key A'j as the key of the decryption algorithm D2. The generated random number R'2 can be expressed by Formula 6 given below.

$$R'2 = D2(A'j, S2) \qquad \text{< Formula 6 >}$$
$$= D2(A'j, E2(Aj, R2))$$

The decryption unit 253 finally outputs the random number R'2 to the mutual authentication control unit 254.

(4) Mutual Authentication Control Unit 254

The mutual authentication control unit 254 first receives the random number R'2 from the decryption unit 253 and receives the random number R2 from the random number generating unit 251.

The mutual authentication control unit 254 then compares these random numbers. If the random number R'2 matches the random number R2, the mutual authentication control unit 254 judges that the memory card writer 300 or the memory card reader 400 in which the memory card 200 is placed is an authorized device (legitimate); if not, the mutual authentication control unit 254 judges that the memory card writer 300 or the memory card reader 400 is an unauthorized device.

The mutual authentication control unit 254 finally outputs an authentication signal showing whether the memory card writer 300 or the memory card reader 400 is an authorized device to the control unit 280.

1.1.6 Encrypted Content Storing Unit 260

The encrypted content storing unit 260 includes a semiconductor memory, receives encrypted partial contents Fi (where i=1, 2, 3, . . . ) from the communication unit 270, and holds the encrypted partial contents Fi.

1.1.7 Communication Unit 270

The communication unit 270 reads the encrypted inherent key Ji from the media inherent key information storing unit 240 and outputs the encrypted inherent key Ji to the communication unit 340 of the memory card writer 300 or to the communication unit 440 of the memory card reader 400.

The communication unit 270 also receives the random number R1 from the communication unit 340 of the memory card writer 300 or the communication unit 440 of the memory card reader 400 and outputs the random number R1 to the encryption unit 252 of the mutual authentication unit 250.

The communication unit 270 further receives the encrypted random number S1 from the encryption unit 252 and outputs the encrypted random number S1 to the communication unit 340 of the memory card writer 300 or the communication unit 440 of the memory card reader 400.

The communication unit 270 also receives an encrypted apparatus key Bj from the communication unit 340 of the memory card writer 300 or the communication unit 440 of the memory card reader 400 and outputs the encrypted apparatus key Bj to the apparatus key information storing unit 223.

The communication unit 270 also receives the random number R2 from the random number generating unit 251 and outputs the random number R2 to the communication unit 340 of the memory card writer 300 or the communication unit 440 of the memory card reader 400.

The communication unit 270 also receives the encrypted random number S2 from the communication unit 340 of the memory card writer 300 or the communication unit 440 of the memory card reader 400 and outputs the encrypted random number S2 to the decryption unit 253 of the mutual authentication unit 250.

On receiving a communication termination signal from the control unit 280, the communication unit 270 terminates the communication with the communication unit 340 of the memory card writer 300 or the communication unit 440 of the memory card reader 400.

The communication unit 270 also receives the encrypted partial contents Fi (where i=1, 2, 3, . . . ) from the communication unit 340 of the memory card writer 300 and outputs the encrypted partial contents Fi to the encrypted content storing unit 260.

The communication unit 270 furthermore reads the encrypted partial contents Fi from the encrypted content storing unit 260 and outputs the encrypted partial contents Fi to the communication unit 440 of the memory card reader 400.

1.1.8 Apparatus Key Information Storing Unit 223

The apparatus key information storing unit 223 includes a semiconductor memory, receives the encrypted apparatus key Bj from the communication unit 270, and holds the encrypted apparatus key Bj.

1.1.9 Inversion Unit 222

The inversion unit 222 includes a processor, a ROM for storing programs, and a RAM for providing a work area, and prestores a decryption algorithm D3 that conforms to DES.

The inversion unit 222 first reads the encrypted apparatus key Bj from the apparatus key information storing unit 223 and reads the master key Mk from the master key storing unit 210.

The inversion unit 222 then generates the apparatus key A'j by applying the decryption algorithm D3 to the encrypted apparatus key Bj using the master key Mk as a key of the decryption algorithm D3. The generated apparatus key A'j can be expressed by Formula 7 given below.

$$A'j = D3(Mk, Bj) \qquad <\text{Formula 7}>$$
$$= D3(Mk, E3(Mk, Aj))$$

The inversion unit 222 finally outputs the generated apparatus key A'j to the apparatus key storing unit 221.

1.1.10 Apparatus Key Storing Unit 221

The apparatus key storing unit 221 includes a semiconductor memory and holds the apparatus key A'j outputted from the inversion unit 222.

1.1.11 Control Unit 280

The control unit 280 includes a processor, a ROM for storing programs, and a RAM for providing a work area. The control unit 280 receives an authentication signal from the mutual authentication control unit 254. The authentication signal shows whether memory card writer 300 or the memory card reader 400 in which the memory card 200 is placed is an authorized device.

When the authentication signal shows that the memory card writer 300 or the memory card reader 400 is an unauthorized device, the control unit 280 outputs a communication termination signal to the communication unit 270, which then terminates the communication with the memory card writer 300 or the memory card reader 400.

1.2 Construction of Memory Card Writer 300

Figure 5:
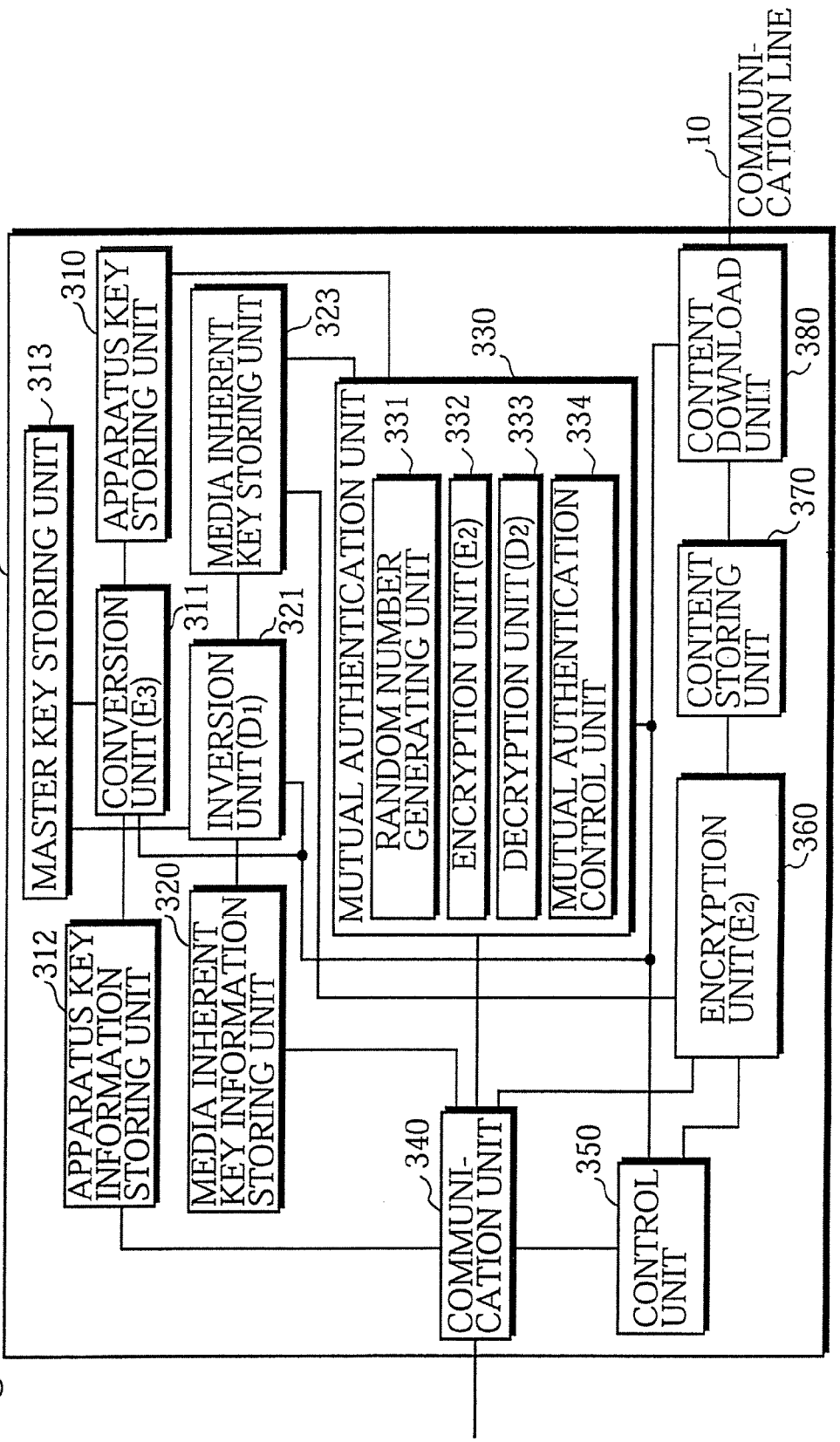
FIG. 5 is a block diagram showing the construction of the memory card writer 300.

FIG. 5 shows the construction of the memory card writer 300. As shown in this drawing, the memory card writer 300 includes an apparatus key storing unit 310, a conversion unit 311, an apparatus key information storing unit 312, a master key storing unit 313, a media inherent key information storing unit 320, an inversion unit 321, a media inherent key storing unit 323, a mutual authentication unit 330, a communication unit 340, a control unit 350, an encryption unit 360, a content storing unit 370, and a content download unit 380.

The content download unit 380 is connected to the outside via the communication line 10.

1.2.1 Apparatus Key Storing Unit 310

The apparatus key storing unit 310 includes a semiconductor memory and prestores an apparatus key Aj that is a 56-bit bit string. Different apparatus keys are assigned to respective memory card writers. The apparatus key of each memory card writer is obtained by performing a given calculation, such as addition, on a production number that is inherent in each memory card writer and a random number that is randomly generated when each memory card writer is produced.

1.2.2 Conversion Unit 311

The conversion unit 311 includes a processor, a ROM for storing programs, a RAM for providing a work area. The conversion unit 311 reads the apparatus key Aj from the apparatus key storing unit 310 and reads the master key Mk from the master key storing unit 313.

The conversion unit 311 also prestores an encryption algorithm E3 that conforms to DES.

The relation between the decryption algorithm D3 prestored in the inversion unit 222 and the encryption algorithm E3 can be expressed by Formula 8 given below.

$$E3 = crpt(D3) \qquad \text{<Formula 8>}$$

The conversion unit 311 generates the encrypted apparatus key Bj by applying the encryption algorithm E3 to the apparatus key Aj read from the apparatus key storing unit 310 using the master key Mk read from the master key storing unit 313 as the key of the encryption algorithm E3. The encrypted apparatus key Bj can be expressed by Formula 9 given below.

$$Bj = E3(Mk, Aj) \qquad \text{<Formula 9>}$$

The conversion unit 311 outputs the encrypted apparatus key Bj to the apparatus key information storing unit 312.

1.2.3 Apparatus Key Information Storing Unit 312

The apparatus key information storing unit 312 includes a semiconductor memory, receives the encrypted apparatus key Bj from the conversion unit 311, and holds the encrypted apparatus key Bj.

1.2.4 Master Key Storing Unit 313

The master key storing unit 313 includes a semiconductor and prestores the master key Mk. This master key Mk is the same as that prestored in the master key storing unit 210 of the memory card 200.

1.2.5 Media Inherent Key Information Storing Unit 320

The media inherent key information storing unit 320 includes a semiconductor, receives the encrypted inherent key Ji from the communication unit 340, and holds the encrypted inherent key Ji.

1.2.6 Inversion Unit 321

The inversion unit 321 includes a processor, a ROM for storing programs, and a RAM for providing a work area. The inversion unit 321 reads the encrypted inherent key Ji from the media inherent key information storing unit 320 and reads the master key Mk from the master key storing unit 313.

The inversion unit 321 prestores a decryption algorithm D1 that conforms to DES.

The relation between the encryption algorithm E1 prestored in the conversion unit 230 of the memory card 200 and the decryption algorithm D1 can be expressed by Formula 10 given below.

$$E1 = crpt(D1) \qquad \text{<Formula 10>}$$

The inversion unit 321 generates an inherent key K'i by applying the decryption algorithm D1 to the encrypted inherent key Ji using the master key Mk as the key of the decryption algorithm D1. The inherent key K'i can be expressed by Formula 11 given below.

$$K'i = D1(Mk, Ji) \qquad \text{<Formula 11>}$$
$$= D1(Mk, E1(Mk, Ki))$$

The inversion unit 321 outputs the inherent key K'i to the media inherent key storing unit 323.

1.2.7 Media Inherent Key Storing Unit 323

The media inherent key storing unit 323 includes a semiconductor, receives the inherent key K'i from the inversion unit 321, and holds the inherent key K'i.

1.2.8 Mutual Authentication Unit 330

The mutual authentication unit 330 includes a random number generating unit 331, an encryption unit 332, a decryption unit 333, and a mutual authentication control unit 334. Each element of the mutual authentication unit 330 includes a processor, a ROM for storing programs, and a RAM for providing a work area.

(1) Random Number Generating Unit 331

The random number generating unit 331 generates the random number R1 that is a 64-bit bit string and outputs the random number R1 to the communication unit 340 and the mutual authentication control unit 334.

(2) Encryption Unit 332

The encryption unit 332 prestores the encryption algorithm E2 that conforms to DES.

The encryption unit 332 first receives the random number R2 from the communication unit 340 and reads the apparatus key Aj from the apparatus key storing unit 310.

The encryption unit 332 then generates the encrypted random number S2 by applying the encryption algorithm E2 to the random number R2 using the apparatus key Aj as the key of the encryption algorithm E2. The encrypted random number S2 can be expressed by Formula 12 given below.

$$S2 = E2(Aj, R2) \qquad \text{<Formula 12>}$$

The encryption unit 332 finally outputs the encrypted random number S2 to the communication unit 340.

(3) Decryption Unit 333

The decryption unit 333 prestores the decryption algorithm D2.

The relation between the encryption algorithm E2 prestored in the encryption unit 252 and the decryption algorithm D2 can be expressed by Formula 13 given below.

$$E2 = crpt(D2) \qquad \text{<Formula 13>}$$

The decryption unit 333 first receives the encrypted random number S1 from the communication unit 340 and reads the inherent key K'i from the media inherent key storing unit 323.

The decryption unit 333 then generates a random number R'1 by applying the decryption algorithm D2 to the encrypted random number S1 using the inherent key K'i as the key of the decryption algorithm D2. The random number R'1 can be expressed by Formula 14 given below.

$$R'1 = D2(K'i, S1) \qquad \text{<Formula 14>}$$
$$= D2(K'i, E2(Ki, R1))$$

The decryption unit 333 finally outputs the random number R'1 to the mutual authentication control unit 334.

(4) Mutual Authentication Control Unit 334

The mutual authentication control unit 334 receives the random number R'1 and the random number R1 from the decryption unit 333 and the random number generating unit 331, respectively.

The mutual authentication control unit 334 then compares the random number R'1 with the random number R1. If the random number R'1 matches the random number R1, the mutual authentication control unit 334 judges that the memory card 200 placed in the memory card writer 300 is an authorized device; if not, the mutual authentication control unit 334 judges that the memory card 200 placed in the memory card writer 300 is an unauthorized device.

After this judgement, the mutual authentication control unit 334 outputs an authentication signal to the control unit 350. The authentication signal shows whether the memory card 200 placed in the memory card writer 300 is an authorized device.

1.2.9 Communication Unit 340

The communication unit 340 receives the encrypted inherent key Ji from the communication unit 270 of the memory card 200 and outputs the encrypted inherent key Ji to the media inherent key information storing unit 320.

The communication unit 340 also receives the random number R1 from the random number generating unit 331 and outputs the random number R1 to the communication unit 270 of the memory card 200.

The communication unit 340 further receives the encrypted random number S1 from the communication unit 270 of the memory card 200 and outputs the encrypted random number S1 to the decryption unit 333 of the mutual authentication unit 330.

The communication unit 340 also reads the encrypted apparatus key Bj from the apparatus key information storing unit 312 and outputs the encrypted apparatus key Bj to the communication unit 270 of the memory card 200.

The communication unit 340 also receives the random number R2 from the communication unit 270 of the memory card 200 and outputs the random number R2 to the encryption unit 332 of the mutual authentication unit 330.

The communication unit 340 also receives the encrypted random number S2 from the encryption unit 332 and outputs the encrypted random number S2 to the communication unit 270 of the memory card 200.

On receiving a communication termination signal from the control unit 350, the communication unit 340 terminates the communication with the communication unit 270 of the memory card 200.

The communication unit 340 further receives the encrypted partial contents Fi (where i=1, 2, 3, . . . ) from the encryption unit 360 and outputs the encrypted partial contents Fi to the communication unit 270 of the memory card 200.

1.2.10 Control Unit 350

The control unit 350 includes a processor, a ROM for storing programs, and a RAM for providing a work area. The control unit 350 receives an authentication signal from the mutual authentication control unit 334. The authentication signal shows whether the memory card 200 placed in the memory card writer 300 is an authorized device.

When the authentication signal shows that the memory card 200 is an unauthorized device, the control unit 350 outputs a communication termination signal to the communication unit 340, which then terminates the communication with the memory card 200.

When the authentication signal shows that the memory card 200 is an authorized device, the control unit outputs a download signal to the content download unit 380, which then downloads contents from the outside.

1.2.11 Content Download Unit 380

The content download unit 380 receives a download signal from the control unit 350.

After receiving the download signal from the control unit 350, the content download unit 380 downloads music data from the outside via the communication line 10 and outputs the music data to the content storing unit 370.

It should be noted here that in this embodiment, music data is downloaded. However, other contents, such as document, image, and movie data, may be downloaded.

1.2.12 Content Storing Unit 370

The content storing unit 370 includes a semiconductor memory, receives contents from the content download unit 380, and holds the contents.

1.2.13 Encryption Unit 360

The encryption unit 360 includes a processor, a ROM for storing programs, and a RAM for providing a work area. The encryption unit 360 also prestores the encryption algorithm E2 that conforms to DES.

The encryption unit 360 first reads a content from the content storing unit 370 and reads the inherent key K'i from the media inherent key storing unit 323.

The encryption unit 360 then divides the content read from the content storing unit 370 into a plurality of partial contents $C_i$ (i=1, 2, 3, . . . ) which each is a 64-bit bit string and generates a plurality of encrypted partial contents Fi (i=1, 2, 3, . . . ) by applying the encryption algorithm E2 to each partial content Ci using the inherent key K'i read from the media inherent key storing unit 323 as the key of the encryption algorithm E2. The plurality of encrypted partial contents Fi can be expressed by Formula 15 given below.

$$Fi=E2(K'i,Ci) \text{ (where } i=1, 2, 3, \ldots )$$ <Formula 15>

The encryption unit 360 finally outputs the encrypted partial contents Fi to the communication unit 340.

1.3 Construction of Memory Card Reader 400

Figure 6:
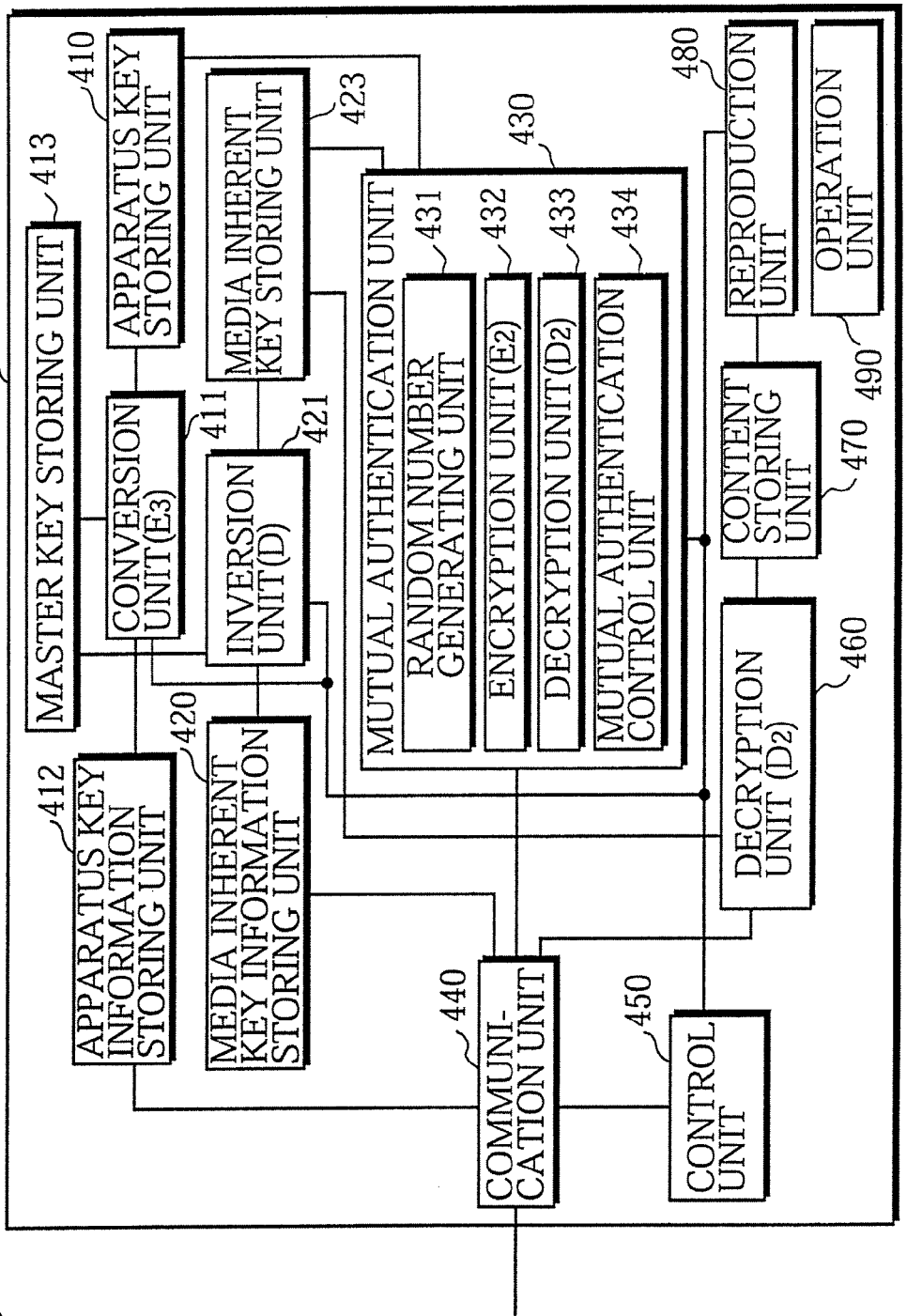
FIG. 6 is a block diagram showing the construction of the memory card reader 400.

FIG. 6 shows the construction of the memory card reader 400. As shown in this drawing, the memory card reader 400 includes an apparatus key storing unit 410, a conversion unit 411, an apparatus key information storing unit 412, a master key storing unit 413, a media inherent key information storing unit 420, an inversion unit 421, a media inherent key storing unit 423, a mutual authentication unit 430, a communication unit 440, a control unit 450, a decryption unit 460, a content storing unit 470, a reproduction unit 480, and an operation unit 490.

The apparatus key storing unit 410, the conversion unit 411, the apparatus key information storing unit 412, the master key storing unit 413, the media inherent key information storing unit 420, the inversion unit 421, the media inherent key storing unit 423, the mutual authentication unit 430, and the communication unit 440 of the memory card reader 400 are respectively the same as the apparatus key storing unit 310, the conversion unit 311, the apparatus key information storing unit 312, the master key storing unit 313, the media inherent key information storing unit 320, the inversion unit 321, the media inherent key storing unit 323, the mutual authentication unit 330, and the communication unit 340 of the memory card writer 300. Therefore, the following description omits these elements and centers on the elements that have the different functions and perform the different operations.

1.3.1 Control Unit 450

The control unit 450 receives an authentication signal and, when the authentication signal shows that the memory card 200 placed in the memory card reader 400 is an authorized device, outputs a decryption signal to the decryption unit 460, which then decrypts the encrypted content received from the communication unit 440.

1.3.2 Decryption Unit 460

The decryption unit 460 prestores the decryption algorithm D2 that conforms to DES, and receives a decryption signal from the control unit 450.

On receiving a decryption signal from the control unit 450, the decryption unit 460 receives an encrypted content from the communication unit 440 and reads the inherent key K'i from the media inherent key storing unit 423.

The decryption unit 460 then divides the encrypted content into a plurality of partial encrypted contents Gi (i=1, 2, 3, . . . ) which each are a 64-bit bit string and generates a plurality of partial contents Hi (i=1, 2, 3, . . . ) by applying the decryption algorithm D2 to each partial encrypted contents Gi using the inherent key K'i read from the media inherent key storing unit 423 as the key of the decryption algorithm D2. The generated partial contents Hi can be expressed by Formula 16 given below.

$$Hi=D2(K'i,Gi) \text{ (where } i=1, 2, 3, \ldots \text{)} \qquad \text{<Formula 16>}$$

The decryption unit 460 finally outputs the generated partial contents Hi to the content storing unit 470.

1.3.3 Content Storing Unit 470

The content storing unit 470 receives the partial contents Hi from the decryption unit 460 and holds the partial contents Hi.

1.3.4 Operation Unit 490

The operation unit 490 includes a plurality of buttons for allowing a user to input various instructions.

When the user pushes a button, the operation unit 490 outputs a signal corresponding to the pushed button to the reproduction unit 480.

1.3.5 Reproduction Unit 480

The reproduction unit 480 receives a signal corresponding to the button pushed by the user from the operation unit 490.

After receiving the signal, the reproduction unit 480 reads the music data from the content storing unit 470 and reproduces the music data.

2. Operation of Digital Content Protection System 100

The following is a description of the operation of the digital content protection system 100.

2.1 Operation Outline in the Case where Memory Card 200 is Placed in Memory Card Writer 300

The operation outline in the case where the memory card 200 is placed in the memory card writer 300 is described below with reference to the flowchart shown in FIG. 7.

After the memory card 200 is placed in the memory card writer 300, the memory card writer 300 judges whether the memory card 200 is an authorized device (step S110). When the memory card writer 300 judges that the memory card 200 is an unauthorized device (step S111), the memory card writer 300 does not communicate with the memory card 200 and terminates the operation.

When the memory card writer 300 judges that the memory card 200 is an authorized device (step S111), the memory card 200 whether the memory card writer 300 is an authorized device (step S112). When the memory card 200 judges that the memory card writer 300 is an unauthorized device (step S113), the memory card 200 does not communicate with the memory card writer 300 and terminates the operation.

When the memory card 200 judges that the memory card writer 300 is an authorized device (step S113), the memory card writer 300 downloads a content from the outside, encrypts the downloaded content, and outputs the encrypted content to the memory card 200 (step S114). The memory card 200 holds the encrypted content (step S115).

2.2 Operation Outline in the Case where Memory Card 200 is Placed in Memory Card Reader 400

The operation outline in the case where the memory card 200 is placed in the memory card reader 400 is described below with reference to the flowchart shown in FIG. 8.

After the memory card 200 is placed in the memory card reader 400, the memory card reader 400 judges whether the memory card 200 is an authorized device (step S120). When the memory card reader 400 judges that the memory card 200 is an unauthorized device (step S121), the memory card reader 400 does not communicate with the memory card 200 and terminates the operation.

When the memory card reader 400 judges that the memory card 200 is an authorized device (step S121), the memory card 200 judges whether the memory card reader 400 is an authorized device (step S122). When the memory card 200 judges that the memory card reader 400 is an unauthorized device (step S123), the memory card 200 does not communicate with the memory card reader 400 and terminates the operation.

When the memory card 200 judges that the memory card reader 400 is an authorized device (step S123), the memory card 200 outputs encrypted contents to the memory card reader 400 (step S124). The memory card reader 400 decrypts the encrypted contents outputted from the memory card 200 (step S125) and reproduces the decrypted contents (step S126).

2.3 Authentication Operation in the Case where Memory Card 200 is Placed in Memory Card Writer 300

The authentication operation in the case where the memory card 200 is placed in the memory card writer 300 is described in detail below with reference to FIGS. 9 and 10.

The conversion unit 230 generates the encrypted inherent key E1 (Mk,Ki) by applying the encryption algorithm E1 to the inherent key Ki using the master key Mk as the key of the encryption algorithm E1 (step S130). The communication unit 270 outputs the encrypted inherent key E1 (Mk,Ki) to the inversion unit 321 via the communication unit 340 (step S131). The inversion unit 321 generates the inherent key K'i=D1 (Mk,E1(Mk,Ki)) by applying the decryption algorithm D1 to the encrypted inherent key E1 (Mk,Ki) using the master key Mk as the key of the decryption algorithm D1 (step S132). The random number generating unit 331 generates the random number R1 (step S133). The communication unit 340 outputs the generated random number R1 to the encryption unit 252 via the communication unit 270 (step S134). The encryption unit 252 generates the encrypted random number E2 (Ki,R1) by applying the encryption algorithm E2 to the random number R1 using the inherent key Ki as the key of the encryption algorithm E2 (step S135). The communication unit 270 outputs the encrypted random number E2 (Ki,R1) to the decryption unit 333 via the communication unit 340 (step S136). The decryption unit 333 generates D2 (K'i,E2(Ki,R1)) by applying the decryption algorithm D2 to the encrypted random number E2 (Ki,R1) using the inherent key K'i as the key of the decryption algorithm D2 (step S137). The mutual authentication control unit 334 compares the random number R1 with D2 (K'i,E2(Ki,R1)). If the random number R1 matches D2 (K'i,E2(Ki,R1)), the mutual authentication control unit 334 judges that the memory card 200 is an authorized device; if not, the mutual authentication control unit judges that the memory card 200 is an unauthorized device (step S138).

The conversion unit 311 generates the encrypted apparatus key E3 (Mk,Aj) by applying the encryption algorithm E3 to the apparatus key Aj using the master key Mk as the key of the encryption algorithm E3 (step S139). The communication unit 340 outputs the encrypted apparatus key E3 (Mk,Aj) to the inversion unit 222 via the communication unit 270 (step S140). The inversion unit 222 generates the apparatus key A'j=D3 (Mk,E3(Mk,Aj)) by applying the decryption algorithm D3 to the encrypted apparatus key E3 (Mk,Aj) using the master key Mk as the key of the decryption algorithm D3 (step S141). The random number generating unit 251 generates the random number R2 (step S142). The communication unit 270 outputs the generated random number R2 to the encryption unit 332 via the communication 340 (step S143). The encryption unit 332 generates the encrypted random number E2 (Aj,R2) by applying the encryption algorithm E2 to the random number R2 using the apparatus key Aj as the key of the encryption algorithm E2 (step S144). The communication unit 340 outputs the encrypted random number E2 (Aj,R2) to the decryption unit 253 via the communication unit 270 (step S145). The decryption unit 253 generates D2 (A'j,E2(Aj,R2)) by applying the decryption algorithm D2 to the encrypted random number E2 (Aj,R2) using the apparatus key A'j as the key of the decryption algorithm D2 (step S146). The mutual authentication control unit 254 compares the random number R2 with D2 (A'j,E2(Aj,R2)). If the random number R2 matches D2 (A'j,E2(Aj,R2)), the mutual authentication control unit 254 judges that the memory card writer 300 is an authorized device; if not, the mutual authentication control unit 254 judges that the memory card writer 300 is an unauthorized device (step S147).

2.4 Conclusion

As described above, a recording medium device, such as a memory card, that includes an area for holding encrypted digital contents is connected to an access device, such as a memory card writer or a memory card reader, that writes information into or reads information from the area of the recording medium device. Each of these devices then judges whether the other device is an authorized devices. Only if both of these devices judge that the other device is an authorized device, contents are transferred between these devices. With this construction, an authorized device does not transfer contents to an unauthorized device. This prevents contents that have been properly downloaded from being used without a proper authorization. Also, an unauthorized device cannot transfer contents to an authorized device, which prevents illegally obtained contents from being reused. As a result, the digital content protection system of the present embodiment performs a very secure authentication process which prevents replay attacks by an unauthorized recording medium device that imitates the authentication procedure performed by an authorized access device. Also, the present digital content protection system prevents an unauthorized device from circumventing an authorized device to read or to write contents without proper authorization.

The recording medium device encrypts its inherent key using a master key and sends the encrypted inherent key to the access device. The access device generates authentication information, which is to say a random number, and sends the authentication information to the recording medium device. The recording medium device encrypts the authentication information using the inherent key and sends the encrypted authentication information to the access device. The access device decrypts the encrypted inherent key using the master key, decrypts the encrypted authentication information using the decrypted inherent key, and judges whether the recording medium device is an authorized device by comparing the original authentication information with the decrypted authentication information. If the original authentication information matches the decrypted authentication information, the access device judges that the recording medium device is an authorized device. This process is also performed when the recording medium device judges whether the access device is an authorized device. Therefore, each of these devices can judge whether the other device is an authorized device. During the authentication process, three information transfers, that is, the transfer of encrypted inherent key, the transfer of authentication information, and the transfer of encrypted authentication information, are performed between these devices. These information transfers make it difficult for an unauthorized device to imitate the authentication procedure. Also, the present digital content protection system performs two types of encryptions, that is, the encryption of the inherent key and the encryption of the authentication information. These encryptions make it difficult for an unauthorized device to decrypt the encrypted information. Furthermore, because the master key is not transferred between the devices, the leakage of the master key is prevented.

3. Second Embodiment

The digital content protection system 100a of the second embodiment is described below.

3.1 Digital Content Protection System 100a

Figure 11:
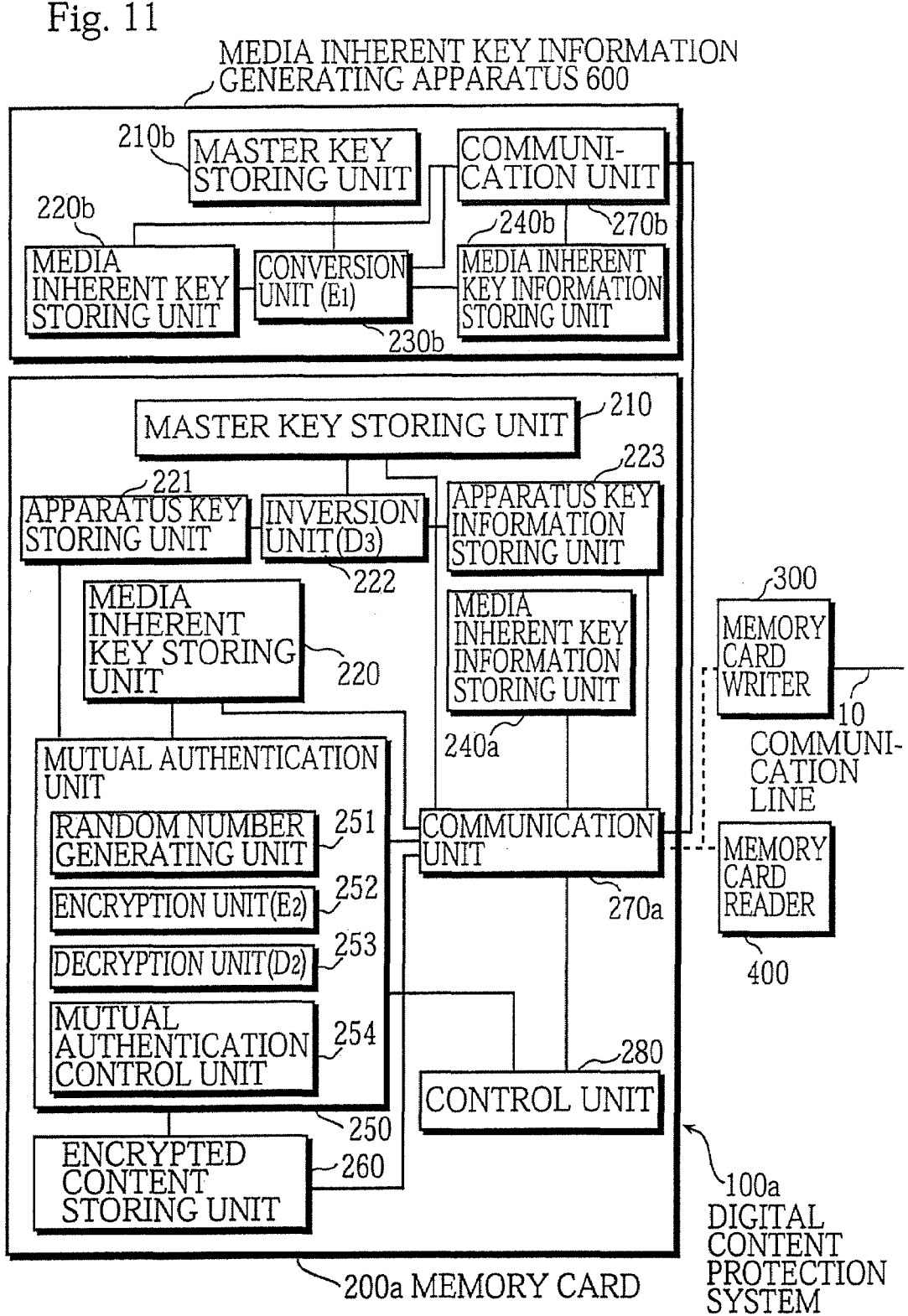
FIG. 11 is a block diagram showing the construction of the digital content protection system 100a of the second embodiment.

FIG. 11 is a block diagram showing the construction of the digital content protection system 100a of the second embodiment. As shown in this drawing, the digital content protection system 100a includes a memory card 200a, a media inherent key information generating device 600, the memory card writer 300, and the memory card reader 400.

The memory card writer 300 and the memory card reader 400 of the present system are respectively the same as those of the digital content protection system 100 and are not described here.

The memory card 200a is connected to the media inherent key information generating device 600.

3.1.1 Media Inherent Key Information Generating Device 600

The media inherent key information generating device 600 includes a master key storing unit 210b, a media inherent key storing unit 220b, a conversion unit 230b, a media inherent key information storing unit 240b, and a communication unit 270b.

The master key storing unit 210b, the media inherent key storing unit 220b, the conversion unit 230b, and the media inherent key information storing unit 240b are respectively similar to the master key storing unit 210, the media inherent key storing unit 220, the conversion unit 230, and the media inherent key information storing unit 240 of the memory card 200. Therefore, the following description centers on the different aspects of these elements.

(1) Master Key Storing Unit 210b

The master key storing unit 210b prestores the master key Mk, like the master key storing unit 210.

(2) Media Inherent Key Storing Unit 220b

The media inherent key storing unit 220b receives the inherent key Ki from the communication unit 270b and holds the inherent key Ki.

(3) Conversion Unit 230b

The conversion unit 230b, in the same manner as the conversion unit 230, generates the encrypted inherent key Ji using the inherent key Ki held in the media inherent key storing unit 220b and the master key Mk prestored in the master key storing unit 210b. The conversion unit 230b then outputs the encrypted inherent key Ji to the media inherent key information storing unit 240b.

(4) Media Inherent Key Information Storing Unit 240b

The media inherent key information storing unit 240b receives the encrypted inherent key Ji from the conversion unit 230b and holds the encrypted inherent key Ji.

(5) Communication Unit 270b

The communication unit 270b receives the inherent key Ki from the communication unit 270a of the memory card 200a and outputs the inherent key Ki to the media inherent key storing unit 220b.

Also, the communication unit 270b reads the encrypted inherent key Ji from the media inherent key information storing unit 240b and outputs the encrypted inherent key Ji to the communication unit 270a of the memory card 200a.

3.1.2 Memory Card 200a

As shown in FIG. 11, the memory card 200a includes a master key storing unit 210, a media inherent key storing unit 220, a media inherent key information storing unit 240a, an apparatus key storing unit 221, an inversion unit 222, an apparatus key information storing unit 223, a mutual authentication unit 250, an encrypted content storing unit 260, a communication unit 270a, and a control unit 280.

The master key storing unit 210, the media inherent key storing unit 220, the apparatus key storing unit 221, the inversion unit 222, the apparatus key information storing unit 223, the mutual authentication unit 250, the encrypted content storing unit 260, and the control unit 280 of the memory card 200a are respectively the same as those of the memory card 200 and are not described here. Therefore, the following description centers on the media inherent key information storing unit 240a and the communication unit 270a that are different from the media inherent key information storing unit 240 and the communication unit 270 of the memory card 200.

(1) Media Inherent Key Information Storing Unit 240a

The media inherent key information storing unit 240a receives the encrypted inherent key Ji from the communication unit 270a and holds the encrypted inherent key Ji.

(2) Communication Unit 270a

The communication unit 270a reads the inherent key Ki from the media inherent key storing unit 220 and outputs the inherent key Ki to the communication unit 270b of the media inherent key information generating device 600.

Also, the communication unit 270a receives the encrypted inherent key Ji from the communication unit 270b of the media inherent key information generating device 600 and outputs the encrypted inherent key Ji to the media inherent key information storing unit 240a.

3.1.3 Operation in the Case where Memory Card 200a is Placed in Media Inherent Key Information Generating Device 600

The operation in the case where the memory card 200a is placed in the media inherent key information generating device 600 is described below with reference to FIG. 12.

When the memory card 200a is placed in the media inherent key information generating device 600, the communication unit 270a reads the inherent key Ki from the media inherent key storing unit 220 and outputs the inherent key Ki to the media inherent key storing unit 220b via the communication unit 270b of the media inherent key information generating device 600 (step S211). The conversion unit 230b generates the encrypted inherent key Ji using the inherent key Ki held in the media inherent key storing unit 220b and the master key Mk prestored in the master key storing unit 210b, and outputs the encrypted inherent key Ji to the media inherent key information storing unit 240b (step S212). The communication unit 270b reads the encrypted inherent key Ji from the media inherent key information storing unit 240b and outputs the encrypted inherent key Ji to the media inherent key information storing unit 240a via the communication unit 270a of the memory card 200a (step S213).

3.1.4 Authentication Operation in the Case where Memory Card 200a is Placed in Memory card Writer 300

The authentication operation in the case where the memory card 200a is placed in the memory card writer 300 is described in detail below with reference to FIG. 12. The following description centers on the different steps between the authentication operations shown in FIG. 9 and FIG. 12.

Figure 9:
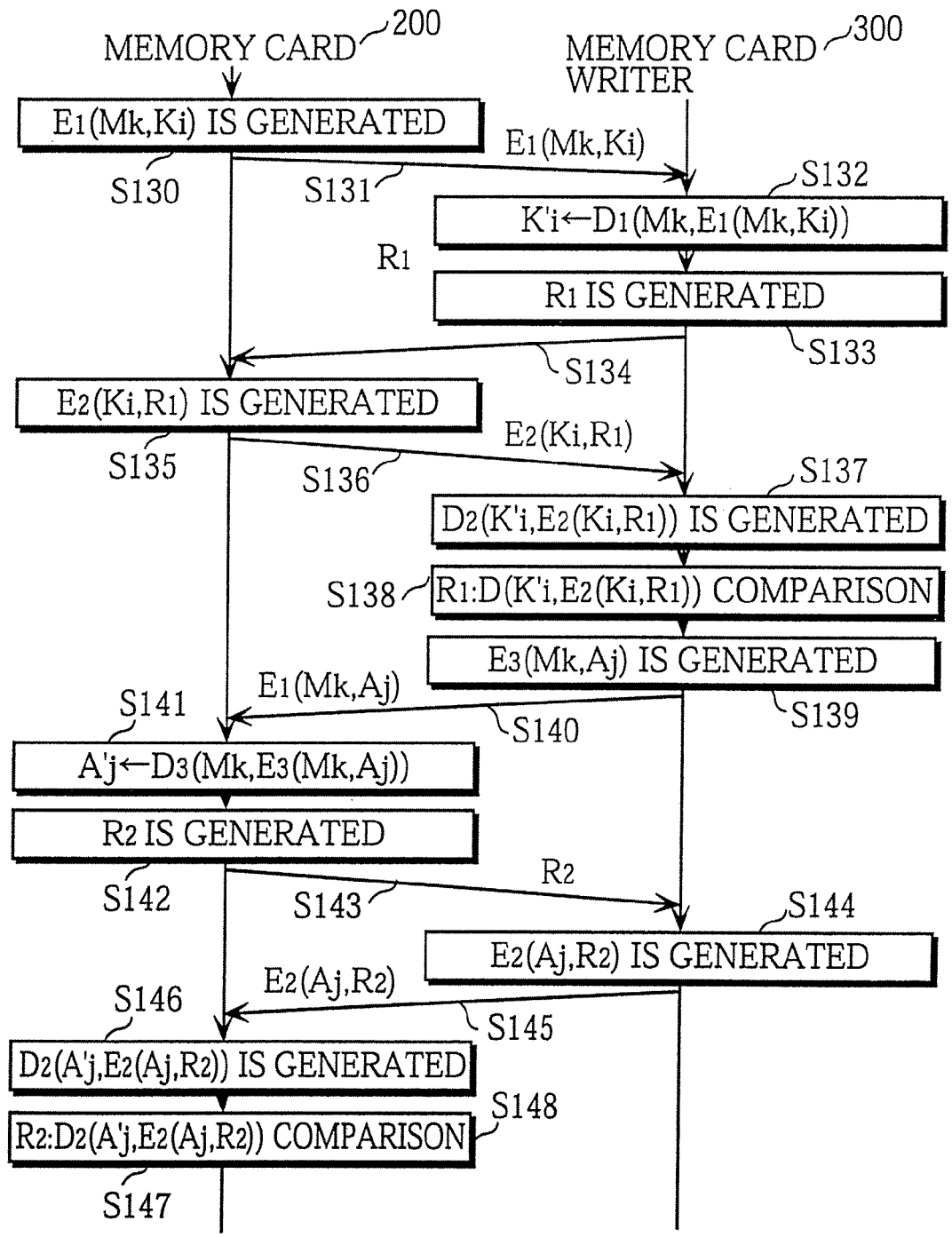
FIG. 9 shows the authentication operation in the case where the memory card 200 is placed in the memory card writer 300.
Figure 12:
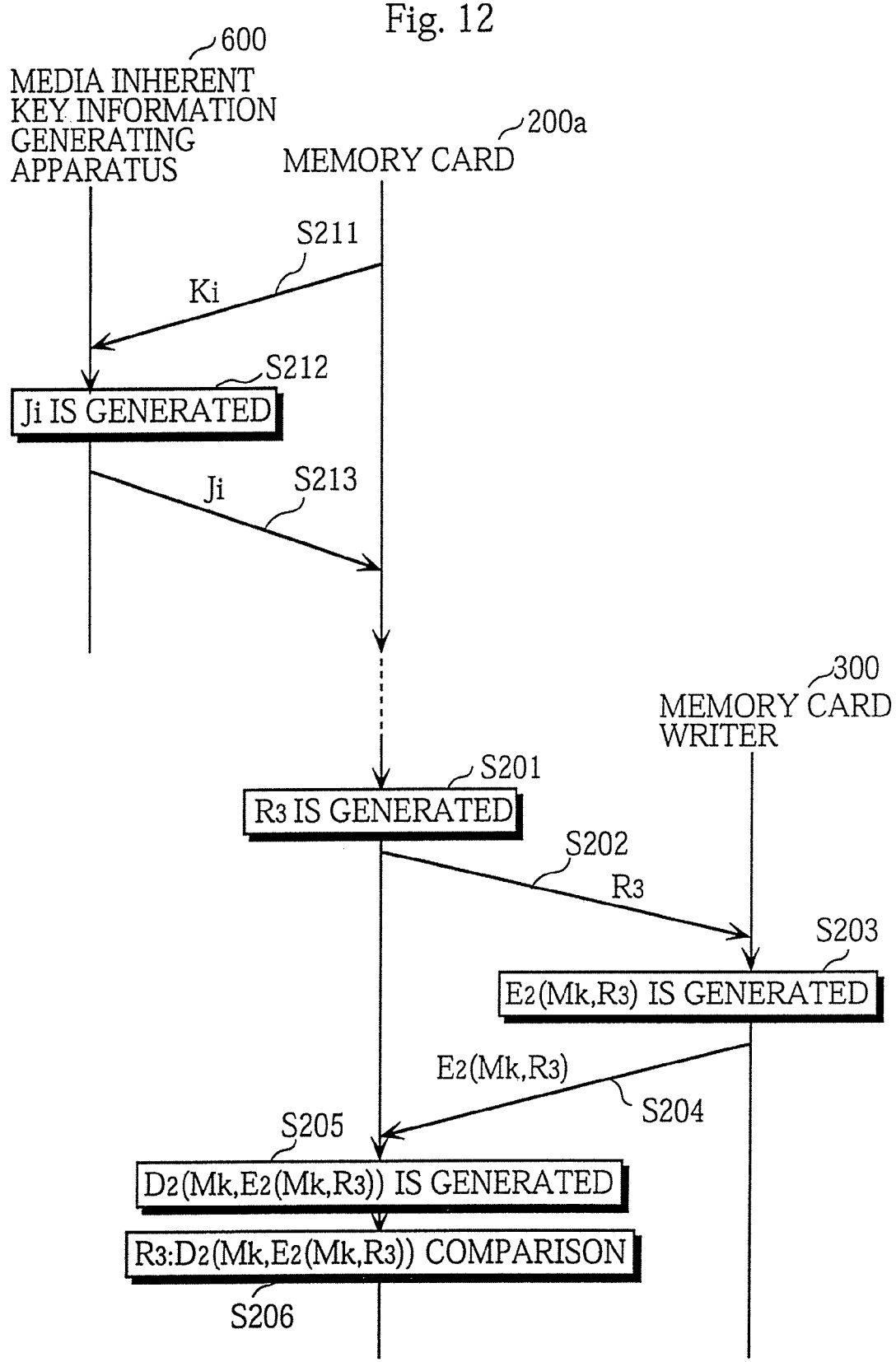
FIG. 12 shows the authentication operations in the case where the memory card 200a is placed in the media inherent key information generating device 600 and in the case where the memory card 200a is placed in the memory card writer 300.

The authentication operation shown in FIG. 12 includes steps S201-S206, instead of steps S139-S147 in the authentication operation shown in FIG. 9.

After the random number generating unit 251 generates a random number R3 (steps S201), the communication unit 270a outputs the generated random number R3 to the encryption unit 332 via the communication 340 (step S202). The encryption unit 332 generates the encrypted random number E2 (Mk,R3) by applying the encryption algorithm E2 to the random number R3 using the master key Mk as the key of the encryption algorithm E2 (step S203). The communication unit 340 outputs the encrypted random number E2 (Mk,R3) to the decryption unit 253 via the communication unit 270 (step S204). The decryption unit 253 generates D2 (Mk,E2(Mk, R3)) by applying the decryption algorithm D2 to the encrypted random number E2 (Mk,R3) using the master key Mk as the key of the decryption algorithm D2 (step S205). The mutual authentication control unit 254 compares the random number R3 with D2 (Mk,E2(Mk,R3)). If the random number R3 matches D2 (Mk,E2(Mk,R3)), the mutual authentication control unit 254 judges that the memory card writer 300 is an authorized device; if not, the mutual authentication control unit 254 judges that the memory card writer 300 is an unauthorized device (step S206).

3.1.5 Conclusion

In the second embodiment, before distributed or sold to a user, the memory card 200a is connected to the media inherent key information generating device 600, the media inherent key information generating device 600 generates the encrypted inherent key Ji, the encrypted inherent key Ji is written into the memory card 200a.

Accordingly, the memory card 200a does not need to include the conversion unit 230 that is included in the memory card 200. As a result, the hardware scale of the memory card 200a is reduced, in comparison with the memory card 200.

When judging whether an access device is an authorized device, a recording medium device generates authentication information, which is to say a random number, and transfers the authentication information to the access device. After receiving the authentication information, the access device encrypts the received authentication information using the master key and transfers the encrypted authentication information to the recording medium device. The recording medium device decrypts the encrypted authentication information using the master key and compares the original authentication information with the decrypted authentication information. If the original authentication information matches the decrypted authentication information, the recording medium device judges that the access device is an authorized device. This authentication operation performed by the digital content protection system 100a is simpler than that performed by the digital content protection system 100. Because the master key is not transferred between apparatuses in the digital content protection system 100a, leakage of the master key can be prevented.

3.2 Modification of Digital Content Protection System 100

In the digital content protection system 100, the memory card 200, the memory card writer 300, and the memory card reader 400 prestores the same master key, and the master key is used as the key of a common key encryption algorithm and a common key decryption algorithm. However, instead of the master key, the memory card 200 may prestore a public key Kp and each of the memory card writer 300 and the memory card reader 400 may prestore a secret key Ks. The public key Kp and the secret key Ks are obtained under the RSA cryptosystem, which is to say a type of the public key cryptosystem.

The following description concerns the process where the public key Kp and the secret key Ks are determined. Prime numbers p and q are assumed to be decimal numbers having around 160 digits, a value n is assumed to be the product of these prime numbers, an integer L is assumed to be the least common multiple of p−1 and q−1, and values e and d are assumed to be invertible in a modulo L. That is, the relation between the values e and d is represented by $e \cdot d = 1 (\mod L)$. Also, the public key Kp is assumed to be the values n and e, and the secret key Ks is assumed to be the value d. On these assumptions, the conversion unit obtains a conversion result C by performing $M^e$ (multiplication of an input M by e times) in the modulo n. Also, the inversion unit obtains the input M by performing $C^d$ (multiplication of the conversion result C by d times). Because $C^d = (M^e)_d = M^{ed} = M$ in the modulo n, the conversion result C is appropriately inverted into the input M.

The public key Kp is generated by a separated public key generating apparatus in the manner described above and is transferred to the memory card 200.

(Authentication Operation in the Case where Memory Card 200 is Placed in Memory Card Writer 300)

Figure 13:
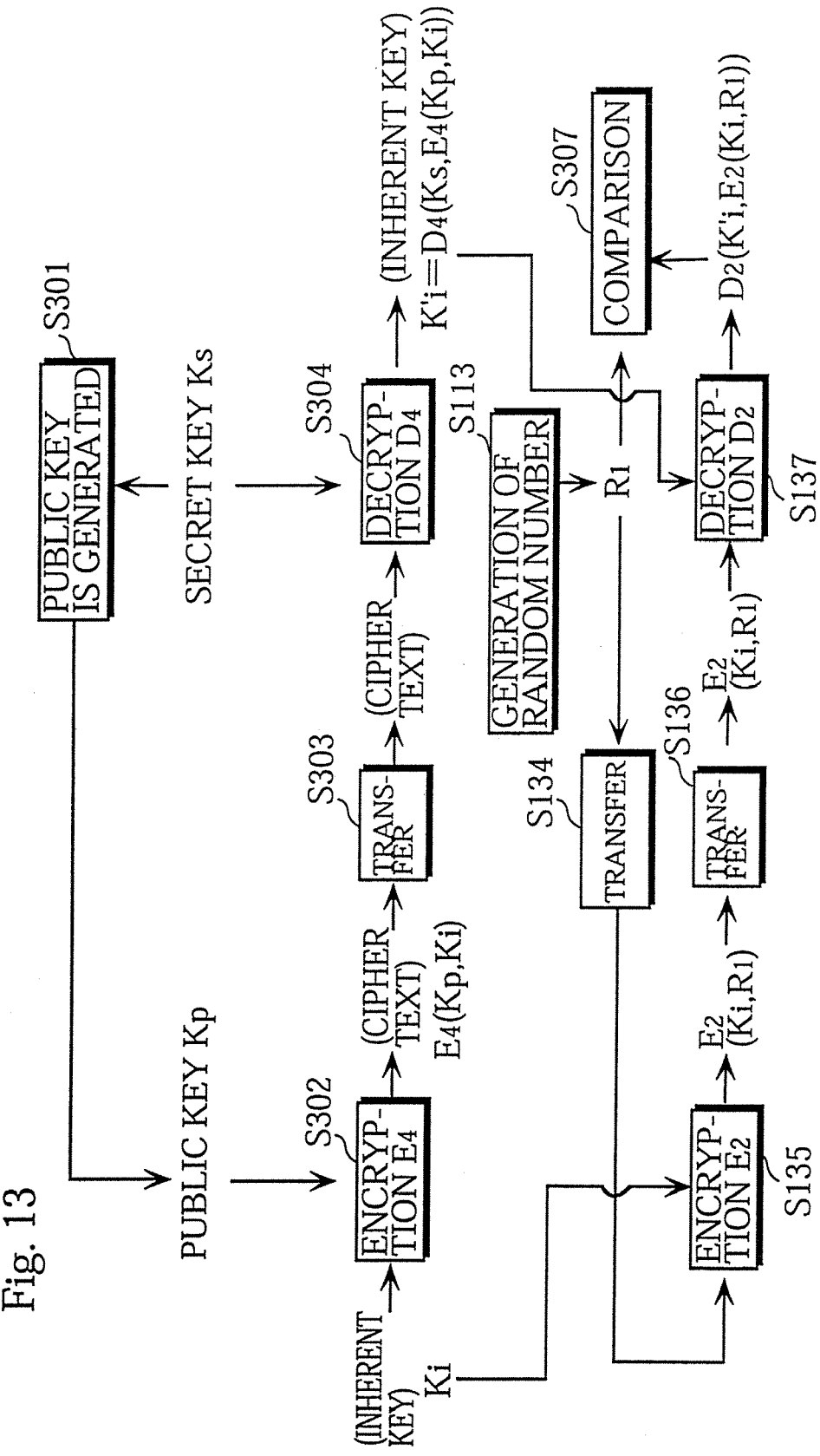
FIG. 13 shows the authentication operation of the digital content protection system of a modification of the first embodiment in the case where the memory card 200 is placed in the memory card writer 300.

The authentication operation in the case where the memory card 200 is placed in the memory card writer 300 is described in detail below with reference to FIG. 13. Note that the steps of this modification that are the same as steps of the above embodiments are assigned the same numbers as in FIG. 10 and are not described here.

The public key generating apparatus reads the secret key Ks from the memory card writer 300, generates the public key Kp from the secret key Ks using a public key encryption algorithm, and sends the generated public key Kp to the memory card 200. The memory card 200 holds the public key Kp (step S301).

The conversion unit 230 generates the encrypted inherent key E4 (Kp,Ki) by applying the encryption algorithm E4 to the inherent key Ki using the public key Kp as the key of the encryption algorithm E4 (step S302). The communication unit 270 outputs the encrypted inherent key E4 (Kp,Ki) to the inversion unit 321 via the communication unit 340 (step S303). The inversion unit 321 generates the inherent key K'i=D4 (Ks,E4(Kp,Ki)) by applying the decryption algorithm D4 to the encrypted inherent key E4 (Kp,Ki) using the secret key Ks as the key of the decryption algorithm D4 (step S304).

It should be noted here that in this modification, the encryption algorithm E4 and the decryption algorithm D4 are based on the RSA cryptosystem. However, the encryption algorithm E4 and the decryption algorithm D4 may be based on any cryptosystem.

Because the public key and secret key are generated in the manner described above, an outsider cannot calculate the public key e from the secret key d. This is because even if the outsider knows the secret key d, the outsider needs to know the modulo L to obtain the public key e from the secret key d. However, because the modulo L is the least common multiple of p−1 and q−1, the outsider cannot obtain the modulo L only from the product of p and q. Therefore, even if the outsider uncovers the secret key d prestored in the memory card and the memory card writer, he cannot obtain the public key e from the secret key d. This makes it difficult for the outsider to make the counterfeit of the memory card.

3.3 Another Modification of Digital Content Protection System 100

In the digital content protection system of the above modification, a public key Kp and a secret key Ks are obtained under the RAS cryptosystem. However, in this modification, a secret key Ks and a public key Kp are obtained under the message recovery signature scheme over an elliptic curve, that is a public key cryptosystem. In this case, the memory card 200 prestores the secret key Ks and each of the memory card writer 300 and the memory card reader 400 prestore the public key Kp. The public key Kp and the secret key Ks are determined in the manner described below.

A scalar x is selected as the secret key Ks. The point "G+G+ . . . +G (addition of G by x times)" over an elliptic curve is determined as the public key Kp, with the base point on the elliptic curve being set as G. During the conversion process, the recovery signature conversion is performed using the secret key Ks. During the inversion process, the recovery signature verification conversion is performed using the public key Kp. The recovery signature method is described in "A message recovery signature scheme equivalent to DSA over elliptic curves" (Atsuko Miyaji, Advances in Cryptology-Proceedings of ASIACRYPT '96, Lecture Notes in Computer Science, 1163 (1996), Springer-Verlag, 1-14) and is not described here.

In the digital content protection system of this modification, a separated public key generating apparatus generates a public key Kp from a secret key Ks prestored in the memory card 200 using a public key encryption algorithm, and sends the generated public key Kp to the memory card writer 300.

The conversion unit 230 generates the encrypted inherent key E4 (Ks,Ki) by applying the encryption algorithm E4 to the inherent key Ki using the secret key Ks as the key of the encryption algorithm E4. The inversion unit 321 generates the inherent key K'i=D4 (Kp,E4(Ks,Ki)) by applying the decryption algorithm D4 to the encrypted inherent key E4 (Ks,Ki) using the public key Kp as the key of the decryption algorithm D4.

Because the public key Kp and the secret key Ks are generated in the manner described above, enormous amounts of calculation need to be performed to obtain the secret key Ks from the public key Kp. As a result, it is very difficult to calculate the secret key Ks from the public key Kp. Also, the security level of the digital content service system can be enhanced in total by assigning a secret key to the memory card and assigning a public key to the memory card writer and the memory card reader. This is because the memory card writer and the memory card reader generally have the high possibilities that their internal constructions are analyzed, in comparison with the memory card.

It should be noted here that because public key cryptosystems, such as the elliptic curve cryptosystem, achieve the system security by utilizing discrete logarithm questions, public keys can be uncovered from secret keys in the public key cryptosystems.

3.4 Third Embodiment

Figure 14:
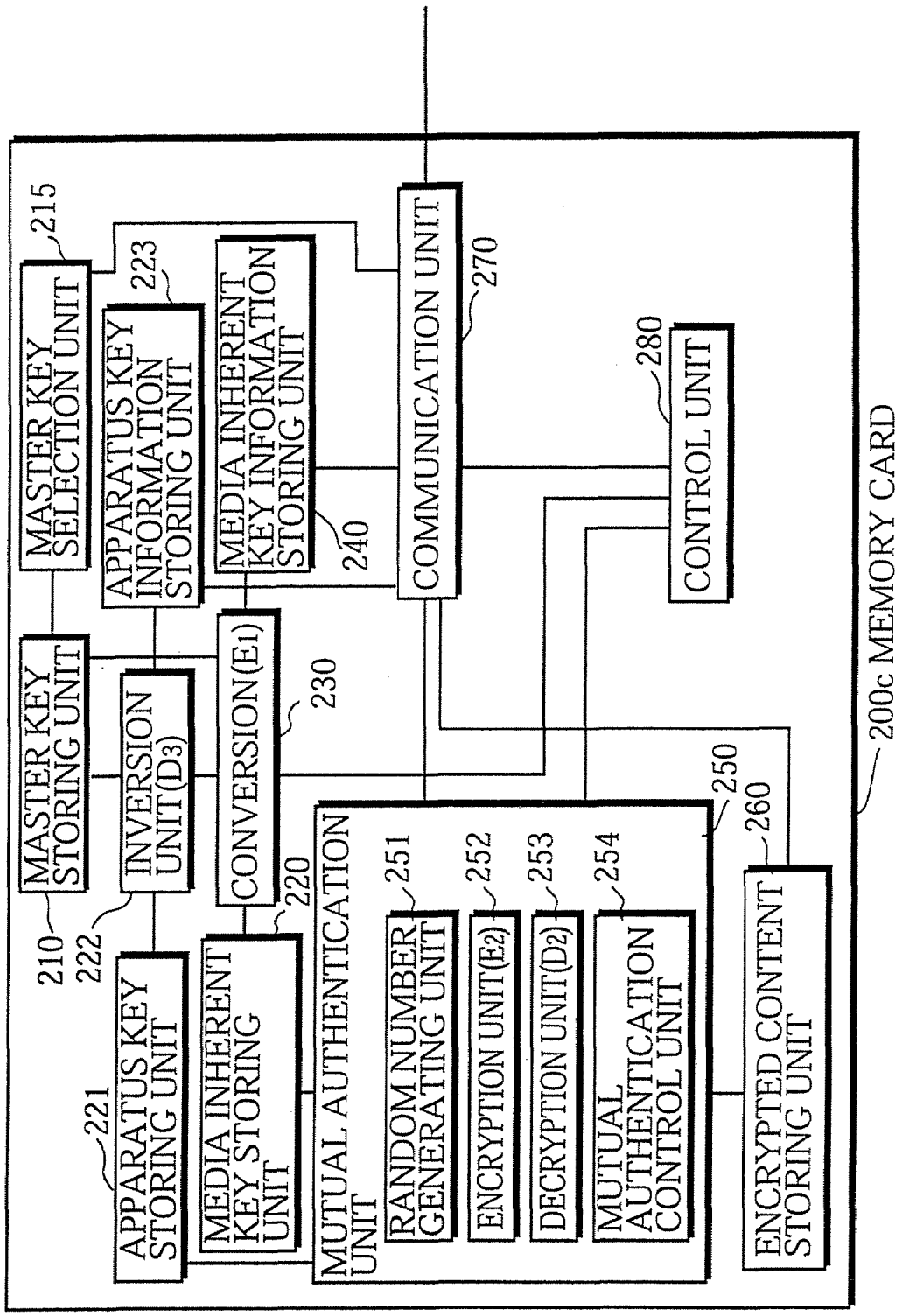
FIG. 14 is a block diagram showing the construction of the memory card 200c in the digital content protection system 100c of the third embodiment.
Figure 15:
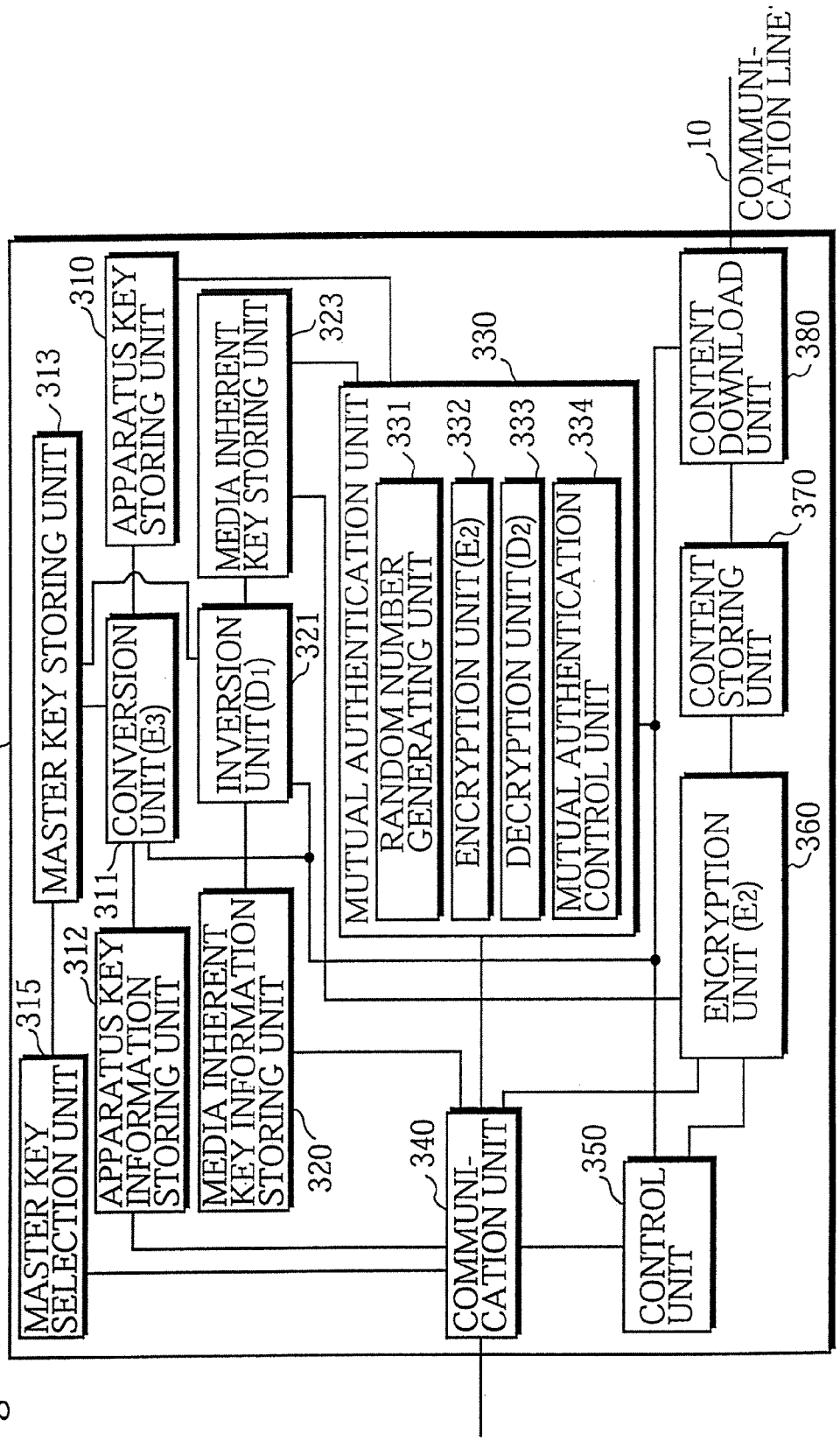
FIG. 15 is a block diagram showing the construction of the memory card writer 300c in the digital content protection system 100c of the third embodiment.
Figure 16:
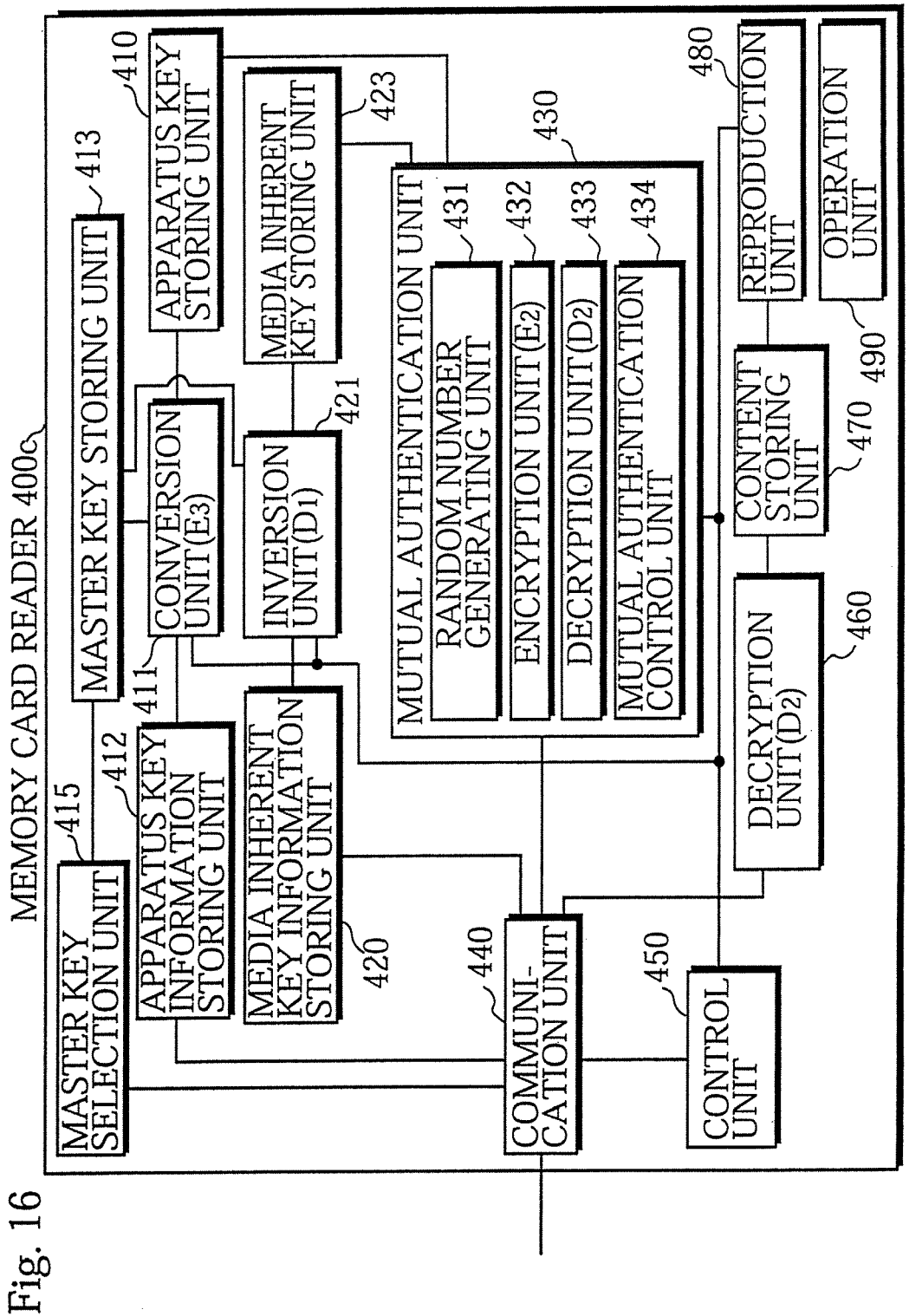
FIG. 16 is a block diagram showing the construction of the memory card reader 400c in the digital content protection system 100c of the third embodiment.

The digital content protection system 100c of the third embodiment includes a memory card 200c shown in FIG. 14, a memory card writer 300c shown in FIG. 15, and a memory card reader 400c shown in FIG. 16.

The memory card 200c is placed in a master key selection apparatus that is not shown in the drawings. The memory card writer 300c and the memory card reader 400c are also connected to the master key selection apparatus.

3.4.1 Master Key Selection Apparatus

When the memory card 200c is placed in the master key selection apparatus, the master key selection apparatus is connected to the memory card 200c via the communication unit 270 of the memory card 200c.

The master key selection apparatus is also connected to the memory card writer 300c via the communication unit 340 of the memory card writer 300c and is connected to the memory card reader 400c via the communication unit 440 of the memory card reader 400c.

After connected to the memory card 200c, the memory card writer 300c, or the memory card reader 400c, the master key selection apparatus outputs a password to the communication unit of the connected device.

The outputted password corresponds to one of a plurality of master keys.

3.4.2 Memory Card 200c

The memory card 200c differs from the memory card 200 in that the memory card 200c further includes a master key selection unit 215. Other elements of the memory card 200c are respectively the same as those of the memory card 200. Therefore, the following description centers on the different aspects of the memory card 200c.

The master key storing unit 210 prestores the plurality of master keys.

After the memory card 200c is connected to the master key selection apparatus, the communication unit 270 receives a password from the master key selection apparatus and outputs the received password to the master key selection unit 215.

The master key selection unit 215 finds which master key prestored in the master key storing unit 210 corresponds to the password and informs the master key storing unit 210 of the corresponding master key.

The master key storing unit 210 gives a find mark to the corresponding master key. The find mark shows that the master key to which the find mark is given corresponds to the password.

The conversion unit 230 and the inversion unit 222 read the master key to which the find mark is assigned.

3.4.3 Memory Card Writer 300c and Memory Card Reader 400c

The memory card writer 300c differs from the memory card writer 300 in that the memory card writer 300c further includes a master key selection unit 315. Other elements of the memory card writer 300c are respectively the same as those of the memory card writer 300.

The master key storing unit 313 prestores the plurality of master keys.

The memory card writer 300c performs the same operation as the memory card 200c. That is, the communication unit 340 receives a password from the master key selection apparatus and outputs the received password to the master key selection unit 315. The master key selection unit 315 finds which master key prestored in the master key storing unit 313 corresponds to the password. The master key storing unit 313 gives a find mark to the corresponding master key. The find mark shows that the master key to which the find mark is given corresponds to the password.

The conversion unit 311 and the inversion unit 321 read the master key to which the find mark is given.

The memory card reader 400c differs from the memory card reader 400 in that the memory card reader 400c further includes a master key selection unit 415, and performs the same operation as the memory card writer 300c.

3.4.4 Conclusion

The digital content protection system 100c of the third embodiment can be used to protect the contents delivered in a plurality of service systems. For instance, the plurality of service systems are a music delivery system that is cooperatively run by A, B, and C companies and a movie rental system that is cooperatively run by X, Y, and Z companies.

Each service system is assigned a unique master key. For instance, the music delivery system is assigned a master key Mk1 and the movie rental system is assigned a master key Mk2 that is different from the master key Mk1.

It is preferable that the service system to which the digital content protection system 100c is applied involves a license organization, manufacturers, and users. The license organization determines the standards of service systems, maintains the confidentiality of secret information, such as the master key, and issues a license to each manufacturer. Each manufacturer receives a license from the license organization, produces devices that conform to the standards determined by the license organization, and delivers the devices to users. The users use the delivered devices.

It is difficult to define complete security conditions for preventing the manufacturers from leaking the master key during the production of devices, such as memory cards, memory card writers, and memory card readers. Also, it is relatively easy to analyze the internal constructions of memory card writers and memory card readers, in comparison with memory cards.

To minimize the possibility of the leakage of the master key, to reduce the device production cost including the selection of the master key, and to slash the maintenance cost of the service system, the manufacturers select the master keys of the memory cards and the license organization selects the master keys of the memory card writers and the memory card readers.

To do so, three types of master key selection apparatuses are used. The master key selection apparatuses are master key selection apparatus 901 for the memory cards, a master key selection apparatus 902 for the memory card writers, and a master key selection apparatus 903 for the memory card readers. The manufacturers have the master key selection apparatus 901 and the license organization keeps the master key selection apparatuses 902 and 903 and does not give them to the manufacturers.

The manufacturers produce memory cards which each prestore a plurality of master keys and select one of the plurality of master keys using the master key selection apparatus 901. On the other hand, each of the memory card writers and memory card readers prestores only a master key selected by the license organization using the master key selection apparatuses 902 and 903.

Because each of the recording medium device and access device prestores a plurality of master keys, the present digital content protection system can be applied to a plurality of digital content service systems.

Also, because each service system is assigned a unique master key, even if the master key of a service system is leaked, other service systems are not affected by the master key leakage. As a result, the present digital content protection system achieves a high security effect.

3.5 Fourth Embodiment

Figure 17:
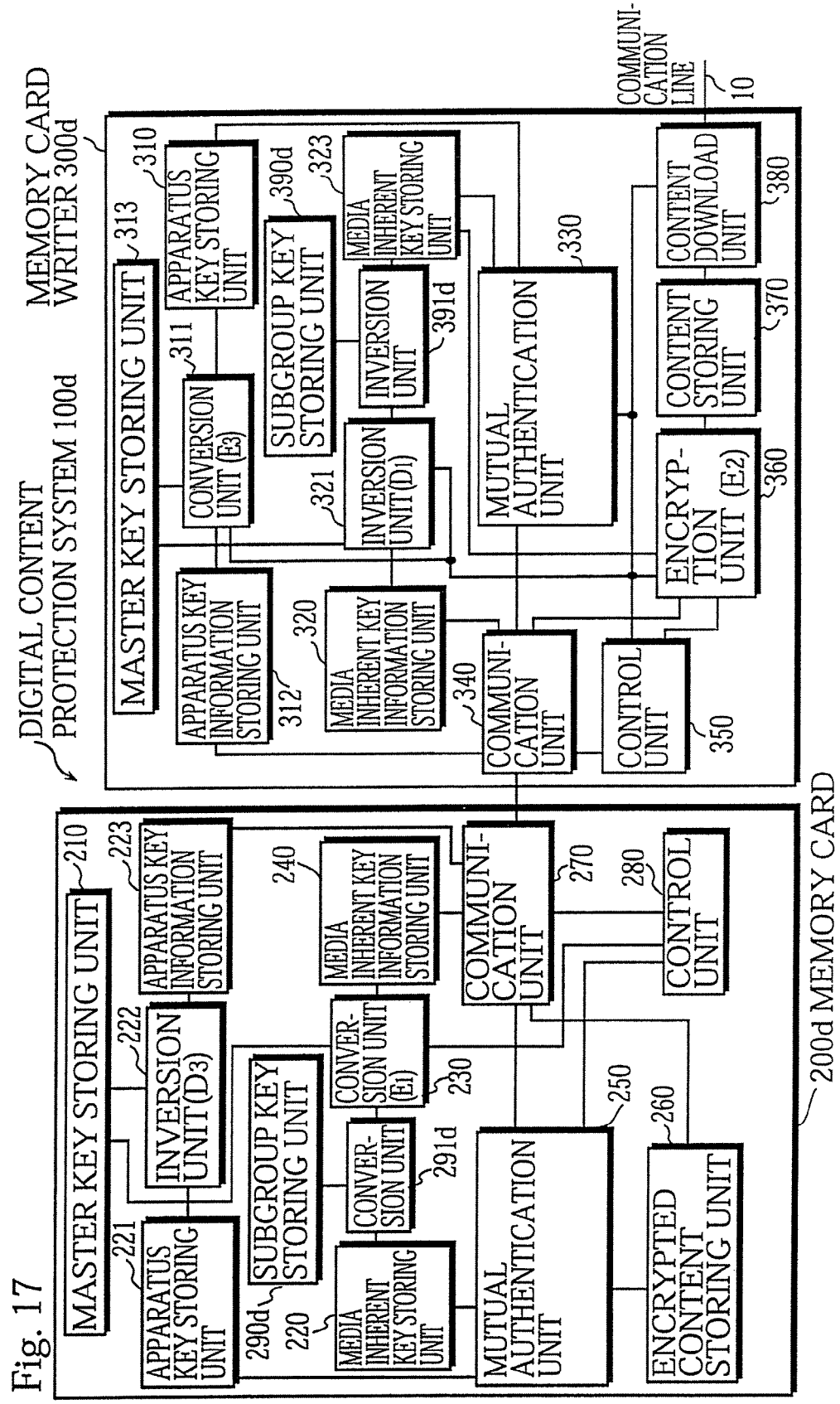
FIG. 17 is a block diagram showing the construction of the digital content protection system 100d of the fourth embodiment.

The digital content protection system 100d of the fourth embodiment includes a memory card 200d, a memory card writer 300d, and a memory card reader 400d. The memory card 200d and the memory card writer 300d are shown in FIG. 17, while the memory card reader 400d is not shown in the drawings.

The memory card 200d, the memory card writer 300d, and the memory card reader 400d are respectively similar to the memory card 200, the memory card writer 300, and the memory card reader 400. Therefore, the following description centers on the different aspects of these elements.

3.5.1 Memory Card 200d

The memory card 200d differs from the memory card 200 in that the memory card 200d further includes a subgroup key storing unit 290d and a conversion unit 291d. Also, the conversion unit 230 of the memory card 200d differs from the conversion unit 230 of the memory card 200. Other elements of the memory card 200d are respectively the same as those of the memory card 200 and are not described here.

(1) Subgroup Key Storing Unit 290d

The subgroup key storing unit 290d prestores a subgroup key Gjk that is a 56-bit bit string.

When a digital content service system is run by a plurality of groups, a plurality of subgroup keys whose number is equal to the number of the groups are generated and each of the plurality of subgroup keys is assigned to one of the plurality of groups.

The digital content service system is, for instance, a music delivery service that is cooperatively run by A, B, and C companies. In this case, three subgroup keys are generated and are respectively assigned to the companies.

(2) Conversion Unit 291d

The conversion unit 291d reads a subgroup key Gjk from the subgroup key storing unit 290d and reads an inherent key Ki from the media inherent key storing unit 220.

Also, the conversion unit 291d generates a transformed key by performing a predetermined calculation on the read subgroup key Gjk and inherent key Ki.

Here, the predetermined calculation is, for instance, the exclusive disjunction (exclusive OR) expressed by the formula give below.

(Transformed Key)=(Subgroup Key $Gjk$)EOR(Inherent Key $Ki$)

where EOR represents an exclusive disjunction.

The conversion unit 291d outputs the transformed key to the conversion unit 230.

(3) Conversion Unit 230

In the above examples, the conversion unit 230 reads the inherent key Ki from the media inherent key storing unit 220 and generates the encrypted inherent key Ji by applying the encryption algorithm E1 to the inherent key Ki. Instead of these operations, in this embodiment, the conversion unit 230 receives the transformed key from the conversion unit 291d and generates the encrypted inherent key Ji by applying the encryption algorithm E1 to the transformed key.

3.5.2 Memory Card Writer 300d

The memory card writer 300d differs from the memory card writer 300 in that the memory card writer 300d further includes a subgroup key storing unit 390d and an inversion unit 391d. Also, the inversion unit 321 and the media inherent key storing unit 323 of the memory card writer 300d differ from those of the memory card writer 300. Other elements of the memory card writer 300d are respectively the same as those of the memory card writer 300 and are not described here.

(1) Subgroup Key Storing Unit 390d

The subgroup key storing unit 390d prestores a subgroup key Gjk that is a 56-bit bit string, like the subgroup key storing unit 290d.

The subgroup key Gjk prestored in the subgroup key storing unit 390d is the same of that prestored in the subgroup key storing unit 290d and is not described here.

(2) Inversion Unit 321

In the above examples, the inversion unit 321 generates the inherent key K'i by applying the decryption algorithm D1 to the encrypted inherent key Ji read from the media inherent key information storing unit 320, and outputs the generated inherent key K'i to the media inherent key storing unit 323. Instead of these operations, in this embodiment, the inversion unit 321 generates a transformed key by applying the decryption algorithm D1 to the encrypted inherent key Ji read from the media inherent key information storing unit 320, and outputs the transformed key to the inversion unit 391d.

(3) Inversion Unit 391d

The inversion unit 391d reads a subgroup key Gjk from the subgroup key storing unit 390d and receives the transformed key from the inversion unit 321.

The inversion unit 391d then generates the inherent key K'i by performing an inverse calculation of the predetermined calculation, which is performed by the conversion unit 291d, on the subgroup key Gjk and the transformed key.

The inversion unit 391d finally outputs the inherent key K'i to the media inherent key storing unit 323.

(4) Media Inherent Key Storing Unit 323

The media inherent key storing unit 323 receives the inherent key K'i from the inversion unit 391d and holds the inherent key K'i.

3.5.3 Memory Card Reader 400d

The memory card reader 400d differs from the memory card reader 400 in that the memory card reader 400d further includes a subgroup key storing unit 490d and an inversion unit 491d. Here, the subgroup key storing unit 490d and the inversion unit 491d are respectively the same as the subgroup key storing unit 390d and the inversion unit 391d and are not described here. The inversion unit 421 and the media inherent key storing unit 423 of the memory card reader 400d are respectively the same as the inversion unit 321 and the media inherent key storing unit 323 of the memory card writer 300d. Furthermore, other elements of the memory card reader 400d are respectively the same as those of the memory card reader 400.

3.5.4 Operation of Digital Content Protection System 100d

The following description concerns the operation of the digital content protection system 100d.

The operation outlines in the case where the memory card 200d is placed in the memory card writer 300d and in the case where the memory card 200d is placed in the memory card reader 400d are the same as those performed in the digital content protection system 100 and are not described here.

Figure 18:
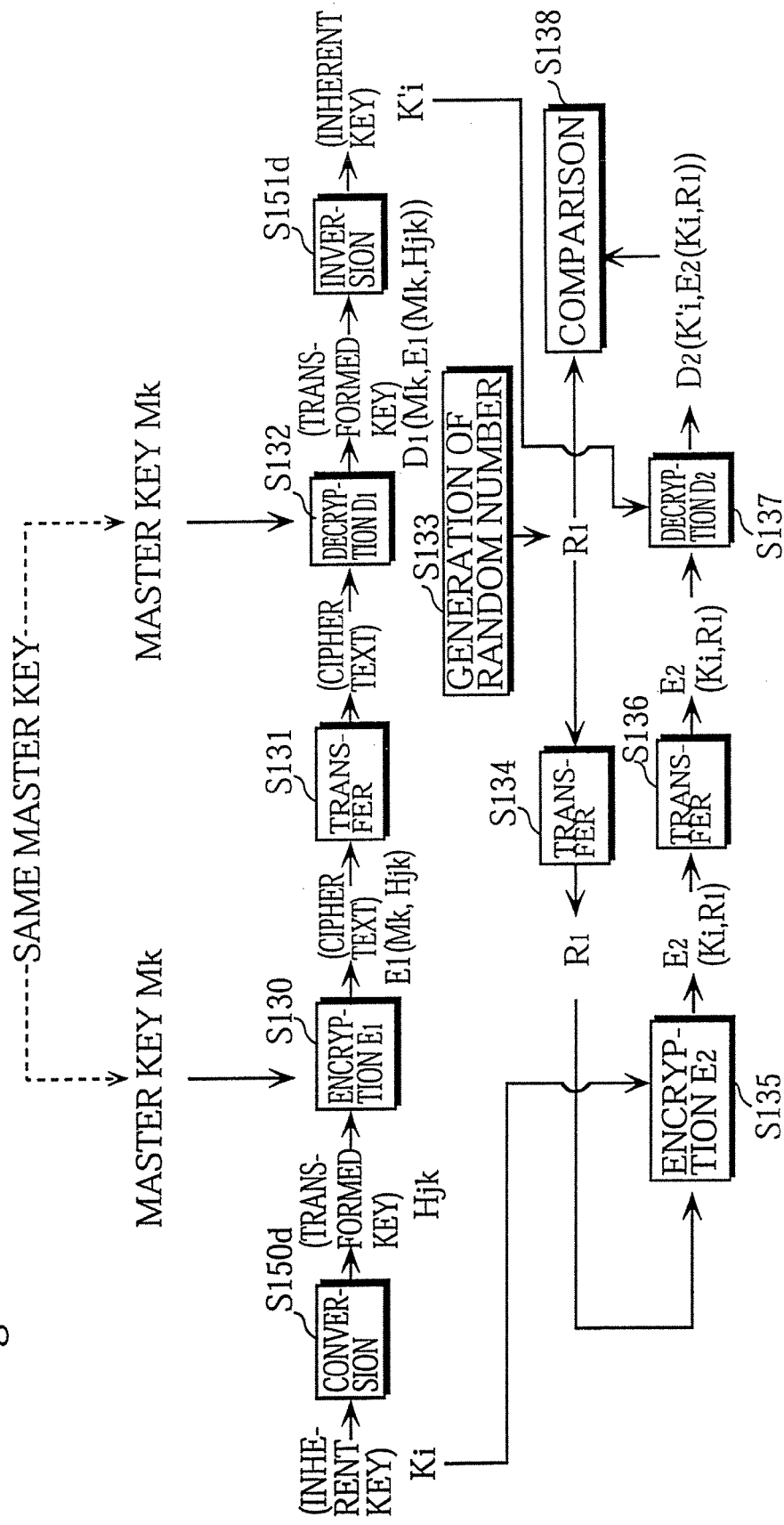
FIG. 18 shows the operation of the digital content protection system 100d.

The authentication operation in the case where the memory card 200d is placed in the memory card writer 300d is described in detail below with reference to FIG. 18. Note that the following description centers on the different steps in authentication operation between the present digital content protection system and the digital content protection system 100.

In step S150d, the conversion unit 291d reads a subgroup key Gjk from the subgroup key storing unit 290d, reads an inherent key Ki from the media inherent key storing unit 220, and generates a transformed key Hjk by performing a predetermined calculation on the subgroup key Gjk and inherent key Ki.

In step S130, the conversion unit 230 generates an encrypted inherent key E1 (Mk,Hjk) by applying the encryption algorithm E1 to the transformed key Hjk using the master key Mk as the key of the encryption algorithm E1.

In step S132, the inversion unit 321 generates the transformed key D1 (Mk,E1(Mk,Hjk)) by applying the decryption algorithm D1 to the encrypted inherent key E1 (Mk,Hjk) using the master key Mk as the key of the decryption algorithm D1.

In step S151d, the inversion unit 391d reads a subgroup key Gjk from the subgroup key storing unit 390d, receives the transformed key D1 (Mk,E1(Mk,Hjk)) from the inversion unit 321, and generates the inherent key K'i by performing an inverse calculation of the predetermined calculation, which is performed by the conversion unit 291d, on the subgroup key Gjk and the transformed key D1 (Mk,E1(Mk,Hjk)).

In the case where the memory card 200d is placed in the memory card reader 400d, the same authentication operation is performed. Therefore, the authentication operation in the case where the memory card 200d is placed in the memory card reader 400d is not described here.

3.5.5 Conclusion

When a digital content service system is run by a plurality of groups, a plurality of subgroup keys whose number is equal to the number of the plurality of groups are generated and each of the plurality of subgroup keys is assigned to one of the plurality of groups. This allows each group to provide its own service.

The digital content service system is, for instance, a music delivery system for delivering music that is cooperatively run by A, B, and C companies. In this case, three subgroup keys are generated and are respectively assigned to these companies. Therefore, A, B, and C companies can provide their own music delivery services.

In many cases, the number of master keys that can be prestored in a memory card is restricted due to the limited storage capacity of the memory card. However, the present digital content protection system can increase the number of available keys by combining a master key and subgroup keys.

It should be noted here that services that are common to a plurality of groups can be provided in the present digital content protection system. To do so, two other control units are added to the digital content protection system, the same subgroup key is assigned to each group, and the master key is assigned to the digital content service system. One of the added control units prohibits the conversion unit 291d from performing its conversion processing and has the conversion unit 230 convert the inherent key prestored in the media inherent key storing unit 220. The other of the added control units prohibits the inversion unit 391d from performing its inversion processing and has the inversion unit 321 invert the encrypted inherent key held in the media inherent key information storing unit 320.

3.6 Fifth Embodiment

The digital content protection system 100e of the fifth embodiment includes a memory card 200e, a memory card writer 300e, and a memory card reader 400e. The memory card 200e and the memory card writer 300e are shown in FIG. 19, while the memory card reader 400e is not shown in the drawings.

The memory card 200e, the memory card writer 300e, and the memory card reader 400e are respectively similar to the memory card 200, the memory card writer 300, and the memory card reader 400. Therefor, the following description centers on the different aspects of these elements.

3.6.1 Memory Card 200e

The memory card 200e differs from the memory card 200 in that the memory card 200e further includes a subgroup key storing unit 290e and a conversion unit 291e. Also, the communication unit 270 of the memory card 200e differs from that of the memory card 200. Other elements of the memory card 200e are respectively the same as those of the memory card 200 and are not described.

(1) Subgroup Key Storing Unit 290e

The subgroup key storing unit 290e prestores a subgroup Gjk that is a 56-bit string.

The subgroup key is the same as that prestored in the subgroup key storing unit 290d and is not described here.

(2) Conversion Unit 291e

The conversion unit 291e first reads the subgroup key Gjk from the subgroup key storing unit 290e and reads the encrypted inherent key Ji from the media inherent key information storing unit 240.

The conversion unit 291e then generates a transformed key by performing a predetermined calculation on the subgroup key Gjk and encrypted inherent key Ji.

Here, the predetermined calculation is the same as that performed by the conversion unit 291d.

The conversion unit 291e finally outputs the transformed key to the communication unit 270.

(3) Communication Unit 270

In the above examples, the communication unit 270 reads the encrypted inherent key Ji from the media inherent key information storing unit 240 and outputs the encrypted inherent key Ji to the communication unit 340 of the memory card writer 300 or the communication unit 440 of the memory card reader 400. Instead of these operations, in this embodiment, the communication unit 270 receives the transformed key from the conversion unit 291e and outputs the transformed key to the communication unit 340 of the memory card writer 300e or the communication unit 440 of the memory card reader 400e.

3.6.2 Memory Card Writer 300e

The memory card writer 300e differs from the memory card writer 300 in that the memory card writer 300e further includes a subgroup key storing unit 390e and an inversion unit 391e. Also, the communication unit 340 of the memory card writer 300e differs from the communication unit 340 of the memory card writer 300. Other elements of the memory card writer 300e are respectively the same as those of the memory card writer 300 and are not described here.

(1) Subgroup Key Storing Unit 390e

The subgroup key storing unit 390e prestores a subgroup key Gjk that is a 56-bit bit string, like the subgroup key storing unit 290e.

The subgroup key Gjk prestored in the subgroup key storing unit 390e is the same as that prestored in the subgroup key storing unit 290e and is not described here.

(2) Communication Unit 340

In the above examples, the communication unit 340 receives the encrypted inherent key Ji from the communication unit 270 of the memory card 200 and outputs the encrypted inherent key Ji to the media inherent key information storing unit 320. Instead of these operations, in this embodiment, the communication unit 340 receives the transformed key from the communication unit 270 of the memory card 200e and outputs the transformed key to the inversion unit 391e.

(3) Inversion Unit 391e

The inversion unit 391e first reads the subgroup key Gjk from the subgroup key storing unit 390e and receives the transformed key from the communication unit 340.

The inversion unit 391e then generates the encrypted inherent key Ji by performing an inverse calculation of the predetermined calculation, which is performed by the conversion unit 291e, on the subgroup key Gjk and the transformed key.

The inversion unit 391 finally outputs the encrypted inherent key Ji to the media inherent key information storing unit 320.

3.6.3 Memory Card Reader 400e

The memory card reader 400e differs from the memory card reader 400 in that the memory card reader 400e further includes a subgroup key storing unit 490e and an inversion unit 491e. The subgroup key storing unit 490e and the inversion unit 491e are respectively the same as the subgroup key storing unit 390e and the inversion unit 391e and are not described here. The communication unit 440 of the memory card reader 400e is the same as the communication unit 340 of the memory card writer 300e. Other elements of the memory card reader 400e are respectively the same as those of the memory card reader 400.

3.6.4 Operation of Digital Content Protection System 100e

The following is a description of the operation of the digital content protection system 100e.

The operation outlines in the case where the memory card 200e is placed in the memory card writer 300e and in the case where the memory card 200e is placed in the memory card reader 400e are the same as those performed in the digital content protection system 100 and are not described here.

Figure 20:
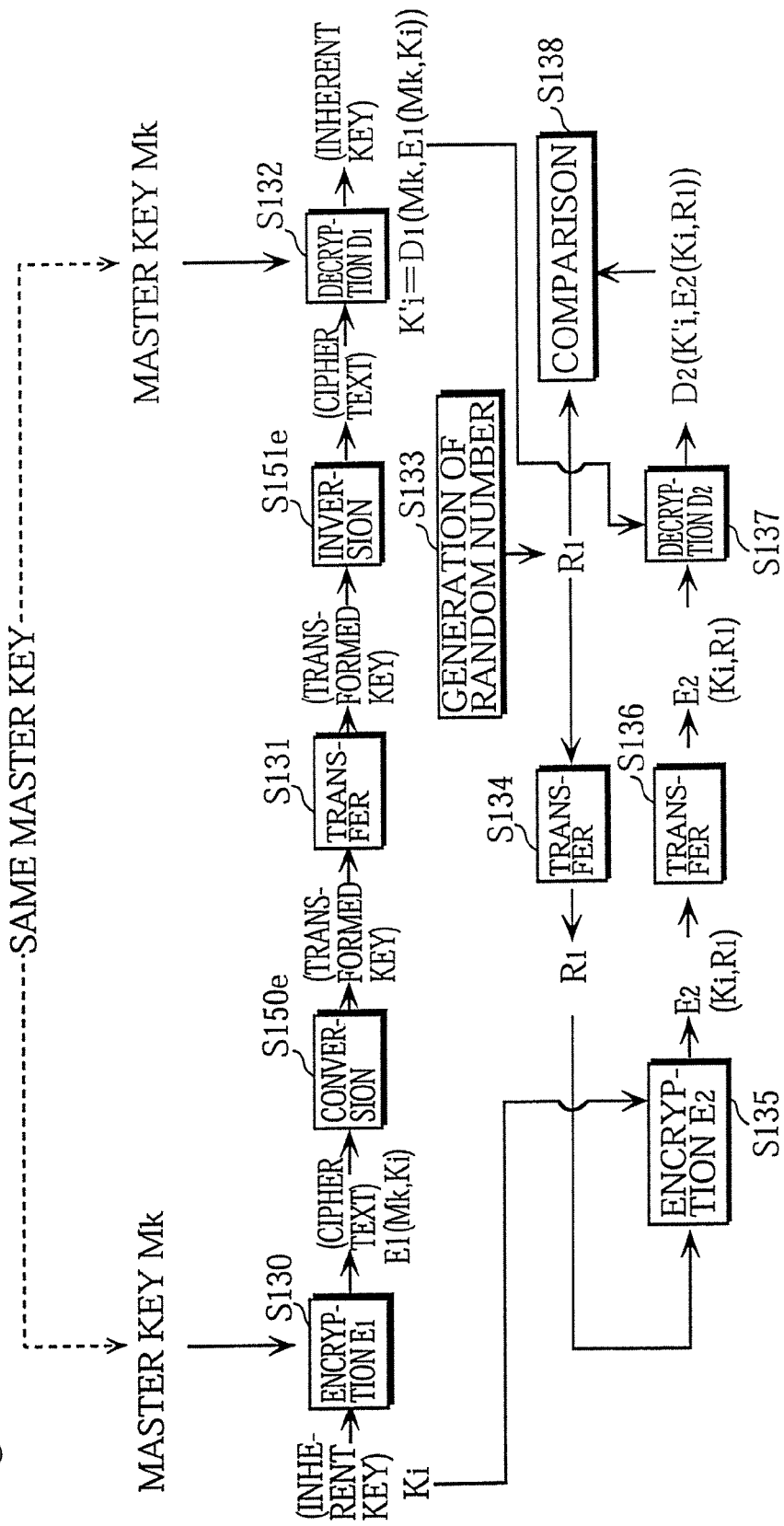
FIG. 20 shows the authentication operation of the digital content protection system 100e.

The authentication operation in the case where the memory card 200e is placed in the memory card writer 300e is described in detail below with reference to FIG. 20. The following description centers on the different steps in authentication operation between the present digital content protection system and the digital content protection system 100.

In step S150e, the conversion unit 291e reads the subgroup key Gjk from the subgroup key storing unit 290e, reads the encrypted inherent key Ji from the media inherent key information storing unit 240, generates the transformed key by performing the predetermined calculation on the subgroup key Gjk and encrypted inherent key Ji, and outputs the transformed key to the communication unit 270.

In step S131, the communication unit 270 receives the transformed key from the conversion unit 291e, outputs the transformed key to the communication unit 340 of the memory card writer 300e. After receiving the transformed key from the communication unit 270 of the memory card 200e, the communication unit 340 outputs the transformed key to the inversion unit 391e.

In step S151e, the inversion unit 391e reads the subgroup key Gjk from the subgroup key storing unit 390e, receives the transformed key from the communication unit 340, and generates the encrypted inherent key Ji by performing an inverse calculation of the predetermined calculation on the subgroup key Gjk and transformed key.

In the case where the memory card 200e is placed in the memory card reader 400e, the same authentication operation is performed. Therefore, the authentication operation in the case where the memory card 200e is placed in the memory card reader 400e is not described here.

3.6.5 Conclusion

Like the digital content protection system 100d, when a digital content service system is run by a plurality of groups, a plurality of subgroup keys whose number is equal to the number of the plurality of groups are generated and each of the plurality of subgroup keys is assigned to one of the plurality of groups. This allows each group to provide its own service.

In many cases, the number of master keys that can be prestored in a memory card is restricted due to the limited storage capacity of the memory card. However, the present digital content protection system can increase the number of available keys by combining a master key and subgroup keys.

It should be noted here that services that are common to a plurality of groups can be provided in the present digital content protection system. To do so, two other control units are added to the digital content protection system, the same subgroup key is assigned to each group, and the master key is assigned to the digital content service system. One of the added control units prohibits the conversion unit 291e from performing its conversion processing and has the conversion unit 230 convert the inherent key prestored in the media inherent key storing unit 220. The other of the added control units prohibits the inversion unit 391e from performing its inversion processing and has the inversion unit 321 invert the encrypted inherent key held in the media inherent key information storing unit 320.

3.7 Sixth Embodiment

Figure 21:
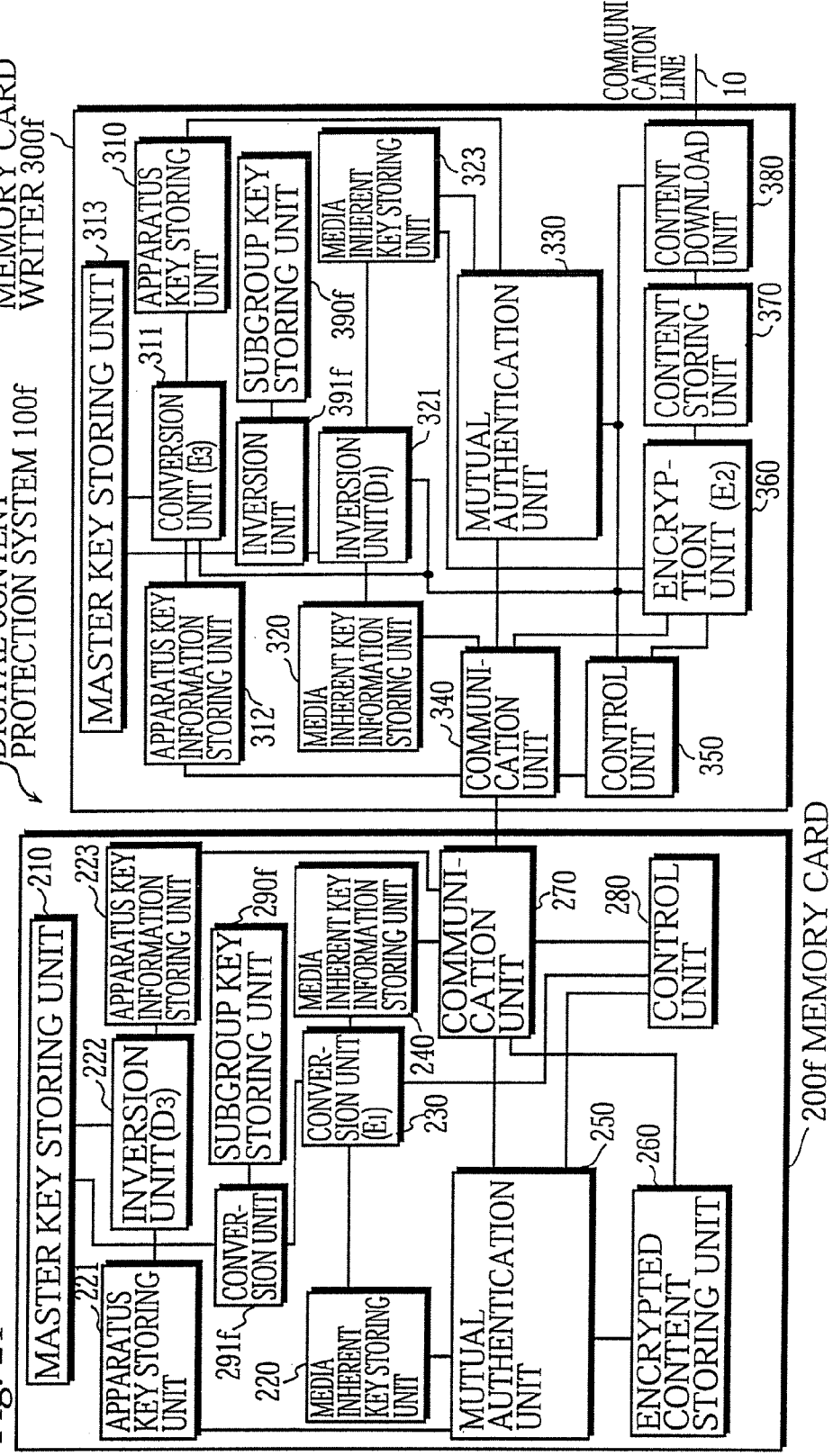
FIG. 21 is a block diagram showing the construction of the digital content protection system 100f of the sixth embodiment.

The digital content protection system 100f of the sixth embodiment includes a memory card 200f, a memory card writer 300f, and a memory card reader 400f. The memory card 200f and the memory card writer 300f are shown in FIG. 21, while the memory card reader 400f is not shown in the drawings.

The memory card 200f, the memory card writer 300f, and the memory card reader 400f are respectively similar to the memory card 200, the memory card writer 300, and the memory card reader 400. Therefore, the following description centers on the different aspects of these elements.

3.7.1 Memory Card 200f

The memory card 200f differs from the memory card 200 in that the memory card 200f further includes a subgroup key storing unit 290f and a conversion unit 291f. Also, the conversion unit 230 of the memory card 200f differs from the conversion unit 230 of the memory card 200. Other elements of the memory card 200f are respectively the same as those of the memory card 200 and are not described here.

(1) Subgroup Key Storing Unit 290f

The subgroup key storing unit 290f prestores a subgroup key Gjk that is a 56-bit bit string.

The subgroup key prestored in the subgroup key storing unit 290f is the same as that prestored in the subgroup key storing unit 290d and is not described here.

(2) Conversion Unit 291f

The conversion unit 291f first reads the subgroup key Gjk from the subgroup key storing unit 290f and reads the master key Mk from the master key storing unit 210.

The conversion unit 291f then generates a transformed key by performing a predetermined calculation on the subgroup key Gjk and master key Mk.

Here, the predetermined calculation is the same as that performed by the conversion unit 291d.

The conversion unit 291f finally outputs the transformed key to the conversion unit 230.

(3) Conversion Unit 230

In the above examples, the conversion unit 230 reads the master key Mk from the master key storing unit 210 and generates the encrypted inherent key Ji by applying the encryption algorithm E1 to the inherent key Ki using the master key Mk as the key of the encryption algorithm E1. Instead of these operations, in this embodiment, the conversion unit 230 receives the transformed key from the conversion unit 291f and generates the encrypted inherent key Ji by applying the encryption algorithm E1 to the inherent key Ki using the transformed key as the key of the encryption algorithm E1.

3.7.2 Memory Card Writer 300f

The memory card writer 300f differs from the memory card writer 300 in that the memory card writer 300f further includes a subgroup key storing unit 390f and an inversion unit 391f. Also, the inversion unit 321 of the memory card writer 300f differs from the inversion unit 321 of the memory card writer 300. Other elements of the memory card writer 300f are respectively the same as those of the memory card writer 300 and are not described here.

(1) Subgroup Key Storing Unit 390f

The subgroup key storing unit 390f prestores a subgroup key Gjk that is a 56-bit bit string, like the subgroup key storing unit 290f.

The subgroup key prestored in the subgroup key storing unit 390f is the same as that prestored in the subgroup key storing unit 290f and is not described here.

(2) Inversion Unit 391f

The inversion unit 391f first reads the subgroup key Gjk from the subgroup key storing unit 390f and reads the master key Mk from the master key storing unit 313.

The inversion unit 391f then generates a transformed key by performing a predetermined calculation on the subgroup key Gjk and the master key Mk.

Here, the predetermined calculation is the same as that performed by the conversion unit 291d.

The inversion unit 391f finally outputs the transformed key to the inversion unit 321.

(3) Inversion Unit 321

In the above embodiments, the inversion unit 321 read the master key Mk from the master key storing unit 313 and generates the inherent key K'i by applying the decryption algorithm D1 to the encrypted inherent key Ji using the master key Mk as the key of the decryption algorithm D1. Instead of these operations, in this embodiment, the inversion unit 321 receives the transformed key from the inversion unit 391f and generates the inherent key K'i by applying the decryption algorithm D1 to the encrypted inherent key Ji using the transformed key as the key of the decryption algorithm D1.

3.7.3 Memory Card Reader 400f

The memory card reader 400f differs from the memory card reader 400 in that the memory card reader 400f further includes a subgroup key storing unit 490f and an inversion unit 491f. The subgroup key storing unit 490f and the inversion unit 491f are respectively the same as the subgroup key storing unit 390f and the inversion unit 391f and are not described here. The inversion unit 421 of the memory card reader 400f is the same as the inversion unit 321 of the memory card writer 300f. Other elements of the memory card reader 400f are respectively the same as those of the memory card reader 400.

3.7.4 Operation of Digital Content Protection System 100f

The following is a description of the operation of the digital content protection system 100f.

The operation outlines in the case where the memory card 200f is placed in the memory card writer 300f and in the case where the memory card 200f is placed in the memory card reader 400f are the same as those performed in the digital content protection system 100 and are not described here.

Figure 22:
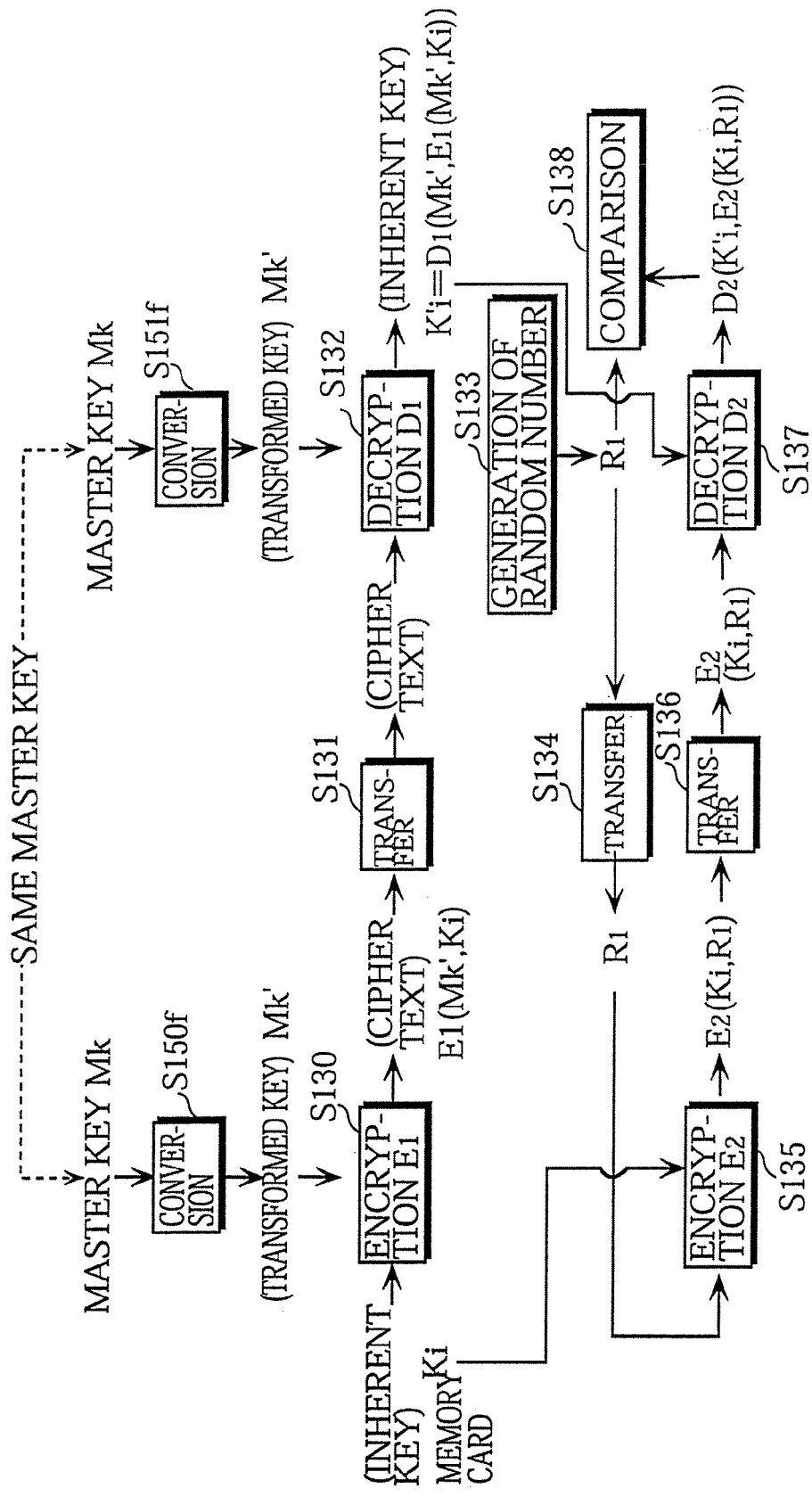
FIG. 22 shows the authentication operation of the digital content protection system 100f.

The authentication operation in the case where the memory card 200f is placed in the memory card writer 300f is described in detail below with reference to FIG. 22. The following description centers on the different steps in authentication operation between the present digital content protection system and the digital content protection system 100.

In step S150f, the conversion unit 291f reads the subgroup key Gjk from the subgroup key storing unit 290f, reads the master key Mk from the master key storing unit 210, generates the transformed key Mk' by performing the predetermined calculation on the subgroup key Gjk and master key Mk, and outputs the transformed key Mk' to the conversion unit 230.

In step S130, the conversion unit 230 generates the encrypted inherent key E1 (Mk',Ki) by applying the encryption algorithm E1 to the inherent key Ki using the transformed key Mk' as the key of the encryption algorithm E1.

In step S151f, the inversion unit 391f reads the subgroup key Gjk from the subgroup key storing unit 390f, reads the master key Mk from the master key storing unit 313, generates the transformed key Mk1 by performing the predetermined calculation on the subgroup key Gjk and master key Mk, and outputs the transformed key Mk1 to the inversion unit 321.

In step 132, the inversion unit 321 generates the inherent key K'i=D1 (Mk',E1(Mk',Ki)) by applying the decryption algorithm D1 to the encrypted inherent key E1 (Mk',Ki) using the transformed key as the key of the decryption algorithm D1.

In the case where the memory card 200*f* is placed in the memory card reader 400*f*, the same authentication operation is performed. Therefore, the authentication operation in the case where the memory card 200*f* is placed in the memory card reader 400*f* is not described here.

3.7.5 Conclusion

Like the digital content protection system 100*d*, when a digital content service system is run by a plurality of groups, a plurality of subgroup keys whose number is equal to the number of the plurality of groups are generated and each of the plurality of subgroup keys is assigned to one of the plurality of groups. This allows each group to provide its own service.

In many cases, the number of master keys that can be prestored in a memory card is restricted due to the limited storage capacity of the memory card. However, the present digital content protection system can increase the number of available keys by combining a master key and subgroup keys.

It should be noted here that services that are common to a plurality of groups can be provided in the present digital content protection system. To do so, two other control units are added to the digital content protection system, the same subgroup key is assigned to each group, and the master key is assigned to the digital content service system. One of the added control units prohibits the conversion unit 291*f* from performing its conversion processing and has the conversion unit 230 convert the inherent key prestored in the media inherent key storing unit 220. The other of the added control units prohibits the inversion unit 391*f* from performing its inversion processing and has the inversion unit 321 invert the encrypted inherent key held in the media inherent key information storing unit 320.

Also, in the digital content protection system 100*f*, the same master key is prestored in the master key storing units 210 and 313. However, a public key method may be used in the manner described below.

In the digital content protection system 100*f* using the public key method, the master key storing unit 210 of the memory card 200*f* prestores a secret key that is the master key. The memory card 200*f* further includes a public key generating unit that generates a public key from the transformed key generated by the conversion unit 291*f* and the public key is sent to the memory card writer 300*f* in advance. In the memory card writer 300*f*, the encryption unit 360 encrypts contents using the public key.

3.8 Seventh Embodiment

Figure 23:
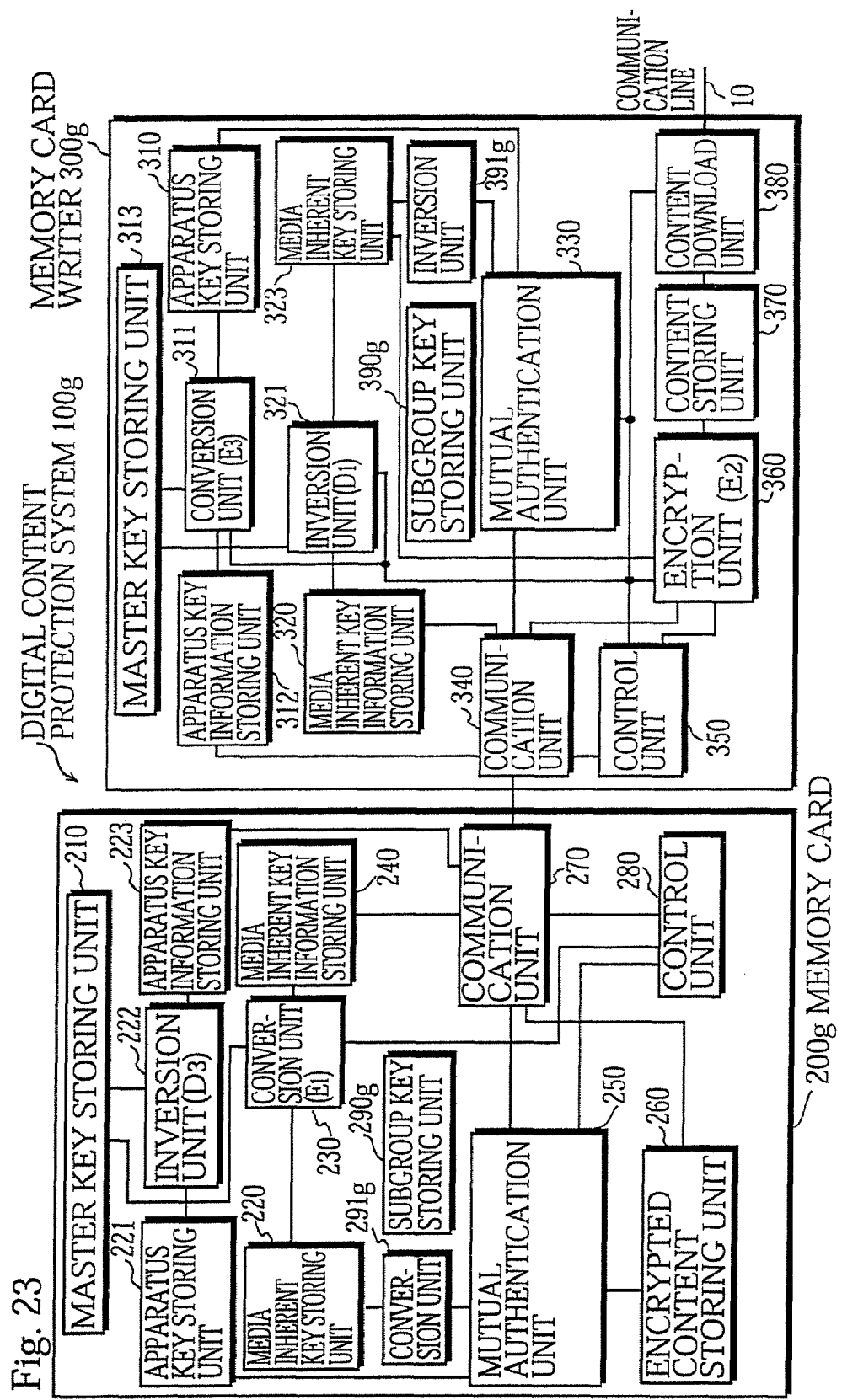
FIG. 23 is a block diagram showing the construction of the digital content protection system 100g of the seventh embodiment.

The digital content protection system 100*g* of this embodiment includes a memory card 200*g*, a memory card writer 300*g*, and a memory card reader 400*g*. The memory card 200*g* and the memory card writer 300*g* are shown in FIG. 23, while the memory card reader 400*g* is not shown in the drawings.

The memory card 200*g*, the memory card writer 300*g*, and the memory card reader 400*g* are respectively similar to the memory card 200, the memory card writer 300, and the memory card reader 400. Therefore, the following description centers on the different aspects of these elements.

3.8.1 Memory Card 200*a*

The memory card 200*g* differs from the memory card 200 in that the memory card 200*g* further includes a subgroup key storing unit 290*g* and a conversion unit 291*g*. Also, the encryption unit 252 of the memory card 200*g* differs from that of the memory card 200. Other elements of the memory card 200*g* are respectively the same as those of the memory card 200.

(1) Subgroup Key Storing Unit 290*g*

The subgroup key storing unit 290*g* prestores a subgroup key Gjk that is a 56-bit bit string.

The subgroup key prestored in the subgroup key storing unit 290*g* is the same as that prestored in the subgroup key storing unit 290*d* and is not described here.

(2) Conversion Unit 291*g*

The conversion unit 291*g* first reads the subgroup key Gjk from the subgroup key storing unit 290*g* and reads the inherent key Ki from the media inherent key storing unit 220.

The conversion unit 291*g* then generates a transformed key by performing a predetermined calculation on the subgroup key Gjk and the inherent key Ki.

Here, the predetermined calculation is the same as that performed by the conversion unit 291*d*.

The conversion unit 291*g* finally outputs the transformed key to the encryption unit 252 of the mutual authentication unit 250.

(3) Encryption Unit 252

In the above examples, the encryption unit 252 reads the inherent key Ki from the media inherent key storing unit 220 and generates the encrypted random number S1 by applying the encryption algorithm E2 to the random number R1 using the inherent key Ki as the key of the encryption algorithm E2. Instead of these operations, in this embodiment, the encryption unit 252 receives the transformed key from the conversion unit 291*g* and generates the encrypted random number S1 by applying the encryption algorithm E2 to the random number R1 using the transformed key as the key of the encryption algorithm E2.

3.8.2 Memory Card Writer 300*a*

The memory card writer 300*g* differs from the memory card writer 300 in that the memory card writer 300*g* further includes a subgroup key storing unit 390*g* and an inversion unit 391*g*. Also, the decryption unit 333 of the memory card writer 300*g* differs from that of the memory card writer 300. Other elements of the memory card writer 300*g* are respectively the same as those of the memory card writer 300.

(1) Subgroup Key Storing Unit 390*g*

The subgroup key storing unit 390*g* prestores a subgroup key Gjk that is a 56-bit bit string, like the subgroup key storing unit 290*g*.

The subgroup key prestored in the subgroup key storing unit 390*g* is the same as that prestored in the subgroup key storing unit 290*g* and is not described here.

(2) Inversion Unit 391*g*

The inversion unit 391*g* first reads the subgroup key Gjk from the subgroup key storing unit 390*g* and reads the inherent key K'i from the media inherent key storing unit 323.

The inversion unit 391*g* then generates a transformed key by performing a predetermined calculation on the subgroup key Gjk and the inherent key K'i.

Here, the predetermined calculation is the same as that performed by the conversion unit 291*d*.

The inversion unit 391*g* finally outputs the transformed key to the decryption unit 333.

(3) Decryption Unit 333

In the above examples, the decryption unit 333 reads the inherent key K'i from the media inherent key storing unit 323 and generates the random number R'1 by applying the decryption algorithm D2 to the encrypted random number S1 using the inherent key K'i as the key of the decryption algorithm D2. Instead of these operations, in this embodiment, the decryption unit 333 receives the transformed key from the inversion unit 391*g* and generates the random number R'1 by applying the decryption algorithm D2 to the encrypted random number S1 using the transformed key as the key of the decryption algorithm D2.

3.8.3 Memory Card Reader 400*g*

The memory card reader 400*g* differs from the memory card reader 400 in that the memory card reader 400*g* further includes a subgroup key storing unit 490*g* and an inversion unit 491*g*. The subgroup key storing unit 490*g* and the inversion unit 491*g* are respectively the same as the subgroup key storing unit 390*g* and the inversion unit 391*g* and are not described here. The decryption unit 433 of the memory card reader 400*g* is the same as the decryption unit 333 of the memory card writer 300*g*. Other elements of the memory card reader 400*g* are respectively the same as those of the memory card reader 400.

3.8.4 Operation of Digital Content Protection System 100*a*

The following is a description of the operation of the digital content protection system 100*g*.

The operation outlines in the case where the memory card 200*g* is placed in the memory card writer 300*g* and in the case where the memory card 200*g* is placed in the memory card reader 400*g* are the same as those performed in the digital content protection system 100 and are not described here.

Figure 24:
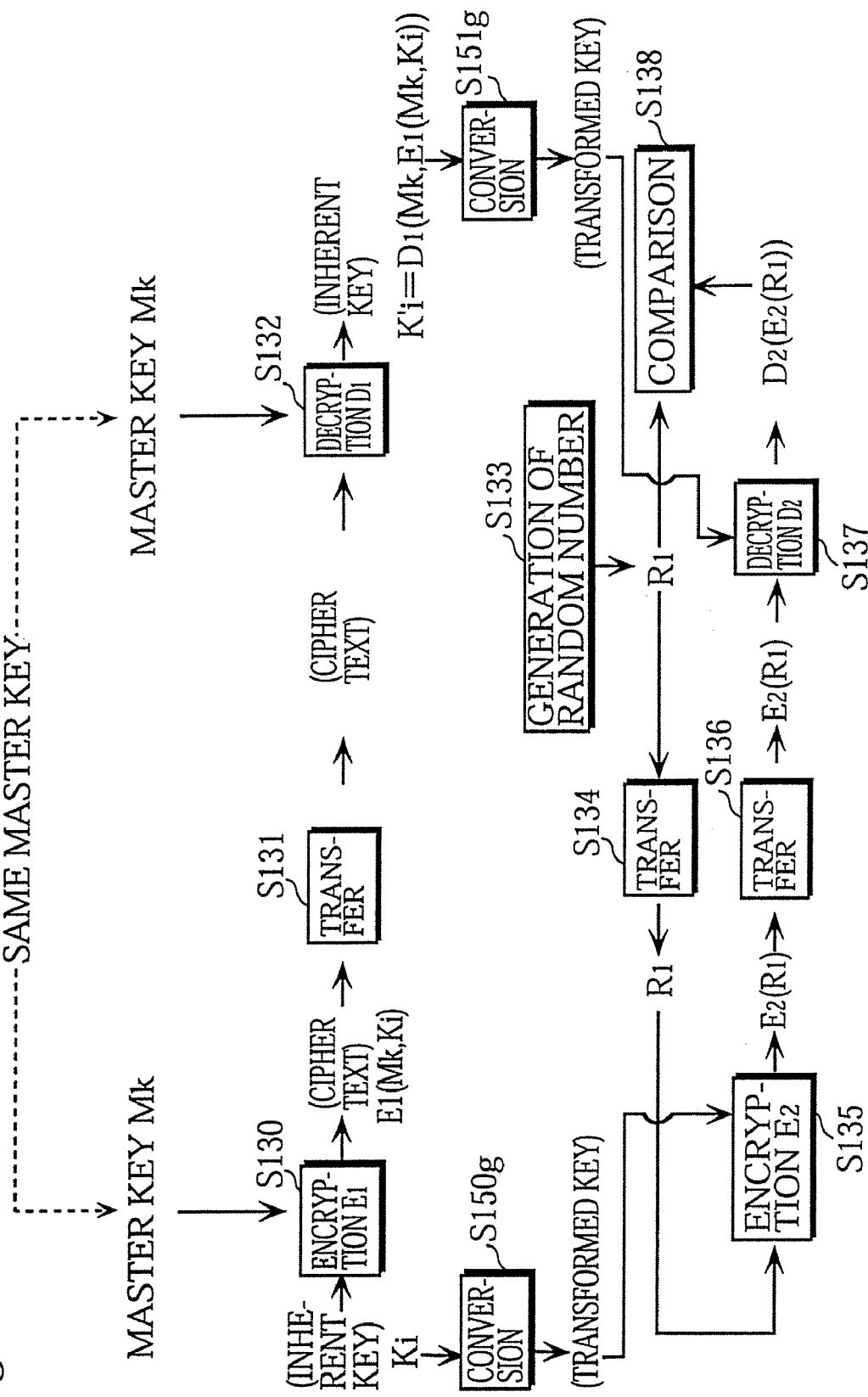
FIG. 24 shows the authentication operation of the digital content protection system 100g.

The authentication operation in the case where the memory card 200*g* is placed in the memory card writer 300*g* is described in detail below with reference to FIG. 24. The following description centers on the different steps in authentication operation between the present digital content protection system and the digital content protection system 100.

In step S150*g*, the conversion unit 291*g* reads the subgroup key Gjk from the subgroup key storing unit 290*g*, reads the inherent key Ki from the media inherent key storing unit 220, generates the transformed key by performing the predetermined calculation on the subgroup key Gjk and inherent key Ki, and outputs the transformed key to the encryption unit 252 of the mutual authentication unit 250.

In step S135, the encryption unit 252 receives the transformed key from the conversion unit 291*g* and generates the encrypted random number S1 by applying the encryption algorithm E2 to the random number R1 using the transformed key as the key of the encryption algorithm E2.

In step S151*g*, the inversion unit 391*g* reads the subgroup key Gjk from the subgroup key storing unit 390*g*, reads the inherent key K'i from the media inherent key storing unit 323, generates the transformed key by performing the predetermined calculation on the subgroup key Gjk and inherent key K'i, and outputs the transformed key to the decryption unit 333.

In step 137, the decryption unit 333 receives the transformed key from the inversion unit 391*g* and generates the random number R'i by applying the decryption algorithm D2 to the encrypted random number S1 using the transformed key as the key of the decryption algorithm D2.

In the case where the memory card 200*g* is placed in the memory card reader 400*g*, the same authentication operation is performed. Therefore, the authentication operation in the case where the memory card 200*g* is placed in the memory card reader 400*g* is not described here.

3.8.5 Conclusion

Like the digital content protection system 100*d*, when a digital content service system is run by a plurality of groups, a plurality of subgroup keys whose number is equal to the number of the plurality of groups are generated and each of the plurality of subgroup keys is assigned to one of the plurality of groups. This allows each group to provide its own service.

In many cases, the number of master keys that can be prestored in a memory card is restricted due to the limited storage capacity of the memory card. However, the present digital content protection system can increase the number of available keys by combining a master key and subgroup keys.

It should be noted here that services that are common to a plurality of groups can be provided in the present digital content protection system. To do so, two other control units are added to the digital content protection system, the same subgroup key is assigned to each group, and the master key is assigned to the digital content service system. One of the added control units prohibits the conversion unit 291*g* from performing its conversion processing and has the conversion unit 230 convert the inherent key prestored in the media inherent key storing unit 220. The other of the added control units prohibits the inversion unit 391*g* from performing its inversion processing and has the inversion unit 321 invert the encrypted inherent key held in the media inherent key information storing unit 320.

3.9 Eighth Embodiment

Figure 25:
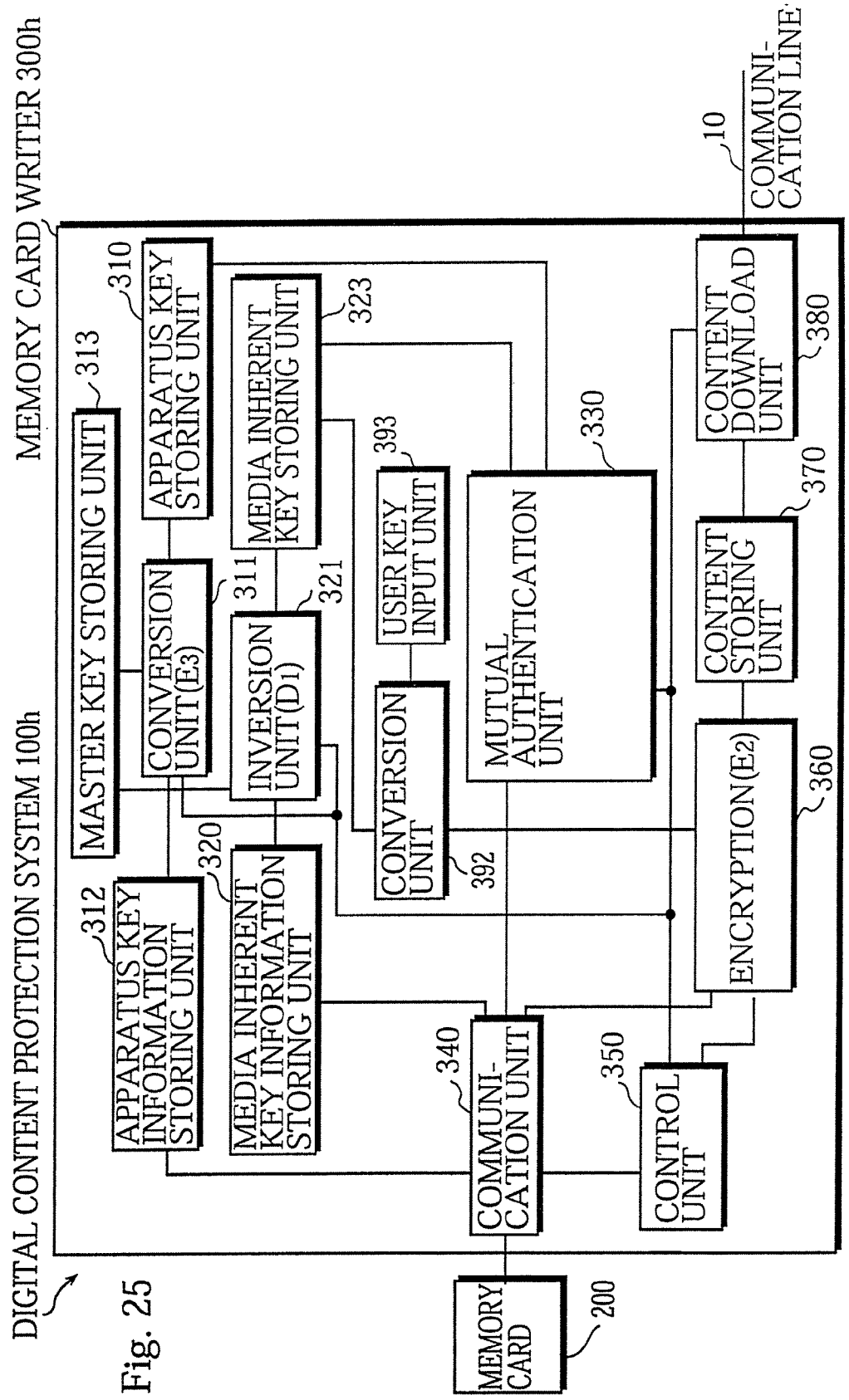
FIG. 25 is a block diagram showing the construction of the digital content protection system 100h of the eighth embodiment.
Figure 26:
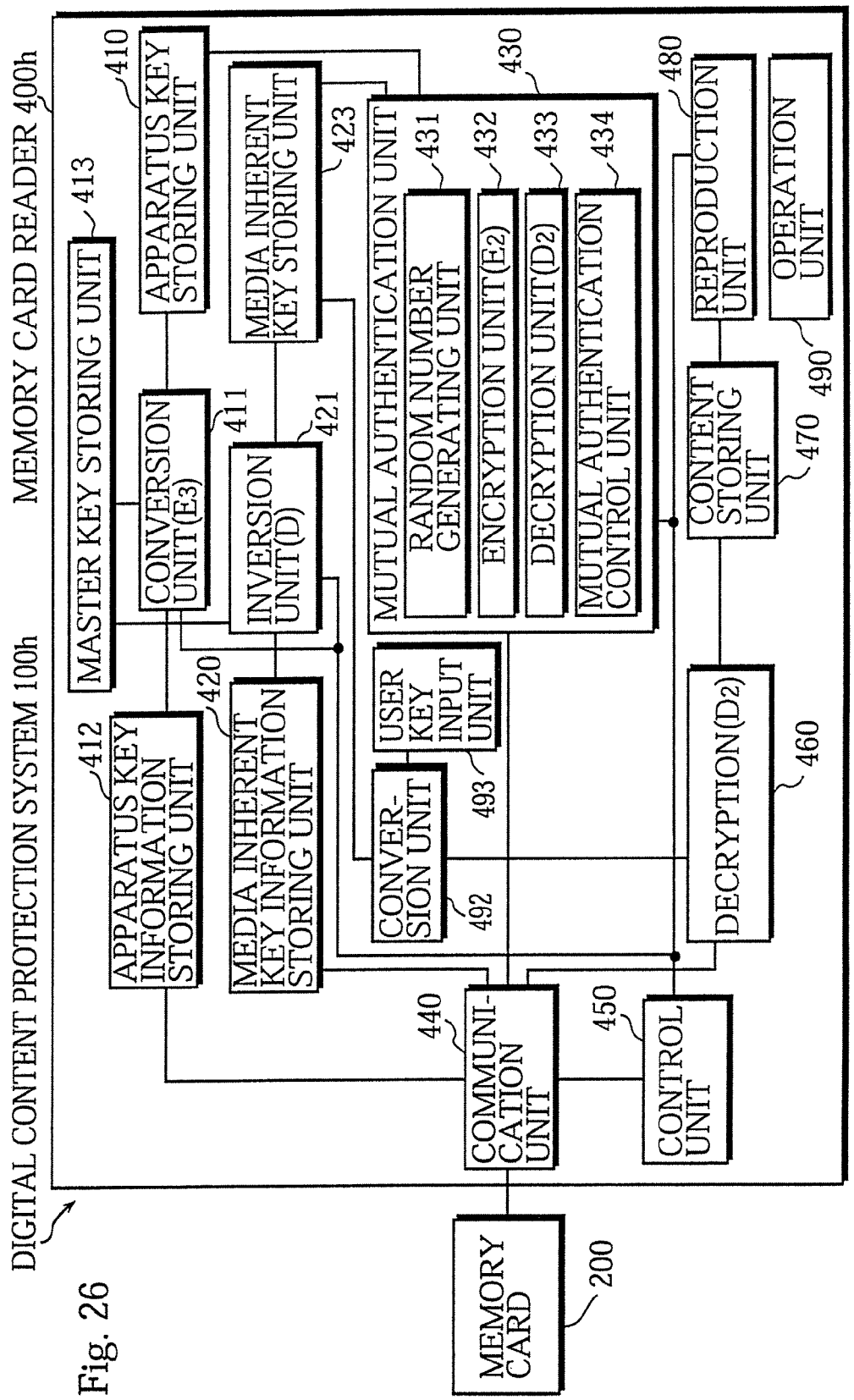
FIG. 26 is another block diagram showing the construction of the digital content protection system 100h.

The digital content protection system 100*h* of this embodiment includes the memory card 200, a memory card writer 300*h*, and a memory card reader 400*h*. These elements are shown in FIGS. 25 and 26.

The memory card 200 of this system is the same as that of the digital content protection system 100 and is not described here. The memory card writer 300*h* and the memory card reader 400*h* are respectively similar to the memory card writer 300 and the memory card reader 400. Therefore, the following description centers on the different aspects of these elements.

3.9.1 Memory Card Writer 300*h*

The memory card writer 300*h* differs from the memory card writer 300 in that the memory card writer 300*h* further includes a conversion unit 392 and a user key input unit 393. Also, the encryption unit 360 of the memory card writer 300*h* differs from the encryption unit 360 of the memory card writer 300. Other elements of the memory card writer 300*h* are respectively the same as those of the memory card writer 300.

(1) User Key Input Unit 393

The user key input unit 393 includes an input device such as a keyboard and receives a user key from a user. The user key means a password that is determined by each user, is known only by the user, and is inherent in the user. Also, the user key is a combination of alphabets, numbers, and symbols.

After receiving the user key, the user key input unit 393 outputs the user key to the conversion unit 392.

(2) Conversion Unit 392

The conversion unit 392 first reads the inherent key K'i from the media inherent key storing unit 323 and receives the user key from the user key input unit 393.

The conversion unit 392 then generates a transformed key by performing a predetermined calculation on the inherent key K'i and the user key. Here, the predetermined calculation is an exclusive disjunction (exclusive OR).

The conversion unit 392 finally outputs the transformed key to the encryption unit 360.

(3) Encryption Unit 360

In the above examples, the encryption unit 360 reads the inherent key K'i from the media inherent key storing unit 323, divides the content read from the content storing unit 370 into a plurality of partial contents Ci (i=1, 2, 3, . . . ) which is each a 64-bit bit string, and generates a plurality of encrypted partial contents Fi (i=1, 2, 3, . . . ) by applying the encryption algorithm E2 to each partial content Ci using the inherent key K'i as the key of the encryption algorithm E2. Instead of these operations, in this embodiment, the encryption unit 360 receives the transformed key from the conversion unit 392, divides the content read from the content storing unit 370 into a plurality of partial contents Ci (i=1, 2, 3, . . . ) which is each a 64-bit bit string, and generates a plurality of encrypted partial contents Fi (i=1, 2, 3, . . . ) by applying the encryption algorithm E2 to each partial content Ci using the transformed key as the key of the encryption algorithm E2.

3.9.2 Memory Card Reader 400h

The memory card reader 400h differs from the memory card reader 400 in that the memory card reader 400h further includes a conversion unit 492 and a user key input unit 493. Also, the decryption unit 460 of the memory card reader 400h differs from that of the memory card reader 400. Other elements of the memory card reader 400h are respectively the same as those of the memory card reader 400.

(1) User Key Input Unit 493

The user key input unit 493 receives a user key from a user and outputs the user key to the conversion unit 492, like the user key input unit 393.

(2) Conversion Unit 492

The conversion unit 492 first reads the inherent key K'i from the media inherent key storing unit 423 and receives the user key from the user key input unit 493.

The conversion unit 392 then generates a transformed key by performing a predetermined calculation on the inherent key K'i and the user key. Here, the predetermined calculation is an exclusive disjunction.

The conversion unit 492 finally outputs the transformed key to the decryption unit 460.

(3) Decryption Unit 460

In the above examples, the decryption unit 460 reads the inherent key K'i from the media inherent key storing unit 423, divides the encrypted content read from the content storing unit 470 into a plurality of encrypted partial contents Gi (i=1, 2, 3, . . . ) which is each a 64-bit bit string, and generates a plurality of partial contents Hi (i=1, 2, 3, . . . ) by applying the decryption algorithm D2 to each encrypted partial content Gi using the inherent key K'i as the key of the decryption algorithm D2. Instead of these operations, in this embodiment, the decryption unit 460 receives the transformed key from the conversion unit 492, divides the encrypted content read from the content storing unit 470 into a plurality of encrypted partial contents Gi (i=1, 2, 3, . . . ) which is each a 64-bit bit string, and generates a plurality of partial contents Hi (i=1, 2, 3, . . . ) by applying the decryption algorithm D2 to each encrypted partial content Gi using the transformed key as the key of the decryption algorithm D2.

3.9.3 Operation of Digital Content Protection System 100h

The following is a description of the operation of the digital content protection system 100h.

The authentication operations in the case where the memory card 200 is placed in the memory card writer 300h and in the case where the memory card 200 is placed in the memory card reader 400h are the same as those performed in the digital content protection system 100 and are not described here.

The following description concerns the operation outlines in the case where the memory card 200 is placed in the memory card writer 300h and in the case where the memory card 200 is placed in the memory card reader 400h.

Figure 7:
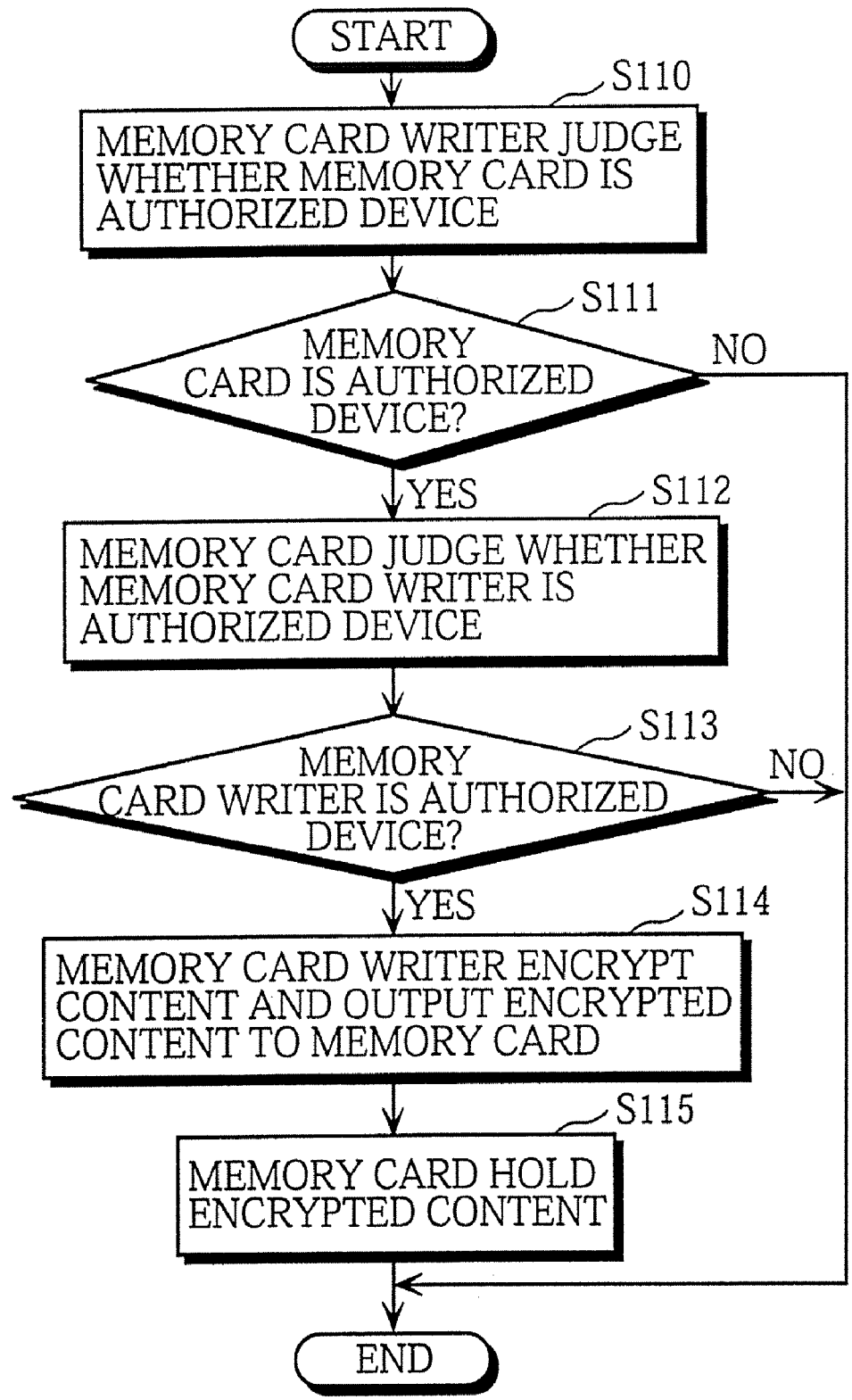
FIG. 7 is a flowchart showing the operation outline in the case where the memory card 200 is placed in the memory card writer 300.
Figure 27:
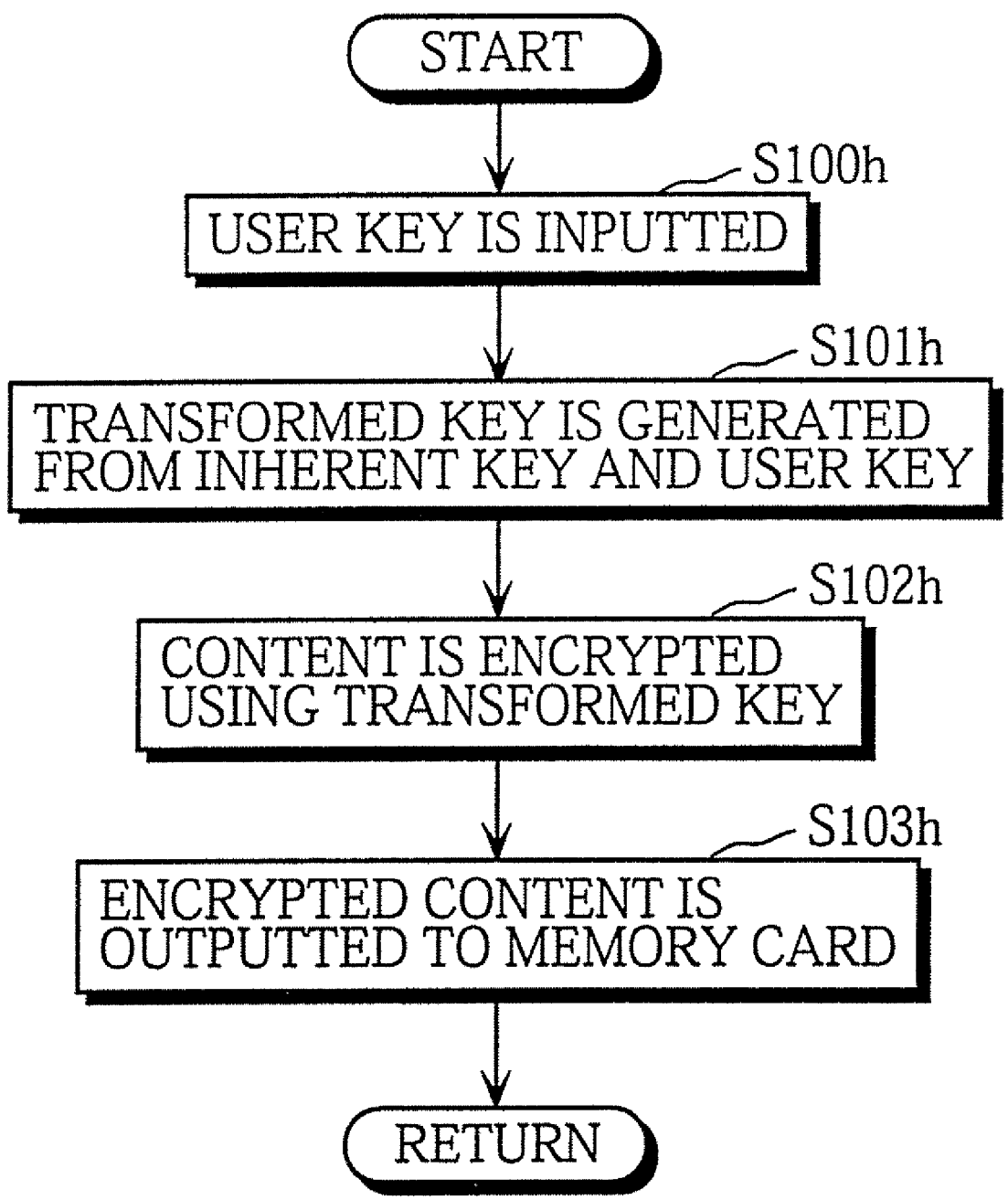
FIG. 27 shows the operation outline of the digital content protection system 100h in the case where the memory card 200 is placed in the memory card writer 300h.

(1) Operation Outline in the Case where Memory Card 200 is Placed in Memory Card Writer 300h When the memory card 200 is placed in the memory card writer 300h, the operation in the flowchart shown in FIG. 7 is also performed. However, the different operation is performed in step S114 in the digital content protection system 100h and is described below with reference to the flowchart shown in FIG. 27.

The user key input unit 393 receives a user key from a user and outputs the user key to the conversion unit 392 (step S100h). The conversion unit 392 reads the inherent key K'i from the media inherent key storing unit 323, receives the user key from the user key input unit 393, generates a transformed key by performing the predetermined calculation on the inherent key K'i and the user key, and outputs the transformed key to the encryption unit 360 (step S101h). The encryption unit 360 receives the transformed key from the conversion unit 392, divides the content read from the content storing unit 370 into a plurality of partial contents Ci (i=1, 2, 3, . . . ) which is each a 64-bit bit string, generates a plurality of encrypted partial contents Fi (i=1, 2, 3, . . . ) by applying the encryption algorithm E2 to each partial content Ci using the transformed key as the key of the encryption algorithm E2, and outputs the plurality of encrypted partial contents Fi to the communication unit 340 (step S102h). The communication unit 340 outputs the plurality of encrypted partial contents Fi to the communication unit 270 of the memory card 200 (step S103h).

Figure 8:
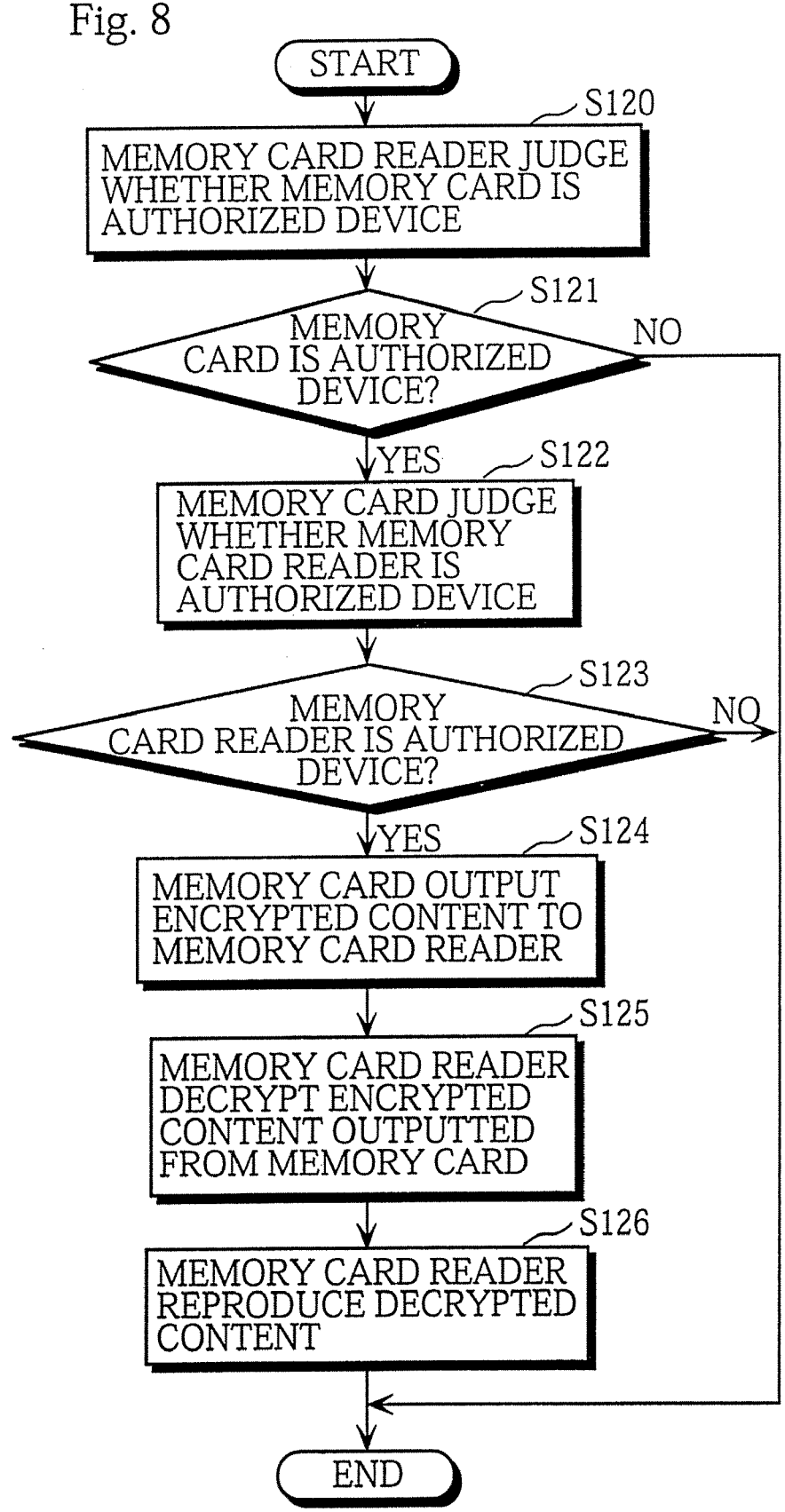
FIG. 8 is a flowchart showing the operation outline in the case where the memory card 200 is placed in the memory card reader 400.
Figure 28:
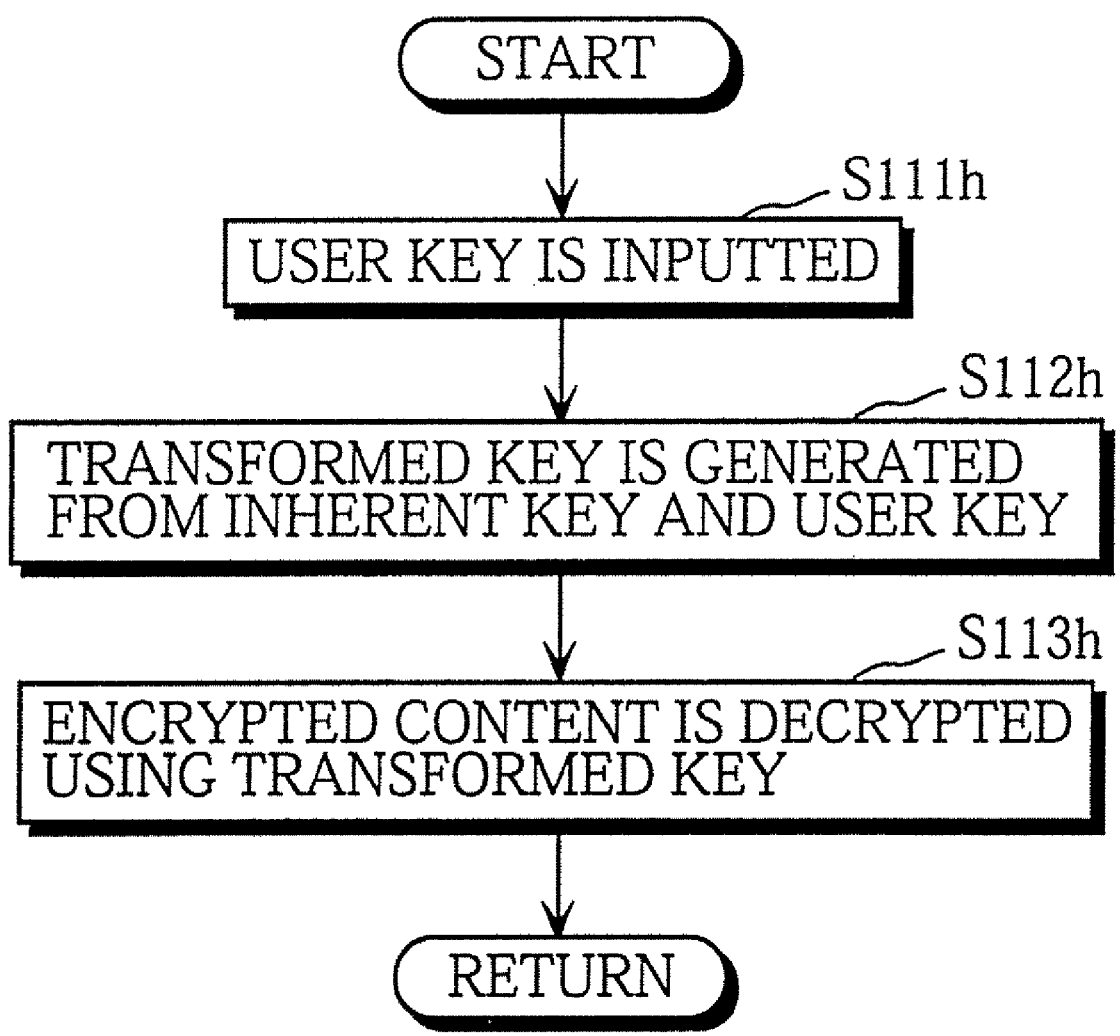
FIG. 28 shows the operation outline of the digital content protection system 100h in the case where the memory card 200 is placed in the memory card reader 400h.

(2) Operation Outline in the Case where Memory Card 200 is Placed in Memory Card Reader 400h When the memory card 200 is placed in the memory card reader 400h, the operation in the flowchart shown in FIG. 8 is also performed. However, the different operation is performed in step S125 in the digital content protection system 100h and is described below with reference to the flowchart shown in FIG. 28.

The user key input unit 493 receives a user key from a user and outputs the user key to the conversion unit 492 (step S111h). The conversion unit 492 reads the inherent key K'i from the media inherent key storing unit 423, receives the user key from the user key input unit 493, generates a transformed key by performing the predetermined calculation on the inherent key K'i and the user key, and outputs the transformed key to the decryption unit 460 (step S112h). The decryption unit 460 receives the transformed key from the conversion unit 492, divides the encrypted content read from the content storing unit 470 into a plurality of encrypted partial contents Gi (i=1, 2, 3, . . . ) which is each a 64-bit bit string, and generates a plurality of partial contents Hi (i=1, 2, 3, . . . ) by applying the decryption algorithm D2 to each encrypted partial content Gi using the transformed key as the key of the decryption algorithm D2 (step S113h).

3.9.5 Conclusion

The users can encrypt contents and decrypt the encrypted contents using user keys set by themselves. Therefore, the digital content protection system of this embodiment protects contents owned by the users. That is, the present digital content protection system prevents such contents from being decoded by others.

3.10 Ninth Embodiment

Figure 30:
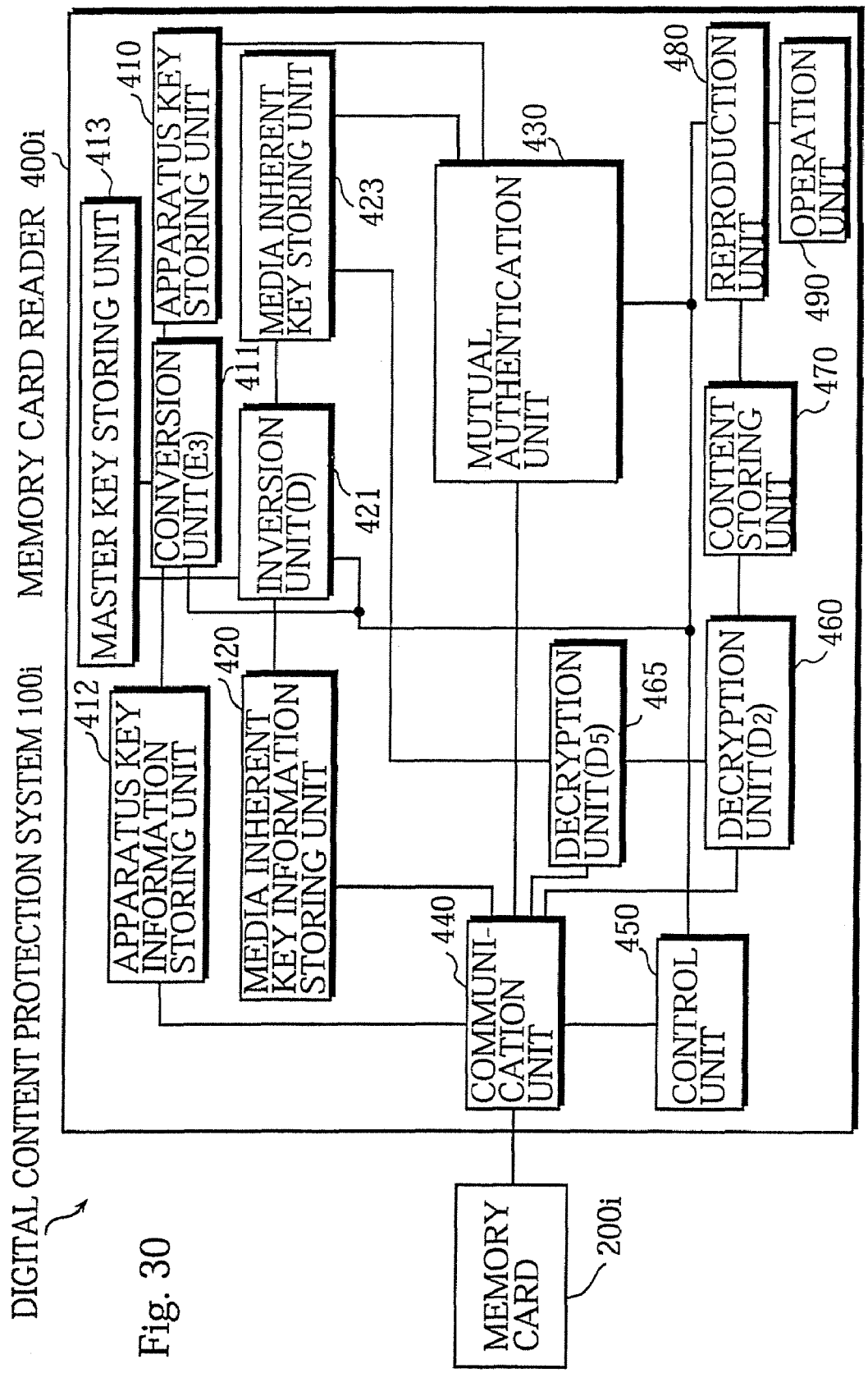
FIG. 30 is another block diagram showing the construction of the digital content protection system 100i.

The digital content protection system 100i of this embodiment includes a memory card 200i, a memory card writer 300i, and a memory card reader 400i. These elements are shown in FIGS. 29 and 30.

The memory card 200i, the memory card writer 300i, and the memory card reader 400i are respectively similar to the memory card 200, the memory card writer 300, and the memory card reader 400 of the digital content protection system 100. Therefore, the following description centers on the different aspects of these elements.

3.10.1 Memory Card Writer 300i

The memory card writer 300i differs from the memory card writer 300 in that the memory card writer 300i further includes an encryption unit 365 and a file key generating unit 366. Also, the control unit 350, the content download unit 380, the content storing unit 370, the encryption unit 360, and the communication unit 340 of the memory card writer 300i differ from those of the memory card writer 300. Other elements of the memory card writer 300i are respectively the same as those of the memory card writer 300 and are not described here.

(1) Control Unit 350

The control unit 350 outputs a download signal to the content download unit 380 and outputs a generation signal to the file key generating unit 366. The download signal instructs the content download unit 380 to download a content from the outside as a file. The generation signal instructs the file key generating unit 366 to generate a file key for each file of the downloaded contents.

(2) Content Download Unit 380

The content download unit 380 downloads a content as a file. Here, the file means a collection of data under a certain rule. When the downloaded contents are music data, for instance, one file is generated for a piece of music.

(3) Content Storing Unit 370

The content storing unit 370 holds the downloaded content as a file.

(4) File Key Generating Unit 366

The file key generating unit 366, on receiving the generation signal from the control unit 350, generates a 56-bit file key at random for a file. The file key generating unit 366 then outputs the file key to the encryption units 365 and 360.

It should be noted here that in this embodiment, file keys are generated at random. However, the file key generating unit 366 may receives file keys from a user.

(5) Encryption Unit 365

The encryption unit 365 prestores an encryption algorithm E5 that conforms to DES.

The encryption unit 365 first reads the inherent key K'i from the media inherent key storing unit 323 and receives a file key from the file key generating unit 366.

The encryption unit 365 then generates an encrypted file key by applying the encryption algorithm E5 to the file key using the inherent key K'i as the key of the encryption algorithm E5.

The encryption unit 365 finally outputs the encrypted file key to the communication unit 340.

(6) Encryption Unit 360

In the above embodiments, the encryption unit 360 reads the inherent key K'i from the media inherent key storing unit 323, divides the content read from the content storing unit 370 into a plurality of partial contents Ci (i=1, 2, 3, . . . ) which is each a 64-bit bit string, and generates a plurality of encrypted partial contents Fi (i=1, 2, 3, . . . ) by applying the encryption algorithm E2 to each partial content Ci using the inherent key K'i as the key of the encryption algorithm E2. Instead of these operations, in this embodiment, the encryption unit 360 reads a content of a file, receives a file key from the file key generating unit 366, divides the read content into a plurality of partial contents Ci (i=1, 2, 3, . . . ) which is each a 64-bit bit string, and generates a plurality of encrypted partial contents Fi (i=1, 2, 3, . . . ) by applying the encryption algorithm E2 to each partial content Ci using the file key as the key of the encryption algorithm E2.

(7) Communication Unit 340

The communication unit 340 receives the encrypted file key from the encryption unit 365 and outputs the encrypted file key to the communication unit 270.

3.10.2 Memory Card 200i

The communication unit 270 and the encrypted content storing unit 260 of the memory card 200i differ from those of the memory card 200. Therefore, these elements are described below.

(1) Communication Unit 270

The communication unit 270 receives the encrypted file key from the communication unit 340 and outputs the encrypted file key to the encrypted content storing unit 260 (the encrypted file key outputted to the encrypted content storing unit 260 are shown as an encrypted file key 261 in FIG. 29).

The communication unit 270 also reads the encrypted file key 261 from the encrypted content storing unit 260 and outputs the encrypted file key 261 to the communication unit 440 of the memory card reader 400i.

(2) Encrypted Content Storing Unit 260

The encrypted content storing unit 260 receives the encrypted file key 261 from the communication unit 270 and holds the encrypted file key 261.

The encrypted content storing unit 260 also holds the encrypted partial contents Fi sent from the communication unit 270 (the encrypted partial contents Fi sent from the communication unit 270 are shown as encrypted files 262 in FIG. 29).

3.10.3 Memory Card Reader 400i

The memory card reader 400i differs from the memory card reader 400 in that the memory card reader 400i further includes a decryption unit 465. Also, the communication unit 440 and the decryption unit 460 of the memory card reader 400i differ from those of the memory card reader 400. Other elements of the memory card reader 400i are respectively the same as those of the memory card reader 400 and are not described here.

(1) Communication Unit 440

The communication unit 440 receives the encrypted file key from the communication unit 270 and outputs the encrypted file key to the decryption unit 465.

(2) Decryption Unit 465

The decryption unit 465 prestores a decryption algorithm D5 that conforms to DES.

Here, the relation between the encryption algorithm E5 prestored in the encryption unit 365 and the decryption algorithm D5 can be expressed by Formula 17 give below.

$$E5 = crpt(D5) \qquad \text{<Formula 17>}$$

The decryption unit 465 first reads the inherent key K'i from the media inherent key storing unit 423 and receives the encrypted file key from the communication unit 440.

The decryption unit 465 then generates a file key by applying the decryption algorithm D5 to the encrypted file key using the inherent key K'i as the key of the decryption algorithm D5.

The decryption unit 465 finally outputs the file key to the decryption unit 460.

(3) Decryption Unit 460

In the above examples, the decryption unit 460 reads the inherent key K'i from the media inherent key storing unit 423, divides the encrypted content read from the content storing unit 470 into a plurality of encrypted partial contents Gi (i=1, 2, 3, . . . ) which is each a 64-bit bit string, and generates a plurality of partial contents Hi (i=1, 2, 3, . . . ) by applying the decryption algorithm D2 to each encrypted partial content Gi using the inherent key K'i as the key of the decryption algorithm D2. Instead of these operations, in this embodiment, the decryption unit 460 receives the file key from the decryption unit 465, divides the encrypted content read from the content storing unit 470 into a plurality of encrypted partial contents Gi (i=1, 2, 3, . . . ) which is each a 64-bit bit string, and generates a plurality of partial contents Hi (i=1, 2, 3, . . . ) by applying the decryption algorithm D2 to each encrypted partial content Gi using the file key as the key of the decryption algorithm D2.

3.10.4 Operation of Digital Content Protection System 100i

The following is a description of the operation of the digital content protection system 100i.

The authentication operations in the case where the memory card 200i is placed in the memory card writer 300i and in the case where the memory card 200i is placed in the memory card reader 400i are the same as those performed in the digital content protection system 100 and are not described here. The following description concerns the operation outlines in the case where the memory card 200i is placed in the memory card writer 300i and in the case where the memory card 200i is placed in the memory card reader 400i.

Figure 31:
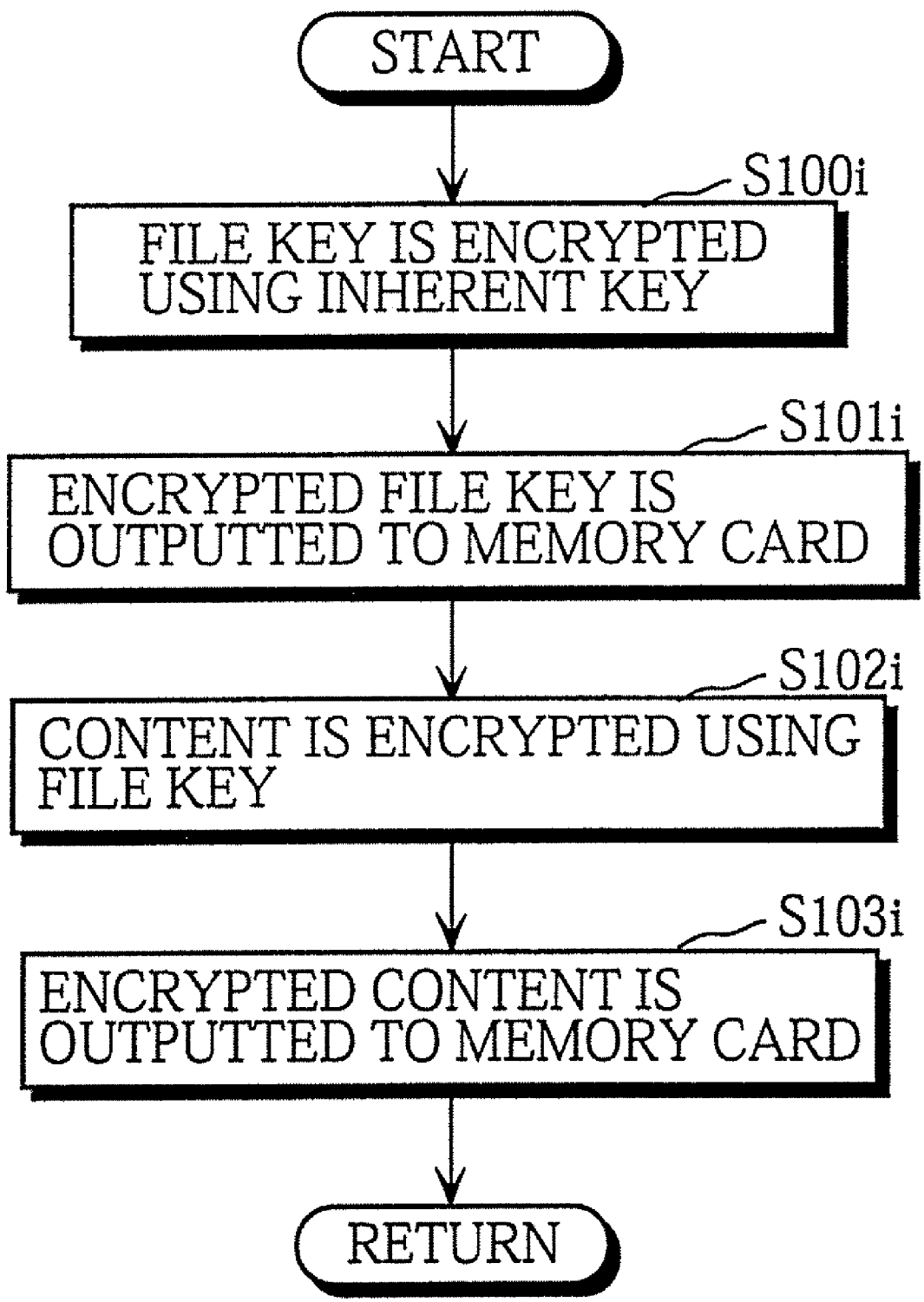
FIG. 31 shows the operation outline of the digital content protection system 100i in the case where the memory card 200i is placed in the memory card writer 300i.

(1) Operation Outline in the Case where Memory Card 200 is Placed in Memory Card Writer 300i When the memory card 200i is placed in the memory card writer 300i, the operation in the flowchart shown in FIG. 7 is also performed. However, the different operation is performed in step S114 in the digital content protection system 100 and is described below with reference to the flowchart shown in FIG. 31.

On receiving a generation signal, the file key generating unit 366 generates a 64-bit file key at random, outputs the file key to the decryption unit 365. The encryption unit 365 receives the file key from the file key generating unit 366, reads the inherent key K'i from the media inherent key storing unit 323, generates an encrypted file key by applying the encryption algorithm E5 to the file key using the inherent key K'i as the key of the encryption algorithm E5, and outputs the encrypted file key to the communication unit 340 (step S100i). The communication unit 340 receives the encrypted file key from the encryption unit 365 and outputs the encrypted file key to the communication unit 270 (step S101i). The encryption unit 360 receives the file key from the file key generating unit 366, and divides the content read from the content storing unit 370 into a plurality of partial contents Ci (i=1, 2, 3, . . . ) which is each a 64-bit bit string, generates a plurality of encrypted partial contents Fi (i=1, 2, 3, . . . ) by applying the encryption algorithm E2 to each partial content Ci using the file key as the key of the encryption algorithm E2 (step S102i). The communication unit 340 receives the plurality of encrypted partial contents Fi from the encryption unit 360 and outputs the plurality of encrypted partial contents Fi to the communication unit 270 of the memory card 200i (step S103i).

Figure 32:
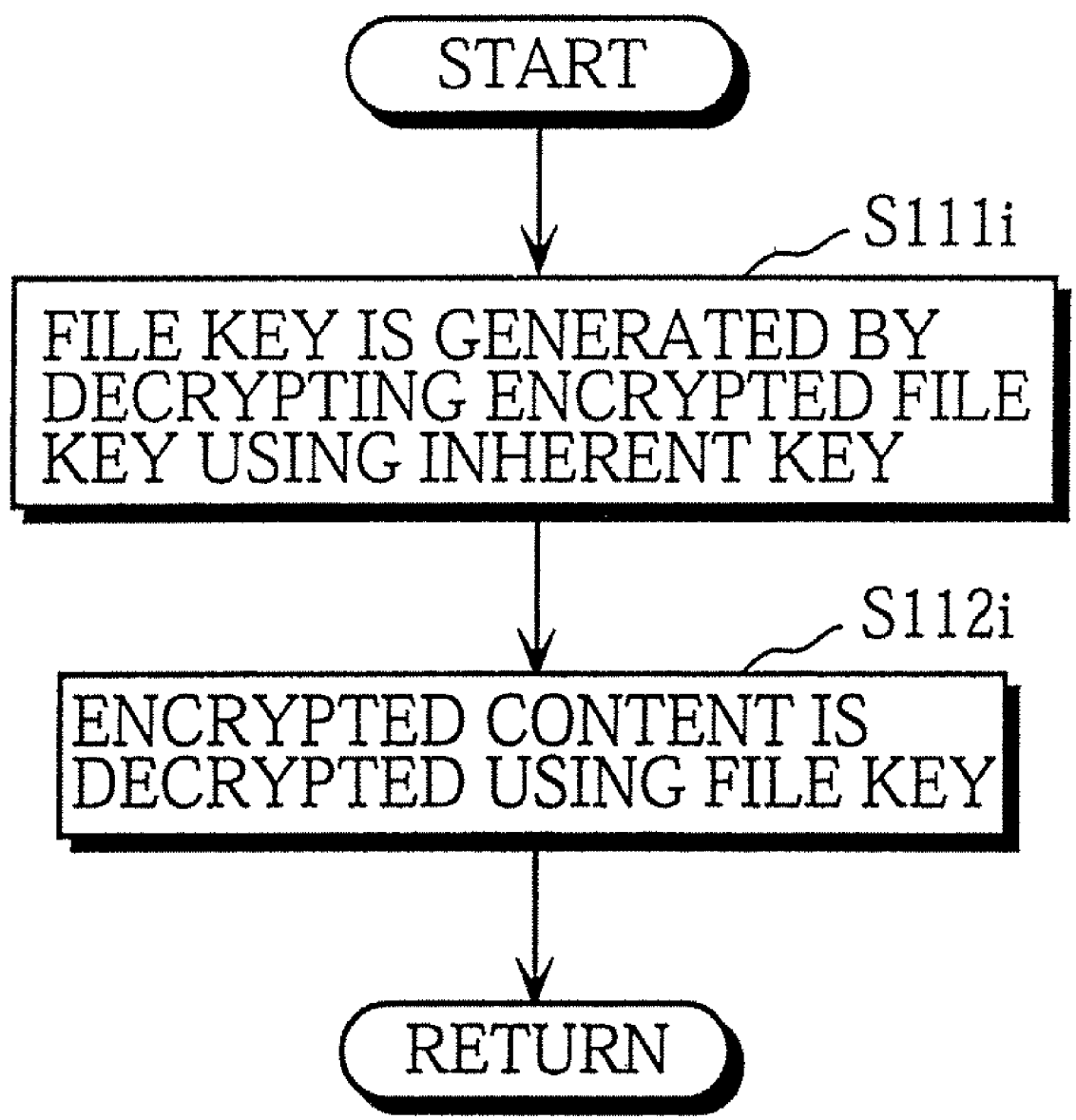
FIG. 32 shows the operation outline of the digital content protection system 100i in the case where the memory card 200i is placed in the memory card reader 400i.

(2) Operation Outline in the Case where Memory Card 200 is Placed in Memory Card Reader 400i When the memory card 200i is placed in the memory card reader 400i, the operation in the flowchart shown in FIG. 8 is also performed. However, the different operation is performed in step S125 in the digital content protection system 100i and is described below with reference to the flowchart shown in FIG. 32.

The communication unit 440 receives the encrypted file key from the communication unit 270 and outputs the encrypted file key to the decryption unit 465. The decryption unit 465 receives the encrypted file key from the communication unit 440, reads the inherent key K'i from the media inherent key storing unit 423, generates the file key by applying the decryption algorithm D5 to the encrypted file key using the inherent key K'i as the key of the decryption algorithm D5, and outputs the file key to the decryption unit 460 (step S111i). The decryption unit 460 receives the file key from the decryption unit 465, divides the encrypted content read from the content storing unit 470 into a plurality of encrypted partial contents Gi (i=1, 2, 3, . . . ) which is each a 64-bit bit string, and generates a plurality of partial contents Hi (i=1, 2, 3, . . . ) by applying the decryption algorithm D2 to each encrypted partial content Gi using the file key as the key of the decryption algorithm D2 (step S112i).

3.10.5 Conclusion

As described above, when a recording medium device is connected to an access device that is a memory card writer, each of the devices judges whether the other device is an authenticated device. If the judgement result is affirmative, the access device encrypts a digital content using file keys and writes the encrypted digital content into the recording medium device. More specifically, the access device generates file keys for respective files of the digital content, encrypts the file keys using an inherent key that has been secretly sent from the recording medium device, encrypts the files of the digital content using the file keys, and sends the encrypted file keys and the encrypted files to the recording medium device. The recording medium device receives the encrypted file keys and the encrypted files from the access device and holds them.

Also, when the recording medium device that holds the encrypted file keys and the encrypted files is connected to an access device that is a memory card reader, each of the devices judges whether the other device is an authenticated device. If the judgement result is affirmative, the access device decrypts the encrypted files and reproduces the decrypted files. More specifically, the recording medium device outputs the encrypted file keys and the encrypted files to the access device. The access device receives the encrypted file keys and the encrypted files from the recording medium device, decrypts the encrypted file keys using an inherent key that has been secretly sent from the recording medium device, decrypts the encrypted files using the decrypted file keys, and reproduces the decrypted files.

In this manner, the digital content protection system of this embodiment generates a file key inherent in each file of downloaded contents and encrypts the files using the file keys. Because this makes it difficult for third parties to intercept files, the present digital content protection system achieves a high security for the files.

It should be noted here that the digital content protection system 100i may be modified as follows.

(1) First Modification of Digital Content Protection System 100i

Figure 33:
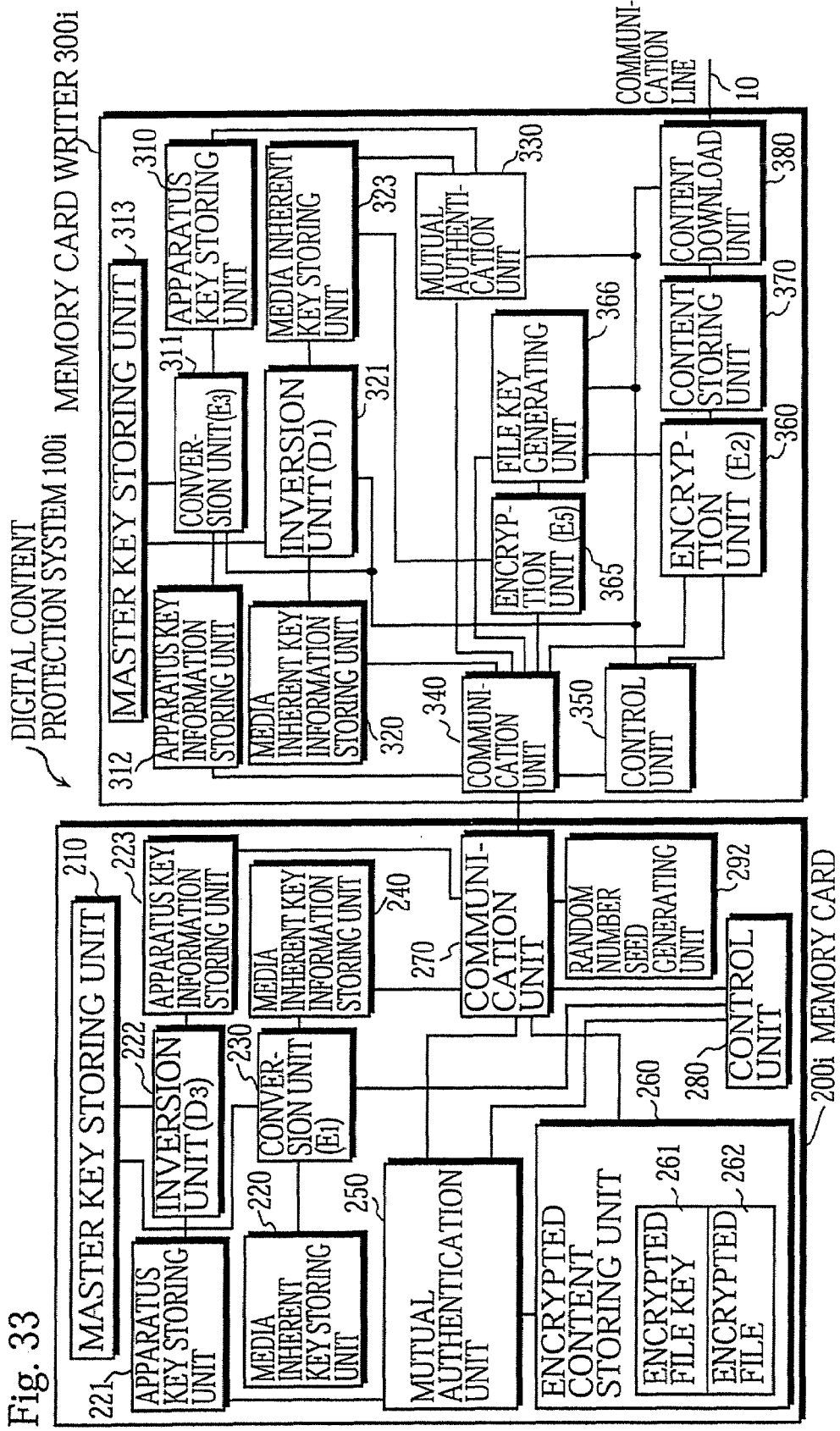
FIG. 33 is a block diagram showing the construction of the digital content protection system 100i of a modification.

FIG. 33 is a block diagram of the digital content protection system 100i of the first modification.

As shown in this drawing, the memory card 200i further includes a random number seed generating unit 292 that generates a seed. Here, the seed is an initial value of a random number and is, in this modification, 64-bit time data. It is preferable to use a value, such as time data, that changes by the hour as the seed. The random number seed generating unit 292 generates the seed and outputs it to the communication unit 270. After receiving the seed, the communication unit 270 outputs the seed to the communication unit 340. The communication unit 340 outputs the seed sent from the communication unit 270 to the file key generating unit 366. The file key generating unit 366 receives the seed from the communication unit 340, generates a random number using the seed, and sets the random number as a file key.

Note that the file key generating unit 366 may generate a random number as follows.

The file key generating unit 366 generates a cipher text by applying a predetermined encryption algorithm to the seed using a predetermined key. The file key generating unit 366 then reapplies the predetermined algorithm to the cipher text to generate another cipher text. The file key generating unit 366 repeats this encryption processing by certain times and uses the final cipher text as the random number.

(2) Second Modification of Digital Content Protection System 100i

Figure 34:
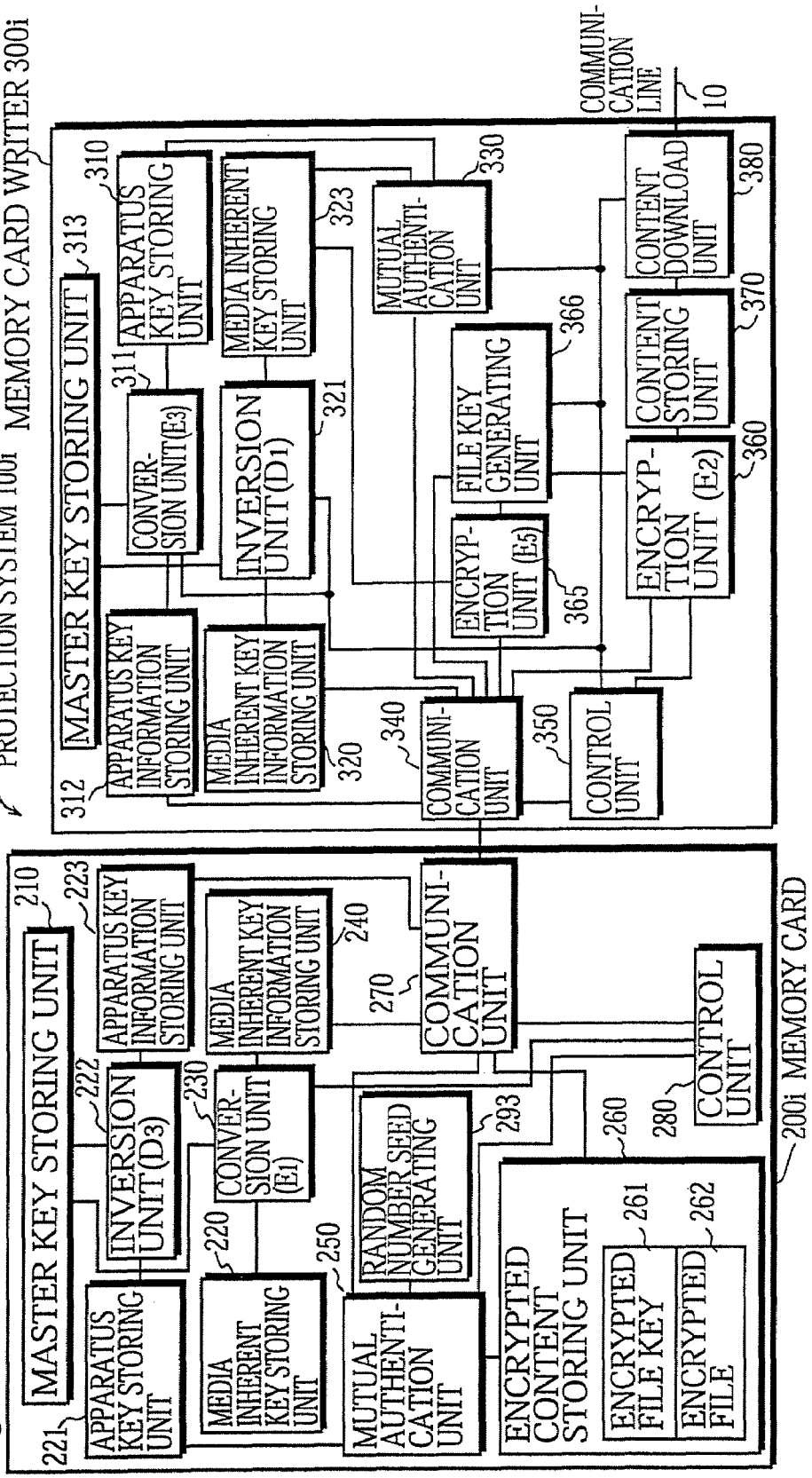
FIG. 34 is a block diagram showing the construction of the digital content protection system 100i of another modification.

FIG. 34 is a block diagram of the digital content protection system 100i of the second modification.

As shown in this drawing, the memory card 200i of this modification further includes a random number seed generating unit 293. Like the random number seed generating unit 292, the random number seed generating unit 293 generates a seed. Here, the seed is an initial value of a random number and is, in this modification, 64-bit time data. It is preferable to use a value, such as time data, that changes by the hour as the seed. The random number seed generating unit 293 generates a seed and outputs the seed to the mutual authentication unit 250. After receiving the seed, the mutual authentication unit 250 performs its authentication process and outputs the seed to the mutual authentication unit 330 via the communication units 270 and 340. The authentication unit 330 receives the seed from the communication unit 340 and outputs the seed to the file key generating unit 366. The file key generating unit 366 receives the seed from the mutual authentication unit 330, generates a random number using the seed, and sets the random number as a file key.

Figure 10:
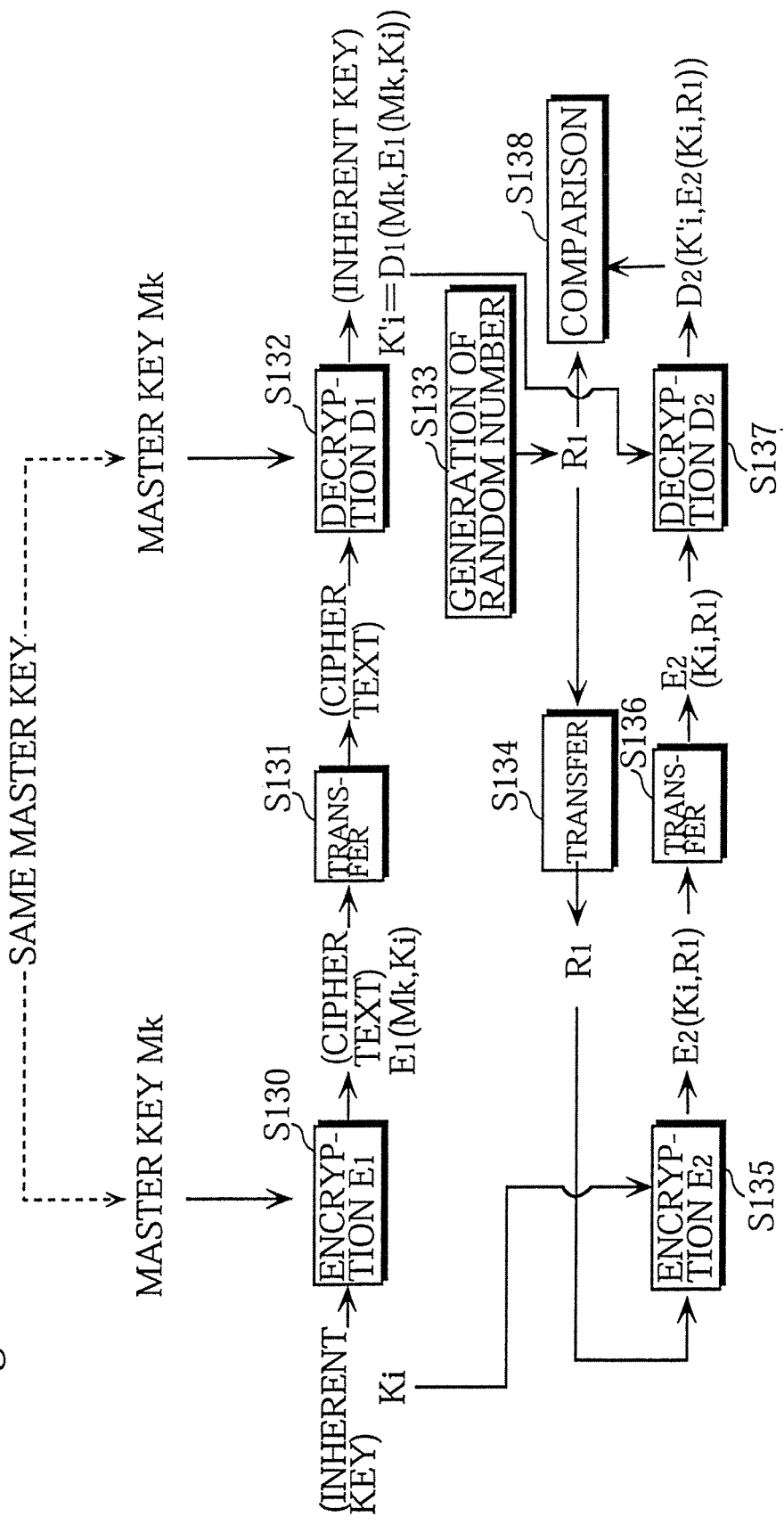
FIG. 10 shows the authentication operation performed by the memory card writer 300 to judges whether the memory card 200 is an authorized device.

During the authentication processing, the digital content protection system 100i of the first and second modifications perform different processing in steps S135, S136, S137, and S138 in the authentication operation shown in FIGS. 9 and 10. Therefore, the following description centers on these steps.

In step S135, the encryption unit 252 receives a seed S from the random number seed generating unit 293 and combines the seed S with the random number R1 to generate (R1+S) that is a 128-bit bit string. The encryption unit 252 generates an encrypted random number E2 (Ki, (R1+S)) by applying the encryption algorithm E2 to (R1+S) using the inherent key Ki as the key of the encryption algorithm E2. Here, because (R1+S) is a 128-bit bit string, the encryption unit 252 divides (R1+S) into two 64-bit blocks and encrypts each block.

In step S136, the communication unit 270 outputs the encrypted random number E2 (Ki,(R1+S)) to the decryption unit 333 via the communication units 270 and 340.

In step S137, the decryption unit 333 generates D2 (K'i,E2 (Ki,(R1+S)) by applying the decryption algorithm D2 to the encrypted random number E2 (Ki, (R1+S)) using the inherent key K'i as the key of the decryption algorithm D2. The decryption unit 333 then divides D2 (K'i,E2 (Ki,(R1+S)) into two 64-bit bit strings.

In step S138, the mutual authentication control unit 334 judges whether the random number R1 matches the former one of the two 64-bit bit strings. If the comparison result is affirmative, the mutual authentication control unit 334 judges that the memory card 200 is an authorized device; if not, the mutual authentication control unit 334 judges that the memory card 200 is an unauthorized device. If the comparison result is affirmative, the mutual authentication control unit 334 also determines that the latter one of the two 64-bit bit strings is the seed S and outputs the seed S to the file key generating unit 366.

Note that in the above modification, the encryption unit 252 combines the random number R1 with the seed S to generate (R1+S). However, the encryption unit 252 may divide the random number R1 into two bit strings, divide the seed S into two 32-bit bit strings, combine the former bit string of the random number R1 with the former bit string of the seed S in the order, and combine the latter bit string of the random number R1 with the latter bit string of the seed S in the order.

(3) Third Modification of Digital Content Protection System 100i

In this modification, the downloaded content is divided into one or more data blocks in logical or physical units, each data block is encrypted and is transferred to a recording medium, and the encrypted data blocks are transferred from the recording medium and are decrypted. During encryption, data block keys that are unique to respective data blocks are generated, the data blocks are encrypted using the unique data block keys and the inherent key obtained after the authentication processing, and the encrypted data blocks are transferred to the recording medium. During decryption, the encrypted data blocks are transferred from the recording medium and are decrypted.

More specifically, when each of the memory card 200i and the memory card writer 300i judges that the other device is an authenticated device, the memory card writer 300i divides the downloaded content into one or more data blocks, generates a data block key for each data block, encrypts each data block using the inherent key and the data block key of the data block, and sends the encrypted data blocks to the memory card 200i. When the memory card 200i and the memory card reader 400i judges that they are connected to authenticated devices, the memory card reader 400i receives the encrypted data blocks from the memory card 200i, generates data block keys for respective encrypted data blocks, and decrypts the encrypted data blocks using the inherent key and the data block keys.

With this construction, the digital content protection system of this modification generates a data block key unique to each data block of the downloaded content and encrypts the data block using the data block key. Because this makes it difficult for third parties to intercept data blocks, the present digital content protection system achieves a high security for the data blocks.

3.11 Tenth Embodiment

The digital content protection system 100j of the present embodiment includes a memory card 200j, a memory card writer 300j, and a memory card reader 400j. These devices are not shown in the drawings.

The memory card 200j secretly sends its inherent key to the memory card writer 300j, the memory card writer 300j judges whether the memory card 200j is an authorized device using the inherent key, and the memory card 200j judges whether the memory card writer 300j is an authorized device using the inherent key. Only if both of the memory card 200j and the memory card writer 300j judge that the other device is an authorized device, the memory card writer 300j outputs digital contents to the memory card 200j. When the memory card 200j is connected to the memory card reader 400j, the same authentication operation is performed.

The memory card 200j, the memory card writer 300j, and the memory card reader 400j are respectively similar to the memory card 200, the memory card writer 300, and the memory card reader 400. Therefore, the following description centers on the different aspects of these elements.

3.11.1 Memory Card 200j

The memory card 200j includes a master key storing unit 210, a media inherent key storing unit 220, a conversion unit 230, a media inherent key information storing unit 240, a mutual authentication unit 250, an encrypted content storing unit 260, a communication unit 270, and a control unit 280. The mutual authentication unit 250 includes a random number generating unit 251, a conversion unit 255, and a mutual authentication control unit 254.

The master key storing unit 210, the media inherent key storing unit 220, the conversion unit 230, and the media inherent key information storing unit 240 of the memory card 200j are respectively the same as those of the memory card 200. Therefore, the following description concerns the different elements.

(1) Random Number Generating Unit 251

The random number generating unit 251 generates a random number R2 that is a 64-bit bit string and outputs the random number R2 to the communication unit 270 and the conversion unit 255.

(2) Conversion Unit 255

The conversion unit 255 prestores a function f1.

The conversion unit 255 receives a random number R1 from the communication unit 270, reads the inherent key Ki from the media inherent key storing unit 220, and generates a conversion coefficient Q1. The conversion coefficient Q1 can be expressed by Formula 18 given below.

$Q1 = f1(Ki, R1)$ <Formula 18>

Here, the function f1 is a one-way function. The one-way function means a function having a feature that it is easy to calculate output values from input values but it is difficult to calculate input values from output values. The one-way function is, for instance, an encryption function.

The conversion unit 255 outputs the conversion coefficient Q1 to the communication unit 270.

The conversion unit 255 also receives the random number S2 from the random number generating unit 251, reads the inherent key Ki from the media inherent key storing unit 220, and generates a conversion coefficient Q2 by applying the function f1 to the random number R2 using the inherent key Ki. The conversion coefficient Q2 can be expressed by Formula 19 given below.

$Q2 = f1(Ki, R2)$ <Formula 19>

The conversion unit 255 outputs the conversion coefficient Q2 to the mutual authentication control unit 254.

(3) Mutual Authentication Control Unit 254

The mutual authentication control unit 254 first receives the conversion coefficient Q2 from the conversion unit 255 and receives a conversion coefficient Q'2 from the communication unit 270.

The mutual authentication control unit 254 then compares the conversion coefficient Q2 with the conversion coefficient Q'2. If the conversion coefficient Q2 matches the conversion coefficient Q'2, the mutual authentication control unit 254 judges that the memory card writer 300j or the memory card reader 400j in which the memory card 200j is placed is an authorized device; if not, the mutual authentication control unit 254 judges that the memory card writer 300j or the memory card reader 400j is an unauthorized device.

The mutual authentication control unit 254 finally outputs an authentication signal showing whether the memory card writer 300j or the memory card reader 400j is an authorized device to the control unit 280.

(4) Communication Unit 270

The communication unit 270 reads the encrypted inherent key Ji from the media inherent key information storing unit 240 and outputs the encrypted inherent key Ji to the communication unit 340 of the memory card writer 300j or to the communication unit 440 of the memory card reader 400j.

The communication unit 270 also receives the random number R1 from the communication unit 340 of the memory card writer 300j or the communication unit 440 of the memory card reader 400j and outputs the random number R1 to the conversion unit 255 of the mutual authentication unit 250.

The communication unit 270 further receives the conversion coefficient Q1 from the conversion unit 255 and outputs the conversion coefficient Q1 to the communication unit 340 of the memory card writer 300j or the communication unit 440 of the memory card reader 400j.

The communication unit 270 also receives the random number R2 from the random number generating unit 251 and outputs the random number R2 to the communication unit 340 of the memory card writer 300j or the communication unit 440 of the memory card reader 400j.

The communication unit 270 also receives the conversion coefficient Q2 from the communication unit 340 of the memory card writer 300j or the communication unit 440 of the memory card reader 400j and outputs the conversion coefficient Q2 to the mutual authentication control unit 254 of the mutual authentication unit 250.

On receiving a communication termination signal from the control unit 280, the communication unit 270 terminates the communication with the communication unit 340 of the memory card writer 300j or the communication unit 440 of the memory card reader 400j. The communication unit 270 also receives the encrypted partial contents Fi (where i=1, 2, 3, ...) from the communication unit 340 of the memory card writer 300j and outputs the encrypted partial contents Fi to the encrypted content storing unit 260. The communication unit 270 furthermore reads the encrypted partial contents Fi from the encrypted content storing unit 260 and outputs the encrypted partial contents Fi to the communication unit 440 of the memory card reader 400j.

3.11.2 Memory Card Writer 300j

The memory card writer 300j includes a master key storing unit 313, a media inherent key information storing unit 320, an inversion unit 321, a media inherent key storing unit 323, a mutual authentication unit 330, a communication unit 340, a control unit 350, an encryption unit 360, a content storing unit 370, and a content download unit 380. The content download unit 380 is connected to the outside via the communication line 10 and includes a random number generating unit 331, a conversion unit 335, and a mutual authentication control unit 334.

The master key storing unit 313, the media inherent key information storing unit 320, the inversion unit 321, the media inherent key storing unit 323, the control unit 350, the encryption unit 360, the content storing unit 370, and the content download unit 380 are respectively the same as those of the memory card writer 300. Therefore, the following description centers on the different elements.

(1) Random Number Generating Unit 331

The random number generating unit 331 generates the random number R1 that is a 64-bit bit string and outputs the random number R1 to the communication unit 340 and the conversion unit 335.

(2) Conversion Unit 335

The conversion unit 335 prestores a function f1 that is the same as that prestored in the conversion unit 255.

The conversion unit 335 receives the random number R2 from the communication unit 340, reads the inherent key K'i from the media inherent key storing unit 323, and generates the conversion coefficient Q'2 by applying the function f1 to the random number R2 using the inherent key K'i. The conversion coefficient Q'2 can be expressed by Formula 20 given below.

$$Q'2 = f1(K'i, R2) \qquad \text{<Formula 20>}$$

The conversion unit 335 outputs the conversion coefficient Q'2 to the communication unit 340.

The conversion unit 335 also receives the random number R1 from the random number generating unit 331, reads the inherent key K'i from the media inherent key storing unit 323, and generates the conversion coefficient Q'1 by applying the function f1 to the random number R1 using the inherent key K'i. The conversion coefficient $Q'^1$ can be expressed by Formula 21 given below.

$$Q'1 = f1(K'i, R1) \qquad \text{<Formula 21>}$$

The conversion unit 335 outputs the conversion coefficient Q'1 to the mutual authentication control unit 334.

(3) Mutual Authentication Control Unit 334

The mutual authentication control unit 334 first receives the conversion coefficient Q'1 from the conversion unit 335 and receives the conversion coefficient Q1 from the communication unit 340.

The mutual authentication control unit 334 then compares the conversion coefficient Q'1 with the conversion coefficient Q1. If the conversion coefficient Q'1 matches the conversion coefficient Q1, the mutual authentication control unit 334 judges that the memory card 200j that is placed in the memory card writer 300j is an authorized device; if not, the mutual authentication control unit 334 judges that the memory card 200j is an unauthorized device.

The mutual authentication control unit 334 finally outputs an authentication signal showing whether the memory card 200j is an authorized device to the control unit 350.

(4) Communication Unit 340

The communication unit 340 receives the encrypted inherent key Ji from the communication unit 270 and outputs the encrypted inherent key Ji to the media inherent key information storing unit 320.

The communication unit 340 also receives the random number R1 from the random number generating unit 331 and outputs the random number R1 to the communication unit 270 of the memory card 200j.

The communication unit 340 further receives the conversion coefficient Q1 from the communication unit 270 of the memory card 200j and outputs the conversion coefficient Q1 to the mutual authentication control unit 334 of the mutual authentication unit 330.

The communication unit 340 also receives the random number R2 from the communication unit 270 of the memory card 200j and outputs the random number R2 to the conversion unit 335 of the mutual authentication unit 330.

The communication unit 340 also receives the conversion coefficient Q'2 from the conversion unit 335 and outputs the conversion coefficient Q'2 to the communication unit 270 of the memory card 200j.

On receiving a communication termination signal from the control unit 350, the communication unit 340 terminates the communication with the communication unit 270 of the memory card 200j. The communication unit 340 also receives the encrypted partial contents Fi (where i=i, 2, 3, ...) from the encryption unit 360 and outputs the encrypted partial contents Fi to the communication unit 270 of the memory card 200j.

3.11.3 Memory Card Reader 400j

The memory card reader 400j includes a master key storing unit 413, a media inherent key information storing unit 420, an inversion unit 421, a media inherent key storing unit 423, a mutual authentication unit 430, a communication unit 440, a control unit 450, a decryption unit 460, a content storing unit 470, a reproduction unit 480, and an operation unit 490. The mutual authentication unit 430 includes a random number generating unit 431, a conversion unit 435, and a mutual authentication control unit 434.

The master key storing unit 413, the media inherent key information storing unit 420, the inversion unit 421, the media inherent key storing unit 423, the control unit 450, the decryption unit 460, the content storing unit 470, the reproduction unit 480, and the operation unit 490 are respectively the same as those of the memory card reader 400 and are not described here. Also, the communication unit 440, the random number generating unit 431, the conversion unit 435, and the mutual authentication control unit 434 are respectively the same as the communication unit 340, the random number generating unit 331, the conversion unit 335, and the mutual authentication control unit 334 of the memory card writer 300j and are not described here.

3.11.4 Operation of Digital Content Protection System 100j

The following is a description of the operation of the digital content protection system 100j.

The operation outlines in the case where the memory card 200j is placed in the memory card writer 300j and in the case where the memory card 200j is placed in the memory card reader 400j are the same as those performed in the digital content protection system 100 and are not described here. The authentication operation in the case where the memory card 200j is placed in the memory card writer 300j is described in detail below. Note that the same authentication operation is performed in the case where the memory card 200j is placed in the memory card reader 400j and is not described here.

Figure 35:
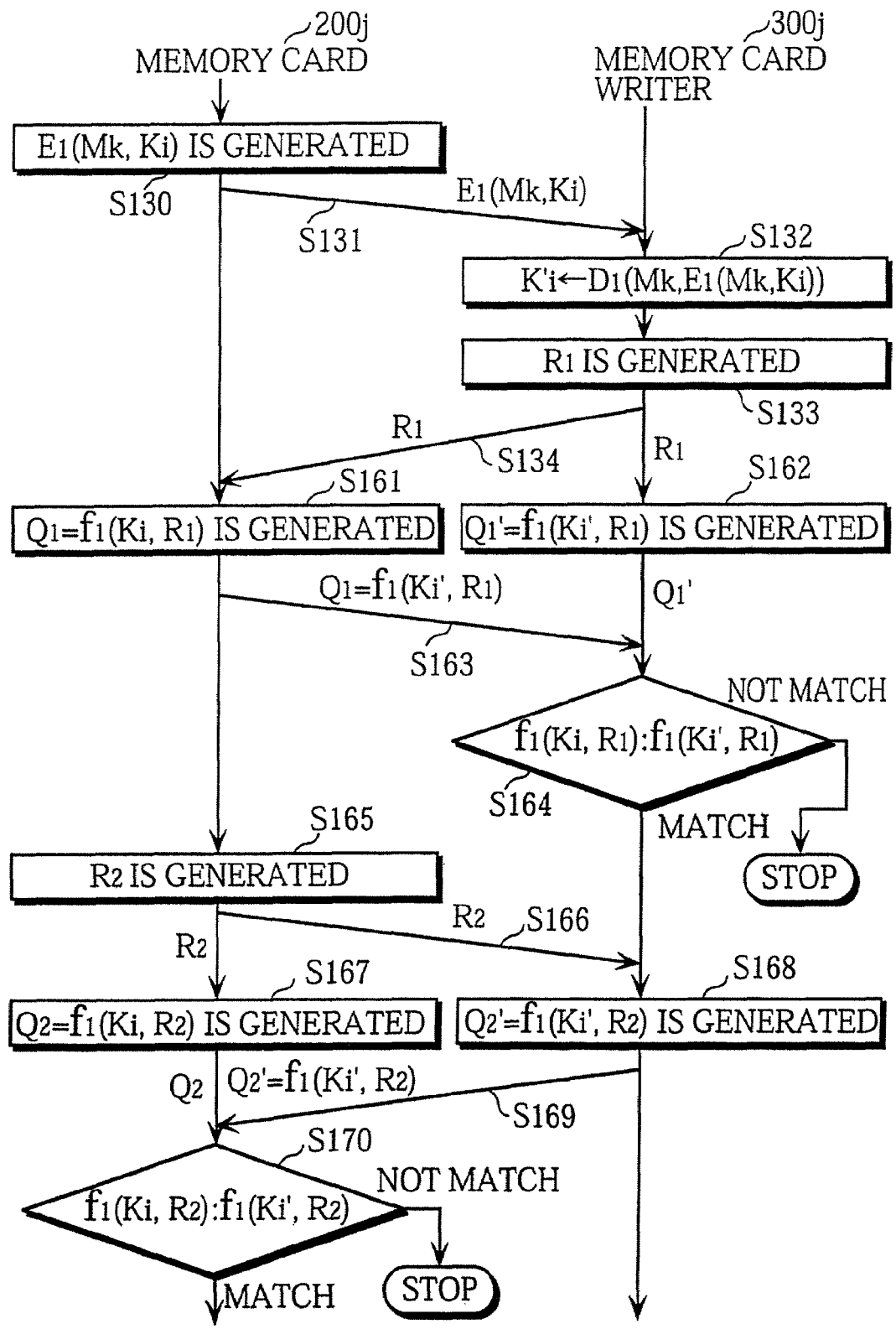
FIG. 35 shows the authentication operation in the case where the memory card 200j is placed in the memory card writer 300j.

(1) Authentication Operation in Case Where Memory Card 200j is Placed in Memory Card Writer 300j The authentication operation in the case where the memory card 200j is placed in the memory card writer 300j is described in detail below with reference to FIG. 35.

Steps S130-S134 are the same those in FIG. 9 and are not described here.

The conversion unit 335 receives the random number R1 from the random number generating unit 331, reads the inherent key K'i from the media inherent key storing unit 323, generates the conversion coefficient Q'1 by applying the function f1 to the random number R1 using the inherent key K'i, and outputs the conversion coefficient Q'1 to the mutual authentication control unit 334 (step S162).

The conversion unit 255 receives the random number R1 from the communication unit 270, reads the inherent key Ki from the media inherent key storing unit 220, generates the conversion coefficient Q1 by applying the function f1 to the random number R1 using the inherent key Ki (step S161), and outputs the conversion coefficient Q1 to the mutual authentication control unit 334 via the communication units 270 and 340 (step S163).

The mutual authentication control unit 334 compares the conversion coefficient Q'1 with the conversion coefficient Q1. If the conversion coefficient Q'1 matches the conversion coefficient Q1, the mutual authentication control unit 334 judges that the memory card 200j is an authorized device; if not, the mutual authentication control unit 334 judges that the memory card 200j is an unauthorized device (step S164).

The random number generating unit 251 generates the random number R2 (step S165), and outputs the random number R2 to the conversion unit 335 via the communication units 270 and 340 (step S166).

The conversion unit 335 receives the random number R2 from the communication unit 340, reads the inherent key K'i from the media inherent key storing unit 323, and generates the conversion coefficient Q'2 by applying the function f1 to the random number R2 using the inherent key K'i (step S168).

The conversion unit 335 then outputs the conversion coefficient Q'2 to the mutual authentication control unit 254 via the communication units 340 and 270 (step S169).

The conversion unit 335 receives the random number R2 from the random number generating unit 251, reads the inherent key Ki from the media inherent key storing unit 220, and generates the conversion coefficient Q2 by applying the function f1 to the random number R2 using the inherent key Ki (step S167).

The mutual authentication control unit 254 compares the conversion coefficient Q2 with the conversion coefficient Q'2. If the conversion coefficient Q2 matches the conversion coefficient Q'2, the mutual authentication control unit 254 judges that the memory card writer 300j or the memory card reader 400j in which the memory card 200j is placed is an authorized device; if not, the mutual authentication control unit 254 judges that the memory card writer 300j or the memory card reader 400j is an unauthorized device (step S170).

3.11.5 Conclusion

As described above, like the digital content protection system 100, the digital content protection system 100j prevents an authorized device from transferring contents to an unauthorized device. This prevents contents that have been properly downloaded from being used without a proper authorization. Also, an unauthorized device cannot transfer contents to an authorized device. This prevents illegally obtained contents from being reused.

The recording medium device secretly sends its inherent key to the access device using the master key. The access device decrypts the inherent key sent from the recording medium device using the master key, generates authentication information that is a random number, sends the authentication information to the recording medium device, and applies a function to the authentication information using the decrypted inherent key. The recording medium device applies the same function as that applied by the access device to the authentication information using the inherent key, and sends the authentication information to which the function has been applied to the access device. The access device compares the authentication information generated by the access device with the authentication information sent from the recording medium. If the authentication information generated by the access device matches the authentication information sent from the recording medium, the access device judges that the recording medium device is an authorized device; if not, the access device judges that the recording medium device is an unauthorized device. The recording medium judges whether the access device is an authorized device in the same manner. By doing so, each of the recording medium device and the access device judges whether the other device is an authorized device.

Also, unlike the digital content protection system 100, the access device and the recording medium device perform the authentication operation described above using the inherent key prestored in the recording medium device, instead of the apparatus key prestored in the access device. Therefore, the access device and the recording medium device are not required to include memories for holding apparatus keys and apparatus key information, conversion units for converting the apparatus keys into the apparatus key information, and inversion units for performing inversion processing. As a result, the hardware scales of the access device and the recording medium device are reduced.

3.12 Other Modifications (1) In the above examples, the digital content protection system includes a memory card, a memory card writer, and a memory card reader. However, the digital content protection system does not need to include all of these devices. That is, the digital content protection system may only include a memory card and a memory card writer or may only include a memory card and a memory card reader.

(2) In the above examples, after a recording medium device, such as a memory card, is connected to an access device, such as a memory card writer and a memory card reader, each of the recording medium device and the access device judges whether the other device is an authenticated device. Only if both of these devices judges that they are connected to authenticated devices, digital contents are transferred between the recording medium device and the access device. However, the following operation may be performed.

When contents are sent from the access device to the recording medium device, the access device judges whether the recording medium device is an authentication device and, only if the judgement result is affirmative, sends the contents to the recording medium device. In this case, the recording medium device does not judge whether the access device is an authorized device.

On the other hand, when contents are sent from the recording medium device to the access device, the recording medium device judges whether the access device is an authorized device and, only if the judgement result is affirmative, the recording medium device sends the contents to the access device. In this case, the access device does not judge whether the recording medium device is an authorized device.

This modification is based on the concept that the authentication of a target device by a source device prevents contents that are properly downloaded from being used without proper authorization.

(3) In the above examples, the access device is a memory card writer or a memory card reader. However, the access device may doubles as the memory card writer and the memory card reader.

More specifically, the access device that doubles as the memory card writer and the memory card reader is connected to the personal computer shown in FIG. 2 and a memory card is inserted into the access device. With the personal computer 500, a user obtains contents, such as music data, from the outside via the communication line 10 and writes the contents in the memory card through the mediation of the access device. Also, with the personal computer 500, the user obtains contents from the memory card through the mediation of the access device and reproduces the obtained contents.

(4) In the above examples, the DES algorithm is used. However, any other cryptographic algorithm may be used.

(5) The memory card may use an optical disc or an MO (Magneto-Optical) disc, instead of a semiconductor memory.

(6) In the above examples, different inherent keys are assigned to respective recording medium devices. However, the present invention may be modified as follows.

An inherent key is assigned to a group of recording medium devices and another inherent key is assigned to another group of recording mediums. In this case, the recording medium devices in each group are assigned the same inherent key.

Also, an inherent key is assigned to the group of recording medium devices in one version of a product and another inherent key is assigned to the group of recording medium devices in another version. In this case, the recording medium devices in each group are assigned the same inherent key.

Furthermore, an inherent key is assigned to the group of recording medium devices produced by a manufacturer and another inherent key is assigned to the group of recording medium produced by another manufacturer. In this case, the recording medium devices in each group are assigned the same inherent key.

(7) When both of a recording medium device and an access device that is a memory card writer judge that the other device is an authorized device, the user key may be used to encrypt and decrypt digital contents in the manner described below.

When the recording medium device is connected to the access device, the access device receives a user key from a user, generates a file key for each file of a digital content, and generates a transformed key for each file by performing a predetermined calculation, such as the exclusive disjunction, on the file key using the user key. The access device encrypts the files using the transformed keys and outputs the encrypted files and the transformed keys to the recording medium device. The recording medium device receives the encrypted files and the transformed keys from the access device and holds them.

When the recording medium device that holds the encrypted files and the transformed keys is connected to an access device that is a memory card reader, the recording medium device outputs the encrypted files and the transformed keys to the access device. The access device receives the encrypted files and the transformed keys from the recording medium device, receives a user key from a user, generates a file key for each of the encrypted files by performing an inverse calculation of the predetermined calculation on the transformed key using the user key, decrypts the encrypted files using the generated file keys, and reproduces the decrypted files.

(8) The present invention may be achieved by a computer-readable recording medium that records a program for having a computer perform the operation of the present digital content protection system. Also, the present invention may be achieved by computer digital signals of such a program.

(9) The present invention may be achieved by a transmission media, such as a communication channel, that transmits the program for having a computer perform the operation of the present digital content protection system. Also, the present invention may be achieved by a separated computer system by delivering the recording medium to the computer system or transferring the program to the computer system via a communication channel. Furthermore, the present invention may be a program or computer digital signals transferred via a communication channel.

(10) The embodiments described above may be combined to realize a modified digital content protection system. Also, parts of some embodiments may be combined to realize a modified digital content protection system.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A recording medium apparatus that has a storage area for holding digital content information and is used in a digital content protection system, wherein the digital content protection system enables a digital content to be used and further includes an access apparatus that reads information from and writes information into the storage area, and the digital content protection system operates according to the following phases:

an authentication phase where the recording medium apparatus secretly transmits an inherent key to the access apparatus, and the recording medium apparatus and the access apparatus perform mutual authentication using the inherent key, the inherent key being information that is unique to the recording medium apparatus wherein in the mutual authentication, the recording medium apparatus judges whether the access apparatus is legitimate with use of the inherent key and the access apparatus judges whether the recording medium apparatus is legitimate with use of the inherent key; and a content transfer phase, performed only when the recording medium apparatus and the access apparatus have successfully authenticated each other, where the access apparatus either (a) encrypts a digital content using the secretly transmitted inherent key and sends the encrypted digital content to the recording medium apparatus or (b) receives an encrypted digital content from the recording medium apparatus and decrypts the encrypted digital content using the secretly transmitted inherent key.

2. An access apparatus that reads information from and writes information into a storage area of a recording medium apparatus and is included in a digital content protection system, wherein the storage area holds digital content information, the digital content protection system enables a digital content to be used and includes the recording medium apparatus and the access apparatus, wherein the digital content protection system operates according to the following phases:

an authentication phase where the recording medium apparatus secretly transmits an inherent key to the access apparatus, and the recording medium apparatus and the access apparatus perform mutual authentication using the inherent key, the inherent key being information that is unique to the recording medium apparatus wherein in the mutual authentication, the recording medium apparatus judges whether the access apparatus is legitimate with use of the inherent key and the access apparatus judges whether the recording medium apparatus is legitimate with use of the inherent key; and a content transfer phase, performed only when the recording medium apparatus and the access apparatus have successfully authenticated each other, where the access apparatus either (a) encrypts a digital content using the secretly transmitted inherent key and sends the encrypted digital content to the recording medium apparatus or (b) receives an encrypted digital content from the recording medium apparatus and decrypts the encrypted digital content using the secretly transmitted inherent key.

3. A digital content protection method used in a digital content protection system that enables a digital content to be used and includes a recording medium apparatus having a storage area for holding digital content information and an access apparatus that reads information from and writes information into the storage area, the digital content protection method comprising:

an authentication step where the recording medium apparatus secretly transmits an inherent key to the access apparatus, and the recording medium apparatus and the access apparatus perform mutual authentication using the inherent key, the inherent key being information that is unique to the recording medium apparatus wherein in the mutual authentication, the recording medium apparatus judges whether the access apparatus is legitimate with use of the inherent key and the access apparatus judges whether the recording medium apparatus is legitimate with use of the inherent key; and a content transfer step, performed only when the recording medium apparatus and the access apparatus have successfully authenticated each other, where the access apparatus either (a) encrypts a digital content using the secretly transmitted inherent key and sends the encrypted digital content to the recording medium apparatus or (b) receives an encrypted digital content from the recording medium apparatus and decrypts the encrypted digital content using the secretly transmitted inherent key.

4. A digital content protection program that is recorded on a computer-readable recording medium and is executed in a digital content protection system, wherein the digital content protection system enables a digital content to be used and includes a recording medium apparatus having a storage area for holding digital content information and an access apparatus that reads information from and writes information into the storage area, the digital content protection program comprising:

an authentication step where the recording medium apparatus secretly transmits an inherent key to the access apparatus, and the recording medium apparatus and the access apparatus perform mutual authentication using the inherent key, the inherent key being information that is unique to the recording medium apparatus wherein in the mutual authentication, the recording medium apparatus judges whether the access apparatus is legitimate with use of the inherent key and the access apparatus judges whether the recording medium apparatus is legitimate with use of the inherent key; and a content transfer step, performed only when the recording medium apparatus and the access apparatus have successfully authenticated each other, where the access apparatus either (a) encrypts a digital content using the secretly transmitted inherent key and sends the encrypted digital content to the recording medium apparatus or (b) receives an encrypted digital content from the recording medium apparatus and decrypts the encrypted digital content using the secretly transmitted inherent key.

* * * * *